(12) United States Patent
Bramlet et al.

(10) Patent No.: US 11,676,501 B2
(45) Date of Patent: Jun. 13, 2023

(54) MODIFYING A LESSON PACKAGE

(71) Applicant: Enduvo, Inc., Peoria, IL (US)

(72) Inventors: Matthew Bramlet, Peoria, IL (US); Justin Douglas Drawz, Chicago, IL (US); Steven J. Garrou, Wilmette, IL (US); Joseph Thomas Tieu, Tulsa, OK (US); Gary W. Grube, Barrington Hills, IL (US)

(73) Assignee: Enduvo, Inc., Peoria, IL (US)

( * ) Notice: Subject to any disclaimer, the term of this patent is extended or adjusted under 35 U.S.C. 154(b) by 314 days.

(21) Appl. No.: 17/069,939

(22) Filed: Oct. 14, 2020

(65) Prior Publication Data

US 2021/0256860 A1 Aug. 19, 2021

Related U.S. Application Data

(60) Provisional application No. 62/978,114, filed on Feb. 18, 2020.

(51) Int. Cl.
*G09B 5/12* (2006.01)
*G09B 5/02* (2006.01)
*G06F 16/22* (2019.01)
*G06F 40/166* (2020.01)
*G09B 5/08* (2006.01)
*G09B 7/00* (2006.01)

(52) U.S. Cl.
CPC .......... *G09B 5/12* (2013.01); *G06F 16/2272* (2019.01); *G06F 40/166* (2020.01); *G09B 5/02* (2013.01); *G09B 5/08* (2013.01); *G09B 7/00* (2013.01)

(58) Field of Classification Search
CPC ... G09B 5/02; G09B 5/12; G09B 5/08; G09B 7/00; G06F 16/2272; G06F 40/166
See application file for complete search history.

(56) References Cited

U.S. PATENT DOCUMENTS

| | | | |
|---|---|---|---|
| 6,288,753 B1 | 9/2001 | Denicola | |
| 7,257,557 B2 * | 8/2007 | Hulick | H04L 9/3231 434/354 |
| 7,733,366 B2 | 6/2010 | Beavers | |
| 7,974,569 B2 * | 7/2011 | Mansfield | G09B 7/00 434/350 |
| 8,352,876 B2 * | 1/2013 | Batarseh | G06F 3/04847 434/188 |

(Continued)

*Primary Examiner* — Eddy Saint-Vil
(74) *Attorney, Agent, or Firm* — Gary W. Grube

(57) ABSTRACT

A method for execution by a computing entity includes obtaining first and second learning objects regarding a topic. The method further includes deriving a first set of knowledge test-points for the first learning object regarding the topic based on a first set of knowledge bullet-points. The method further includes deriving a second set of knowledge test-points for the second learning object regarding the topic based on the second set of knowledge bullet-points. The method further includes generating a first knowledge assessment asset for the first learning object regarding the topic based on the first set of knowledge test-points, an illustrative asset, and a first descriptive asset of the first learning object. The method further includes generating a second knowledge assessment asset for the second learning object regarding the topic based on the second set of knowledge test-points, the illustrative asset, and a second descriptive asset of the second learning object.

12 Claims, 60 Drawing Sheets

(56) References Cited

U.S. PATENT DOCUMENTS

| | | | |
|---|---|---|---|
| 8,682,241 B2 | 3/2014 | Huerta | |
| 9,179,100 B2 | 11/2015 | Guo | |
| 10,783,797 B1* | 9/2020 | Ochi-Okorie | G09B 5/00 |
| 2006/0240395 A1* | 10/2006 | Faist | G09B 7/12 |
| | | | 434/322 |
| 2007/0031801 A1* | 2/2007 | Tidwell-Scheuring | G09B 7/00 |
| | | | 434/362 |
| 2008/0064020 A1* | 3/2008 | Stuppy | G09B 5/14 |
| | | | 434/362 |
| 2009/0311657 A1* | 12/2009 | Dodelson | G09B 7/00 |
| | | | 434/350 |
| 2011/0039244 A1* | 2/2011 | Packard | G09B 5/00 |
| | | | 434/350 |
| 2011/0123972 A1 | 5/2011 | Friedman | |
| 2012/0251992 A1 | 10/2012 | Huerta | |
| 2013/0157242 A1* | 6/2013 | Leonardo | G09B 7/00 |
| | | | 434/322 |
| 2013/0314421 A1 | 11/2013 | Kim | |
| 2014/0335497 A1* | 11/2014 | Gal | G09B 7/00 |
| | | | 434/323 |
| 2015/0199910 A1* | 7/2015 | Patel | G09B 5/08 |
| | | | 434/362 |
| 2015/0206448 A1 | 7/2015 | Loudermilk | |
| 2018/0232567 A1 | 8/2018 | Dolsma | |
| 2019/0189021 A1* | 6/2019 | Clarke | G09B 5/12 |

* cited by examiner

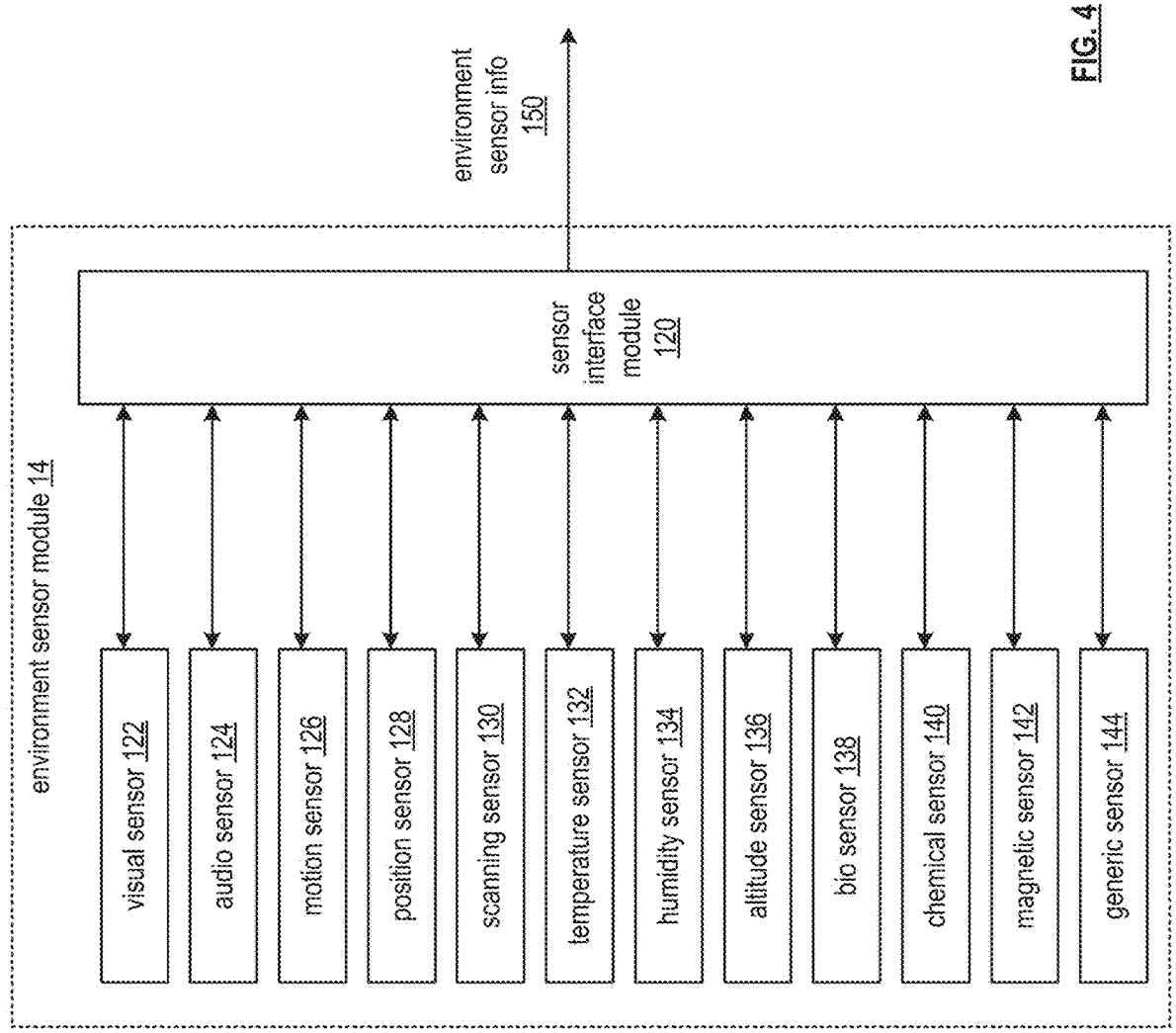

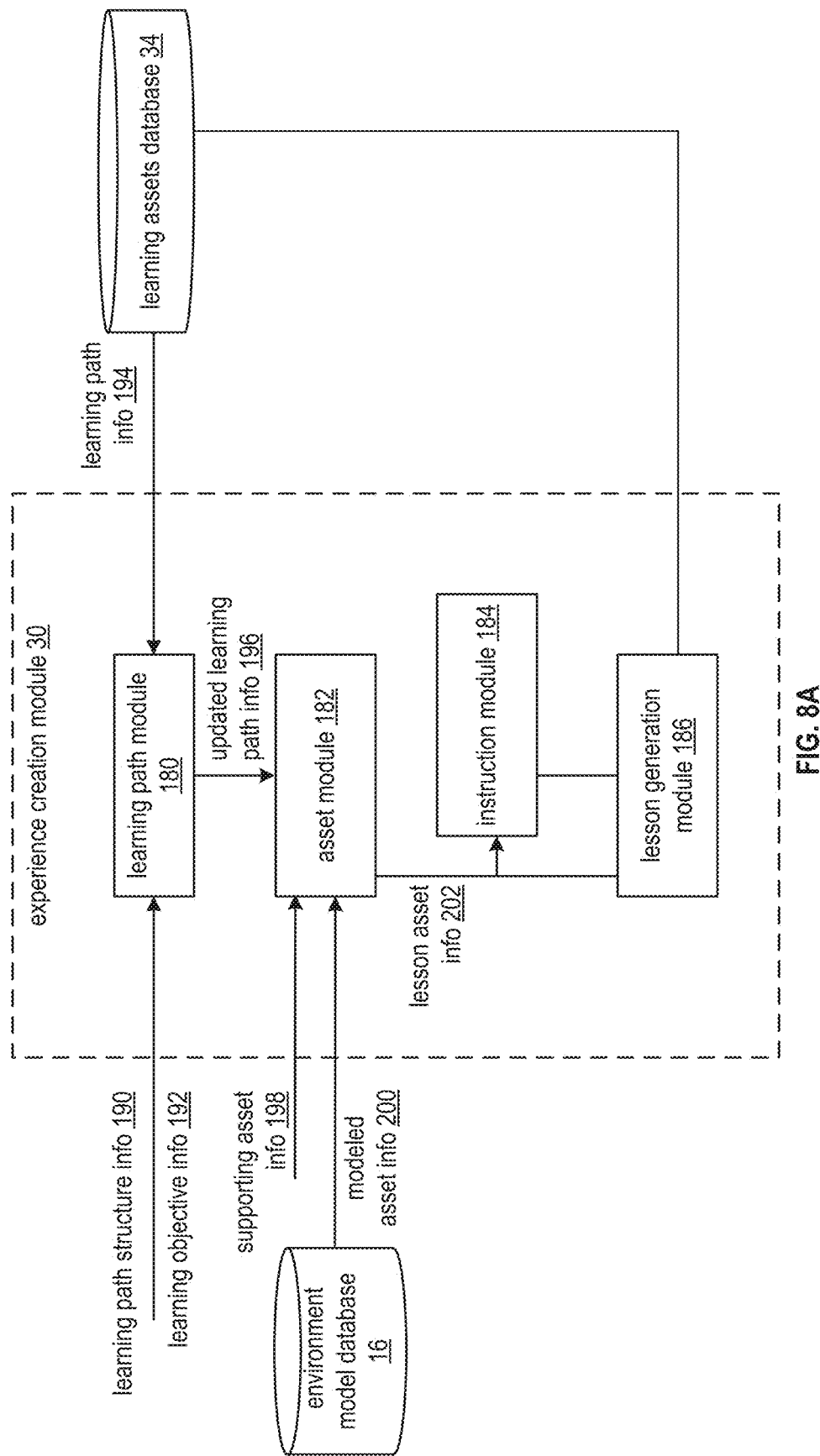

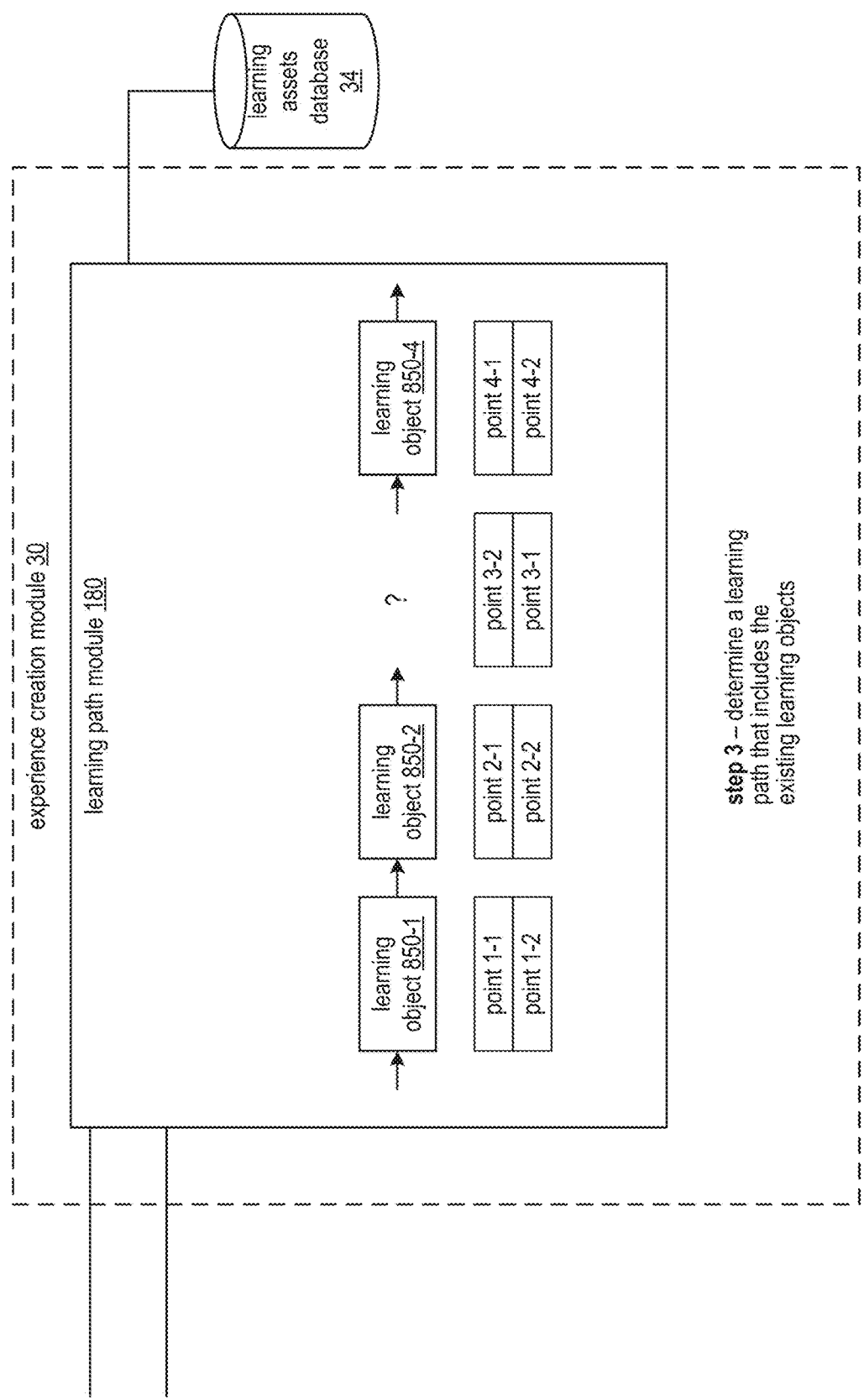

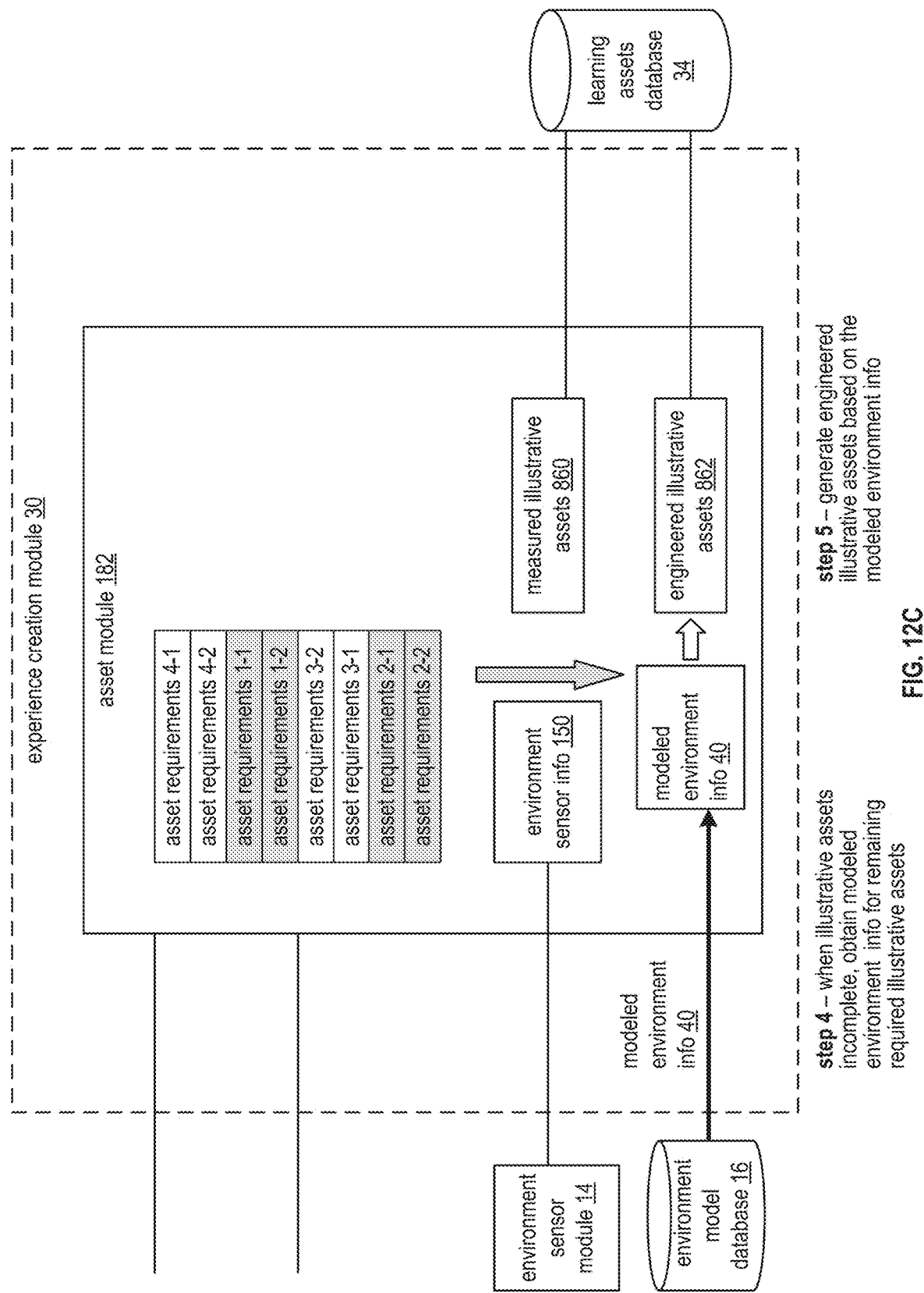

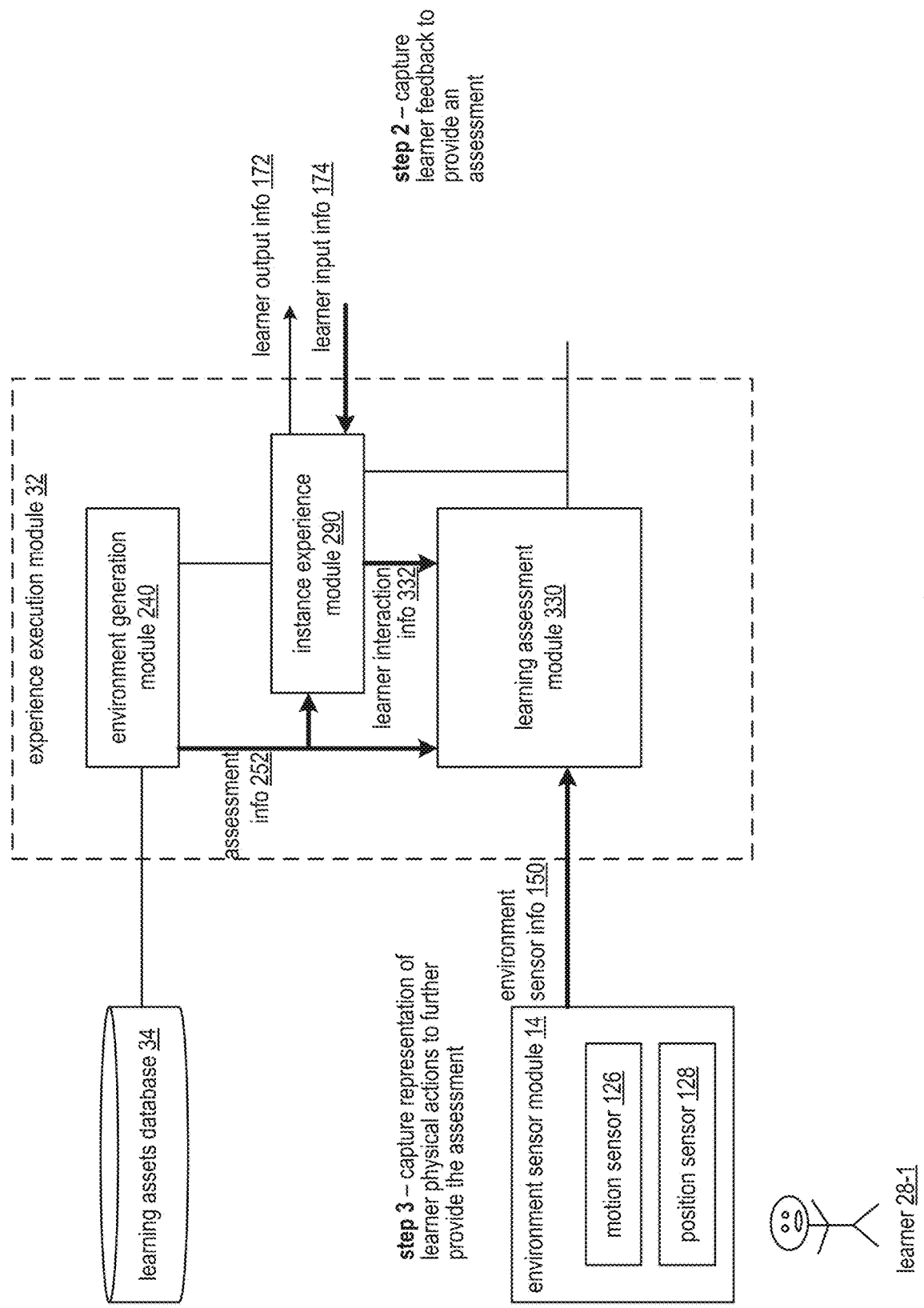

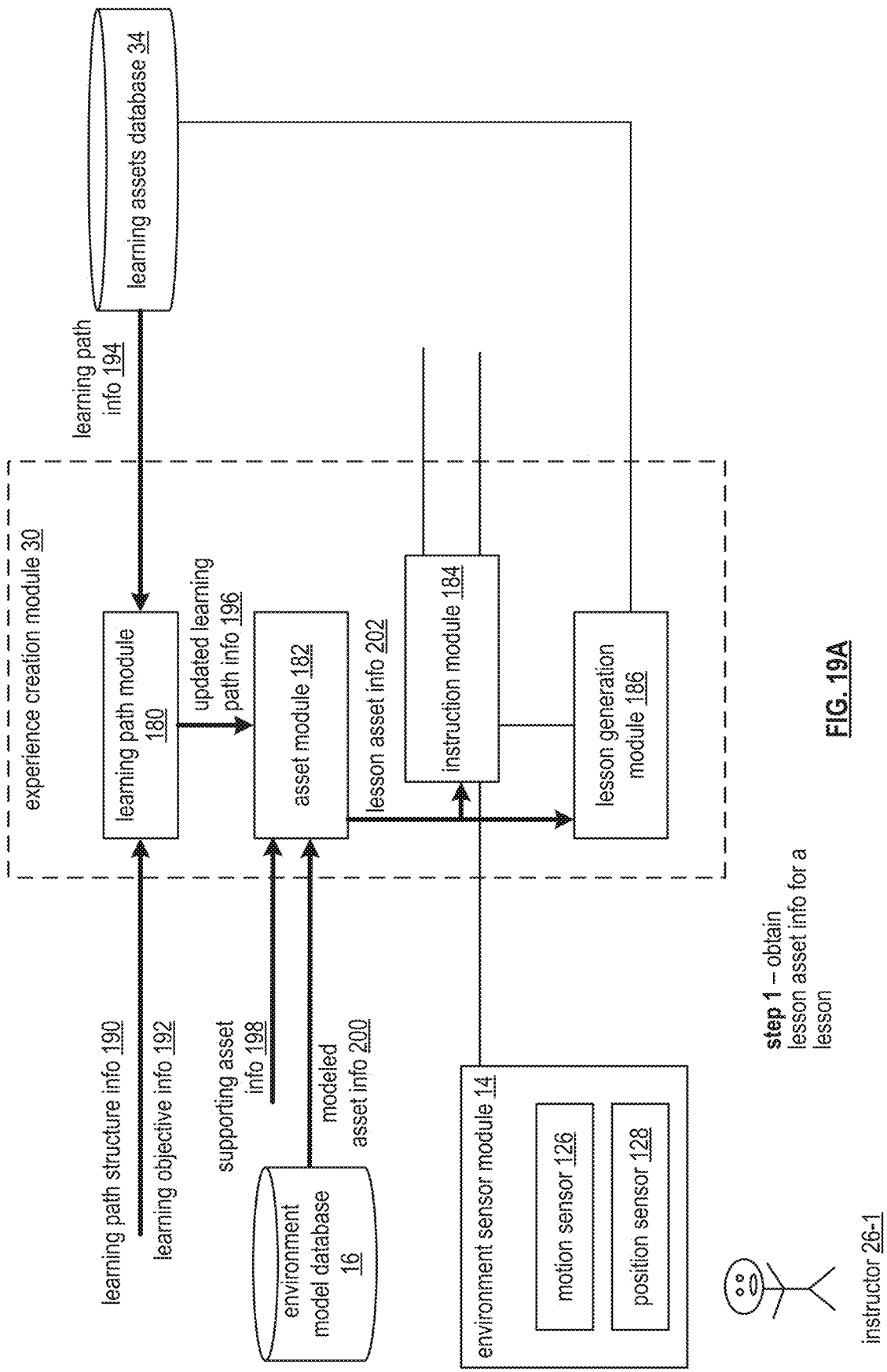

MODIFYING A LESSON PACKAGE

CROSS-REFERENCE TO RELATED APPLICATIONS

The present U.S. Utility Patent application claims priority pursuant to 35 U.S.C. § 119(e) to U.S. Provisional Application No. 62/978,114, entitled "ESTABLISHING A LESSON PACKAGE," filed Feb. 18, 2020, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and more particularly to computer systems providing educational, training, and entertainment content.

Description of Related Art

Computer systems communicate data, process data, and/or store data. Such computer systems include computing devices that range from wireless smart phones, laptops, tablets, personal computers (PC), work stations, personal three-dimensional (3-D) content viewers, and video game devices, to data centers where data servers store and provide access to digital content. Some digital content is utilized to facilitate education, training, and entertainment. Examples of visual content includes electronic books, reference materials, training manuals, classroom coursework, lecture notes, research papers, images, video clips, sensor data, reports, etc.

A variety of educational systems utilize educational tools and techniques. For example, an educator delivers educational content to students via an education tool of a recorded lecture that has built-in feedback prompts (e.g., questions, verification of viewing, etc.). The educator assess a degree of understanding of the educational content and/or overall competence level of a student from responses to the feedback prompts.

BRIEF DESCRIPTION OF THE SEVERAL VIEWS OF THE DRAWING(S)

FIG. 4 is a schematic block diagram of an embodiment of an environment sensor module of a computing system in accordance with the present invention;

Figure 13A:
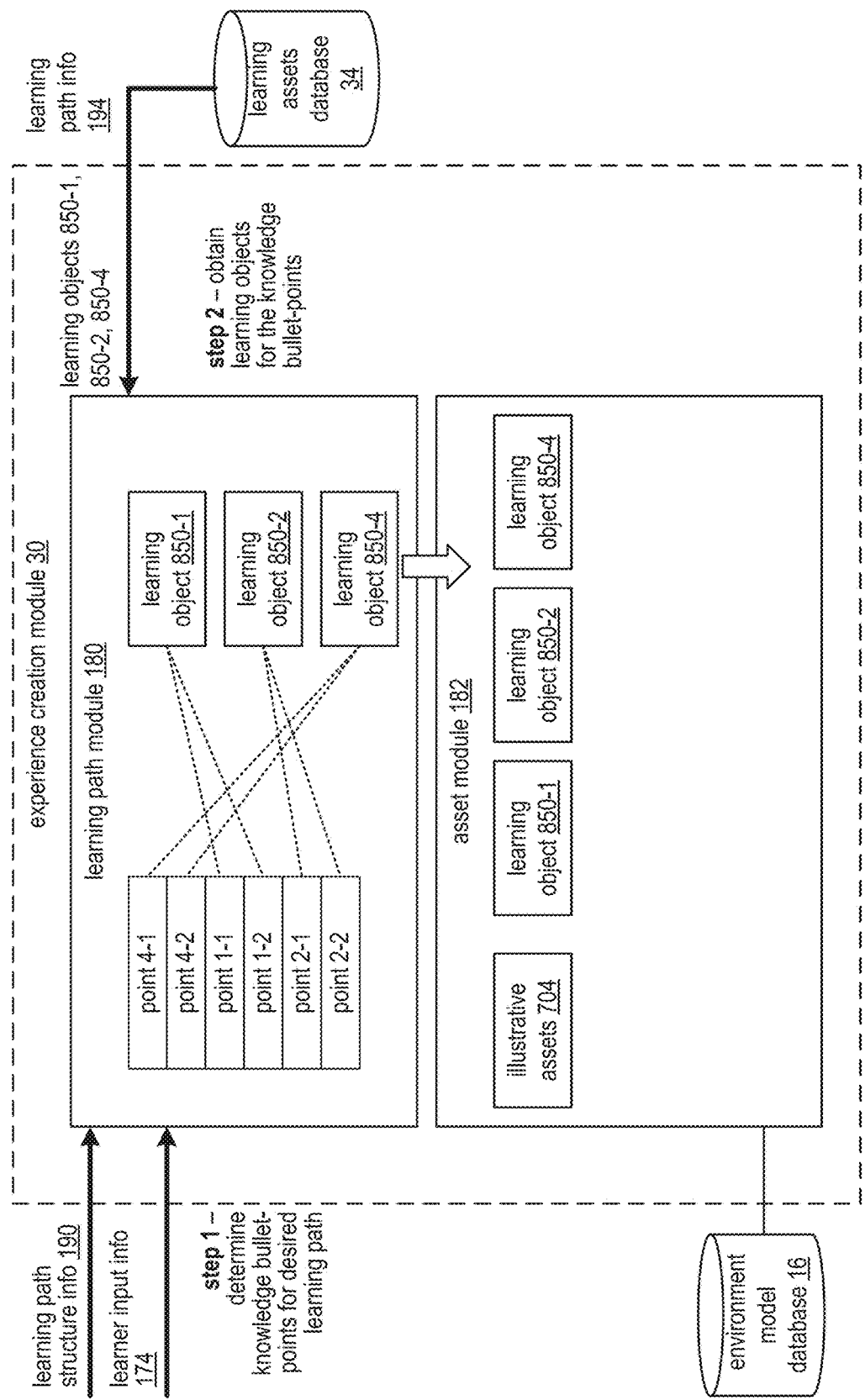
Figure 13B:
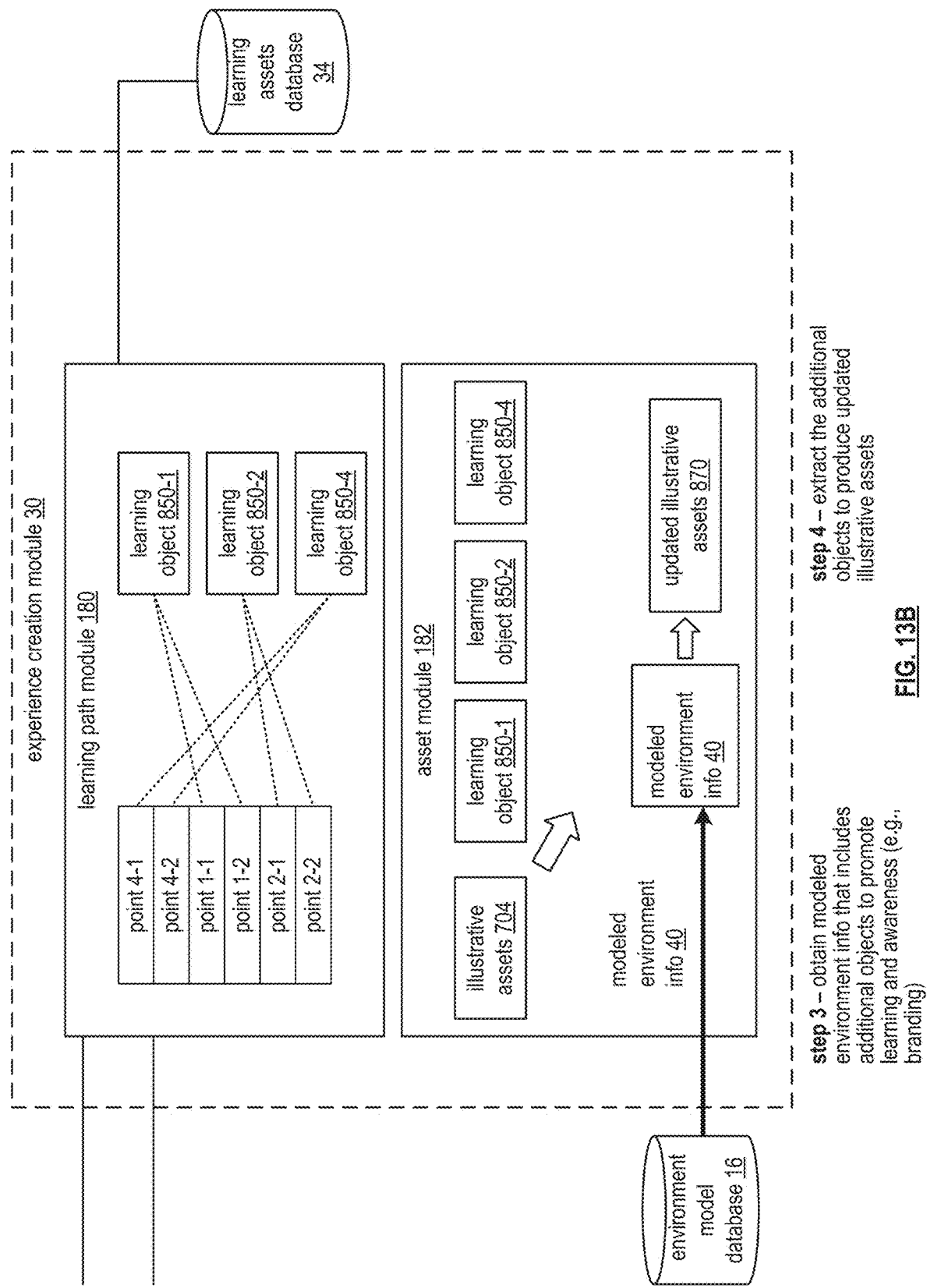
Figure 13C:
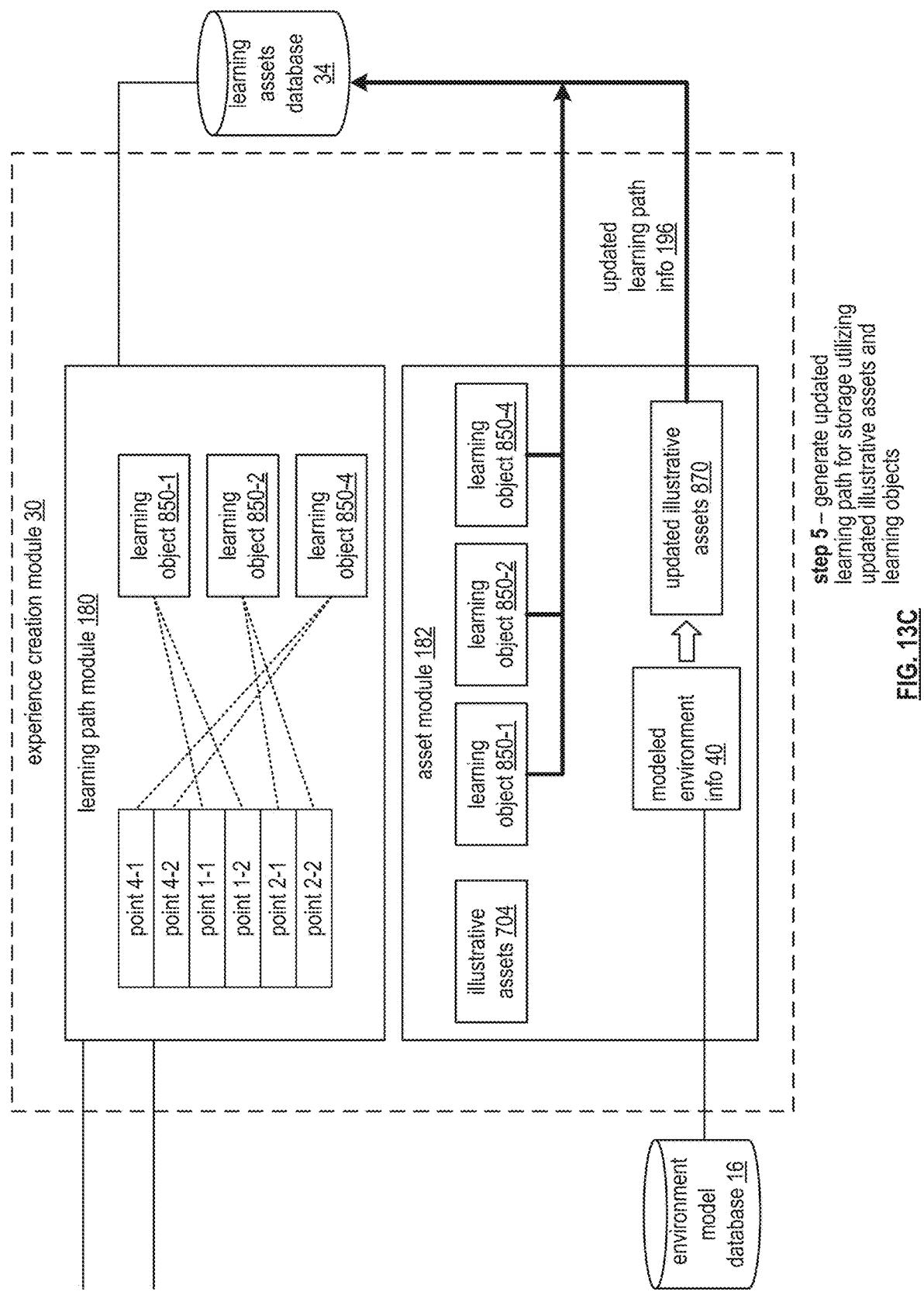
Figure 14A:
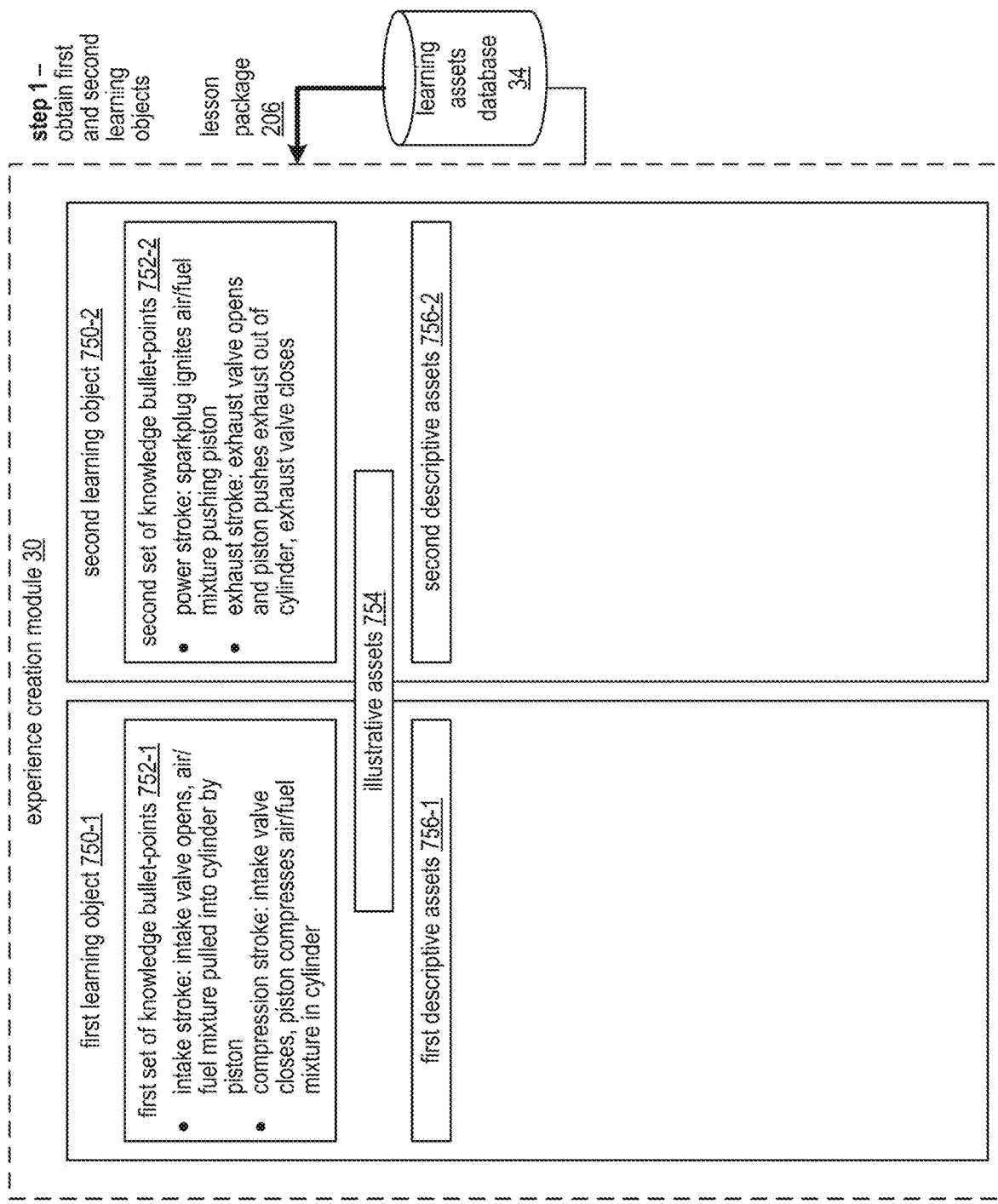
Figure 14B:
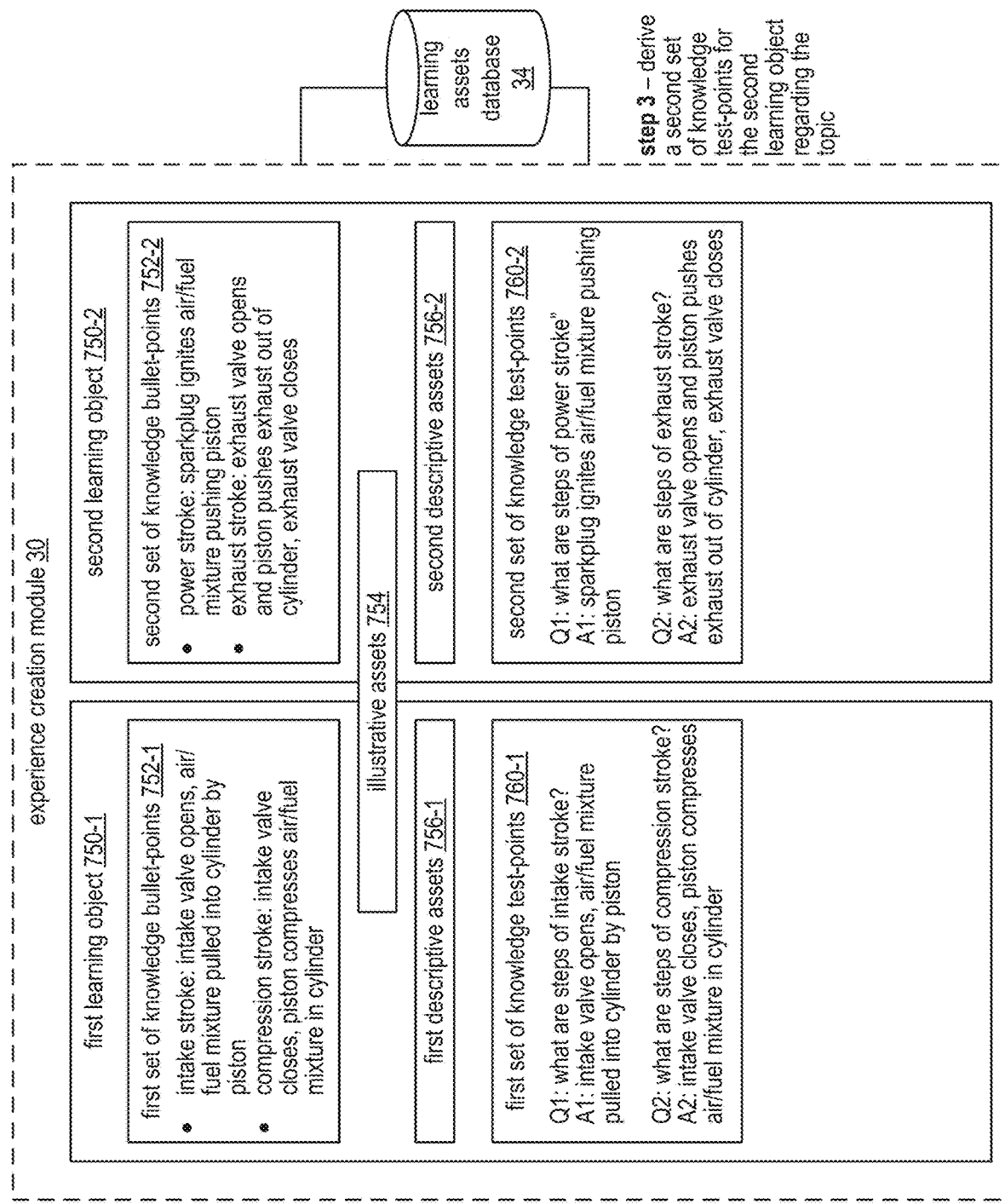
Figure 14C:
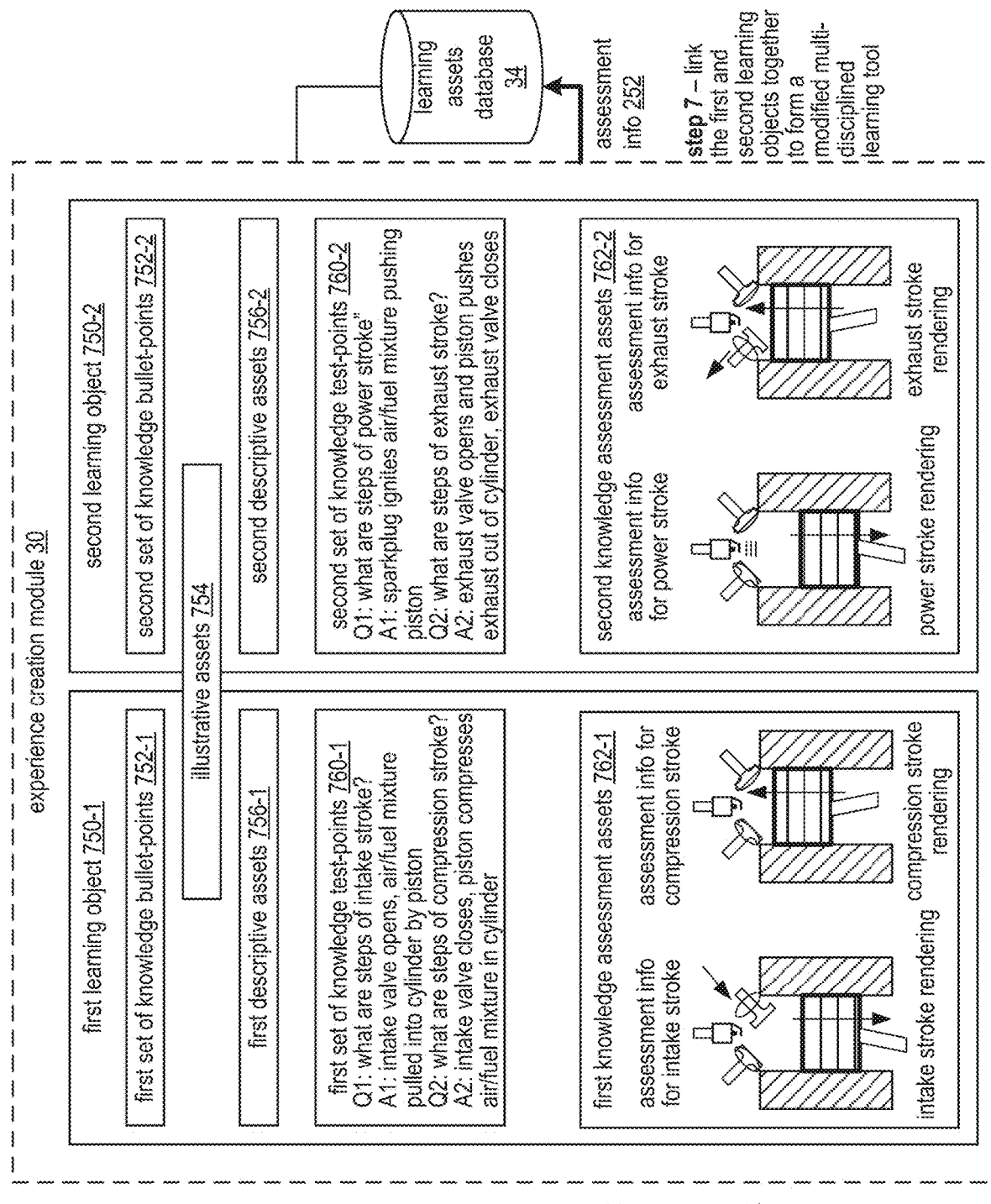
Figure 17A:
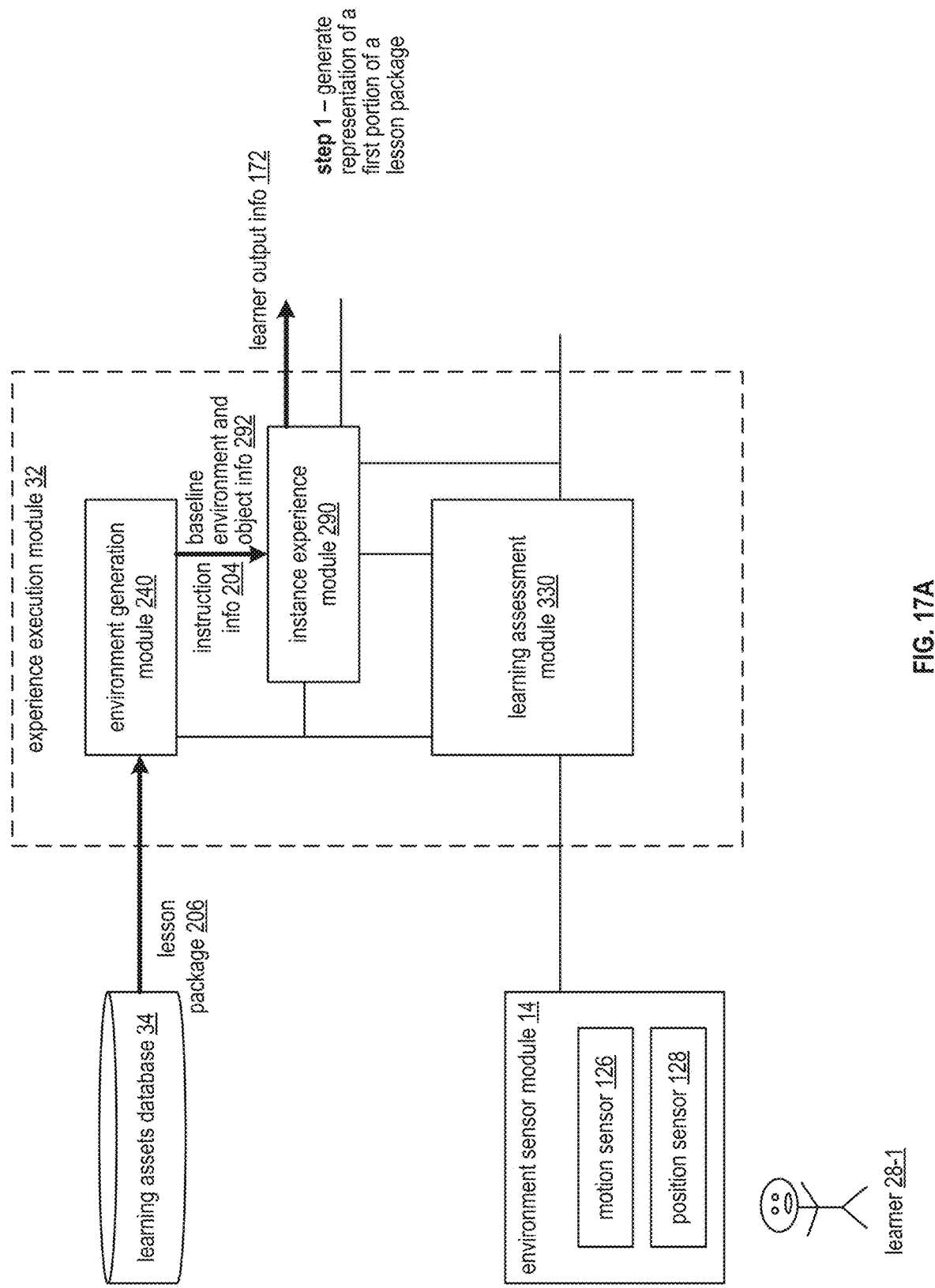
Figure 17C:
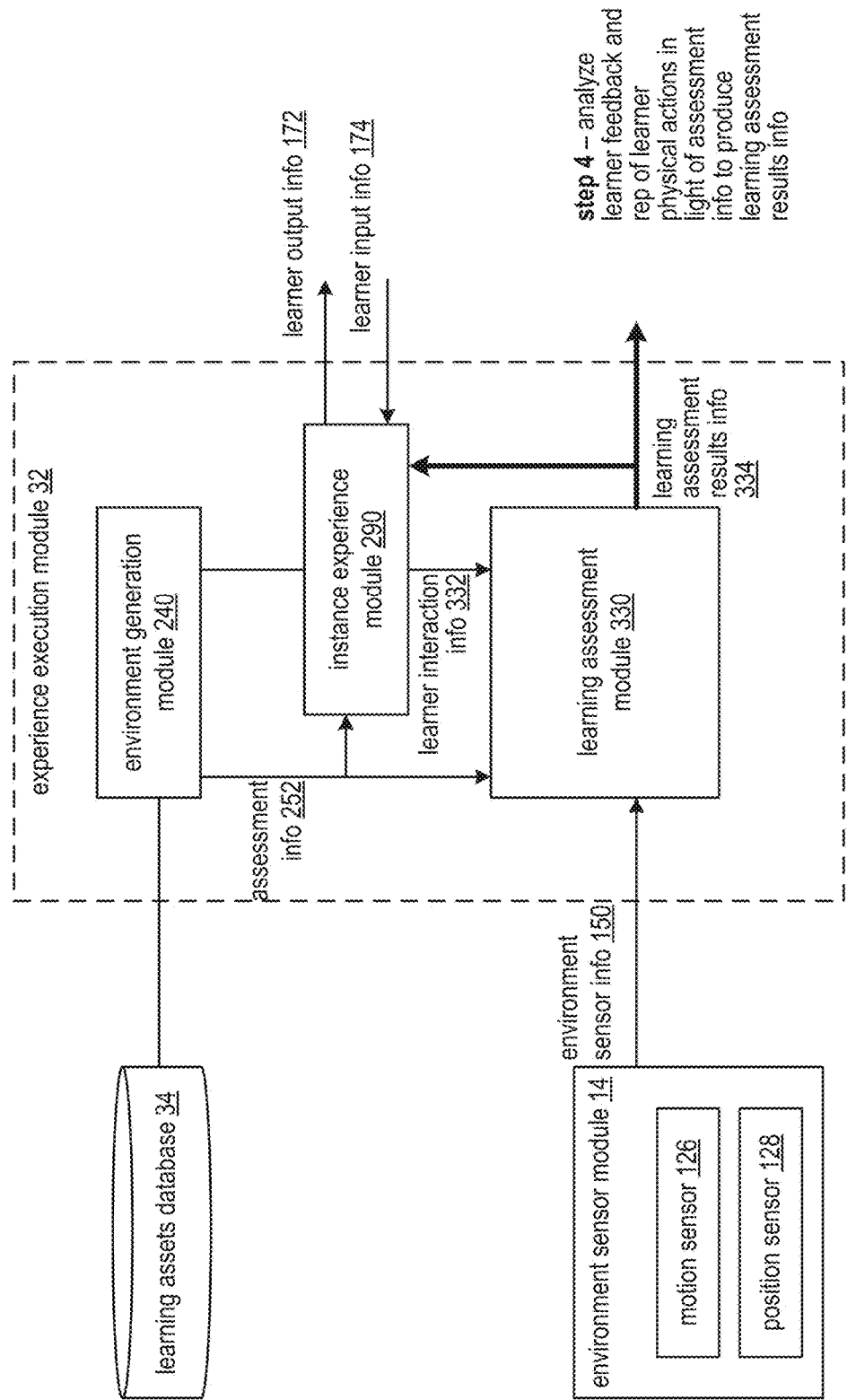

FIGS. 8E, 8F, 8G, 8H, 8J, and 8K are schematic block diagrams of another embodiment of a computing system illustrating another example of creating a learning experience in accordance with the present invention;

FIGS. 9A, 9B, 9C, and 9D are schematic block diagrams of an embodiment of a computing system illustrating an example of creating a lesson package in accordance with the present invention;

FIGS. 10A, 10B, 10C, 10D, and 10E are schematic block diagrams of an embodiment of a computing system illustrating an example of creating updated learning path information in accordance with the present invention;

FIGS. 11A, 11B, 11C, 11D, and 11E are schematic block diagrams of an embodiment of a computing system illustrating an example of creating lesson asset information in accordance with the present invention;

FIGS. 12A, 12B, 12C, and 12D are schematic block diagrams of an embodiment of a computing system illustrating an example of creating modeled asset information in accordance with the present invention;

FIGS. 13A, 13B, and 13C are schematic block diagrams of an embodiment of a computing system illustrating another example of creating updated learning path information in accordance with the present invention;

FIGS. 14A, 14B, and 14C are schematic block diagrams of an embodiment of a computing system illustrating an example of modifying a lesson package in accordance with the present invention;

FIGS. 15A, 15B, 15C, and 15D are schematic block diagrams of an embodiment of a computing system illustrating an example of updating descriptive assets and knowledge assessment assets in accordance with the present invention;

FIGS. 16A, 16B, 16C, and 16D are schematic block diagrams of an embodiment of a computing system illustrating another example of creating updated learning path information in accordance with the present invention;

FIGS. 17A, 17B, and 17C are schematic block diagrams of an embodiment of a computing system illustrating an example of creating learning assessment results information in accordance with the present invention;

FIGS. 18A, 18B, 18C, and 18D are schematic block diagrams of an embodiment of a computing system illustrating another example of creating a lesson package in accordance with the present invention; and FIGS. 19A, 19B, 19C, and 19D are schematic block diagrams of an embodiment of a computing system illustrating another example of creating a lesson package in accordance with the present invention.

DETAILED DESCRIPTION OF THE INVENTION

Figure 1:
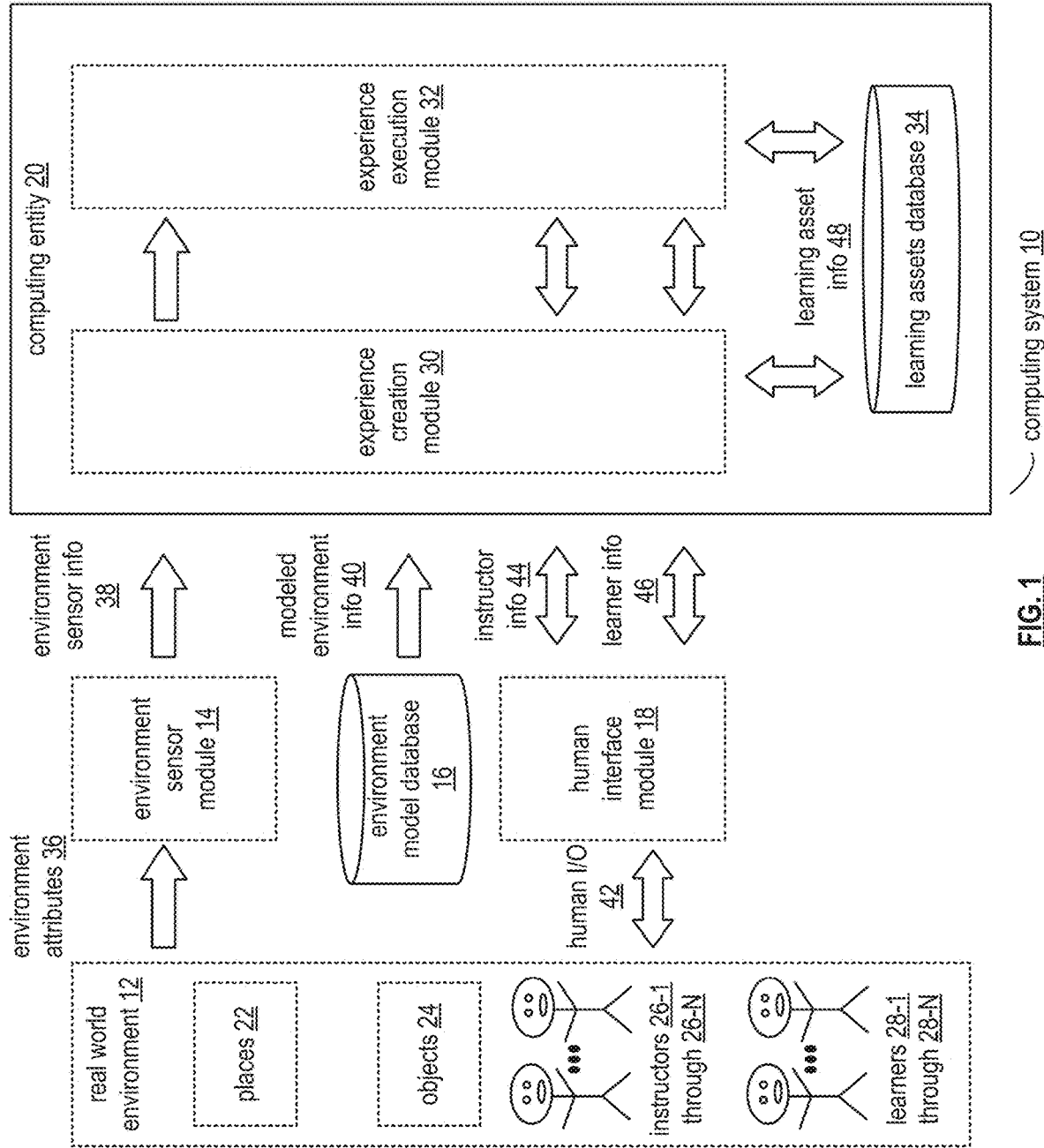
FIG. 1 is a schematic block diagram of an embodiment of a computing system in accordance with the present invention.

FIG. 1 is a schematic block diagram of an embodiment of a computing system 10 that includes a real world environment 12, an environment sensor module 14, and environment model database 16, a human interface module 18, and a computing entity 20. The real-world environment 12 includes places 22, objects 24, instructors 26-1 through 26-N, and learners 28-1 through 28-N. The computing entity 20 includes an experience creation module 30, an experience execution module 32, and a learning assets database 34.

The places 22 includes any area. Examples of places 22 includes a room, an outdoor space, a neighborhood, a city, etc. The objects 24 includes things within the places. Examples of objects 24 includes people, equipment, furniture, personal items, tools, and representations of information (i.e., video recordings, audio recordings, captured text, etc.). The instructors includes any entity (e.g., human or human proxy) imparting knowledge. The learners includes entities trying to gain knowledge and may temporarily serve as an instructor.

In an example of operation of the computing system 10, the experience creation module 30 receives environment sensor information 38 from the environment sensor module 14 based on environment attributes 36 from the real world environment 12. The environment sensor information 38 includes time-based information (e.g., static snapshot, continuous streaming) from environment attributes 36 including XYZ position information, place information, and object information (i.e., background, foreground, instructor, learner, etc.). The XYZ position information includes portrayal in a world space industry standard format (e.g., with reference to an absolute position).

The environment attributes 36 includes detectable measures of the real-world environment 12 to facilitate generation of a multi-dimensional (e.g., including time) representation of the real-world environment 12 in a virtual reality and/or augmented reality environment. For example, the environment sensor module 14 produces environment sensor information 38 associated with a medical examination room and a subject human patient (e.g., an MM). The environment sensor module 14 is discussed in greater detail with reference to FIG. 4.

Having received the environment sensor information 38, the experience creation module 30 accesses the environment model database 16 to recover modeled environment information 40. The modeled environment information 40 includes a synthetic representation of numerous environments (e.g., model places and objects). For example, the modeled environment information 40 includes a 3-D representation of a typical human circulatory system. The models include those that are associated with certain licensing requirements (e.g., copyrights, etc.).

Having received the modeled environment information 40, the experience creation module 30 receives instructor information 44 from the human interface module 18, where the human interface module 18 receives human input/output (I/O) 42 from instructor 26-1. The instructor information 44 includes a representation of an essence of communication with a participant instructor. The human I/O 42 includes detectable fundamental forms of communication with humans or human proxies. The human interface module 18 is discussed in greater detail with reference to FIG. 3.

Having received the instructor information 44, the experience creation module 30 interprets the instructor information 44 to identify aspects of a learning experience. A learning experience includes numerous aspects of an encounter between one or more learners and an imparting of knowledge within a representation of a learning environment that includes a place, multiple objects, and one or more instructors. The learning experience further includes an instruction portion (e.g., acts to impart knowledge) and an assessment portion (e.g., further acts and/or receiving of learner input) to determine a level of comprehension of the knowledge by the one or more learners. The learning experience still further includes scoring of the level of comprehension and tallying multiple learning experiences to facilitate higher-level competency accreditations (e.g., certificates, degrees, licenses, training credits, experiences completed successfully, etc.).

As an example of the interpreting of the instructor information 44, the experience creation module 30 identifies a set of concepts that the instructor desires to impart upon a learner and a set of comprehension verifying questions and associated correct answers. The experience creation module 30 further identifies step-by-step instructor annotations associated with the various objects within the environment of the learning experience for the instruction portion and the assessment portion. For example, the experience creation module 30 identifies positions held by the instructor 26-1 as the instructor narrates a set of concepts associated with the subject patient circulatory system. As a further example, the experience creation module 30 identifies circulatory system questions and correct answers posed by the instructor associated with the narrative.

Having interpreted the instructor information 44, the experience creation module 30 renders the environment sensor information 38, the modeled environment information 40, and the instructor information 44 to produce learning assets information 48 for storage in the learning assets database 34. The learning assets information 48 includes all things associated with the learning experience to facilitate subsequent recreation. Examples includes the environment, places, objects, instructors, learners, assets, recorded instruction information, learning evaluation information, etc.

Execution of a learning experience for the one or more learners includes a variety of approaches. A first approach includes the experience execution module 32 recovering the learning assets information 48 from the learning assets database 34, rendering the learning experience as learner information 46, and outputting the learner information 46 via the human interface module 18 as further human I/O 42 to one or more of the learners 28-1 through 28-N. The learner information 46 includes information to be sent to the one or more learners and information received from the one or more learners. For example, the experience execution module 32 outputs learner information 46 associated with the instruction portion for the learner 28-1 and collects learner information 46 from the learner 28-1 that includes submitted assessment answers in response to assessment questions of the assessment portion communicated as further learner information 46 for the learner 28-1.

A second approach includes the experience execution module 32 rendering the learner information 46 as a combination of live streaming of environment sensor information 38 from the real-world environment 12 along with an augmented reality overlay based on recovered learning asset information 48. For example, a real world subject human patient in a medical examination room is live streamed as the environment sensor information 38 in combination with a prerecorded instruction portion from the instructor 26-1.

Figure 2A:
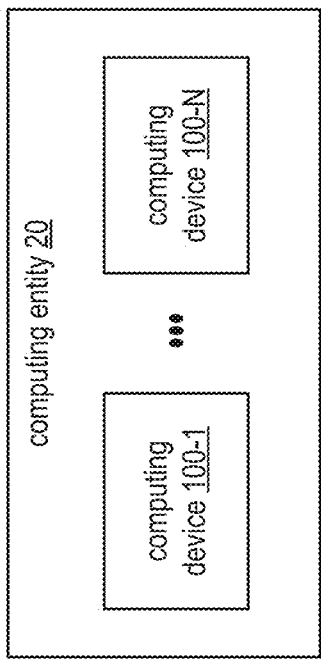
FIG. 2A is a schematic block diagram of an embodiment of a computing entity of a computing system in accordance with the present invention.

FIG. 2A is a schematic block diagram of an embodiment of the computing entity 20 of the computing system 10. The computing entity 20 includes one or more computing devices 100-1 through 100-N. A computing device is any electronic device that communicates data, processes data, represents data (e.g., user interface) and/or stores data.

Computing devices include portable computing devices and fixed computing devices. Examples of portable computing devices include an embedded controller, a smart sensor, a social networking device, a gaming device, a smart phone, a laptop computer, a tablet computer, a video game controller, and/or any other portable device that includes a computing core. Examples of fixed computing devices includes a personal computer, a computer server, a cable set-top box, a fixed display device, an appliance, and industrial controller, a video game counsel, a home entertainment controller, a critical infrastructure controller, and/or any type of home, office or cloud computing equipment that includes a computing core.

Figure 2B:
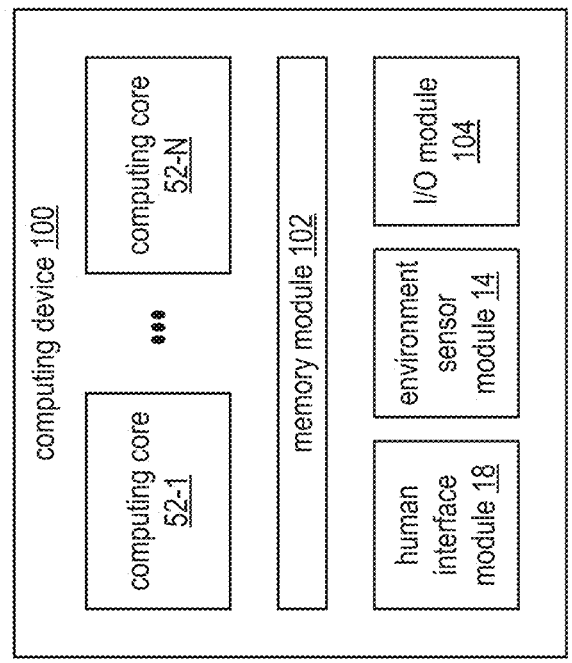
FIG. 2B is a schematic block diagram of an embodiment of a computing device of a computing system in accordance with the present invention.

FIG. 2B is a schematic block diagram of an embodiment of a computing device 100 of the computing system 10 that includes one or more computing cores 52-1 through 52-N, a memory module 102, the human interface module 18, the environment sensor module 14, and an I/O module 104. In alternative embodiments, the human interface module 18, the environment sensor module 14, the I/O module 104, and the memory module 102 may be standalone (e.g., external to the computing device). An embodiment of the computing device 100 will be discussed in greater detail with reference to FIG. 3.

Figure 3:
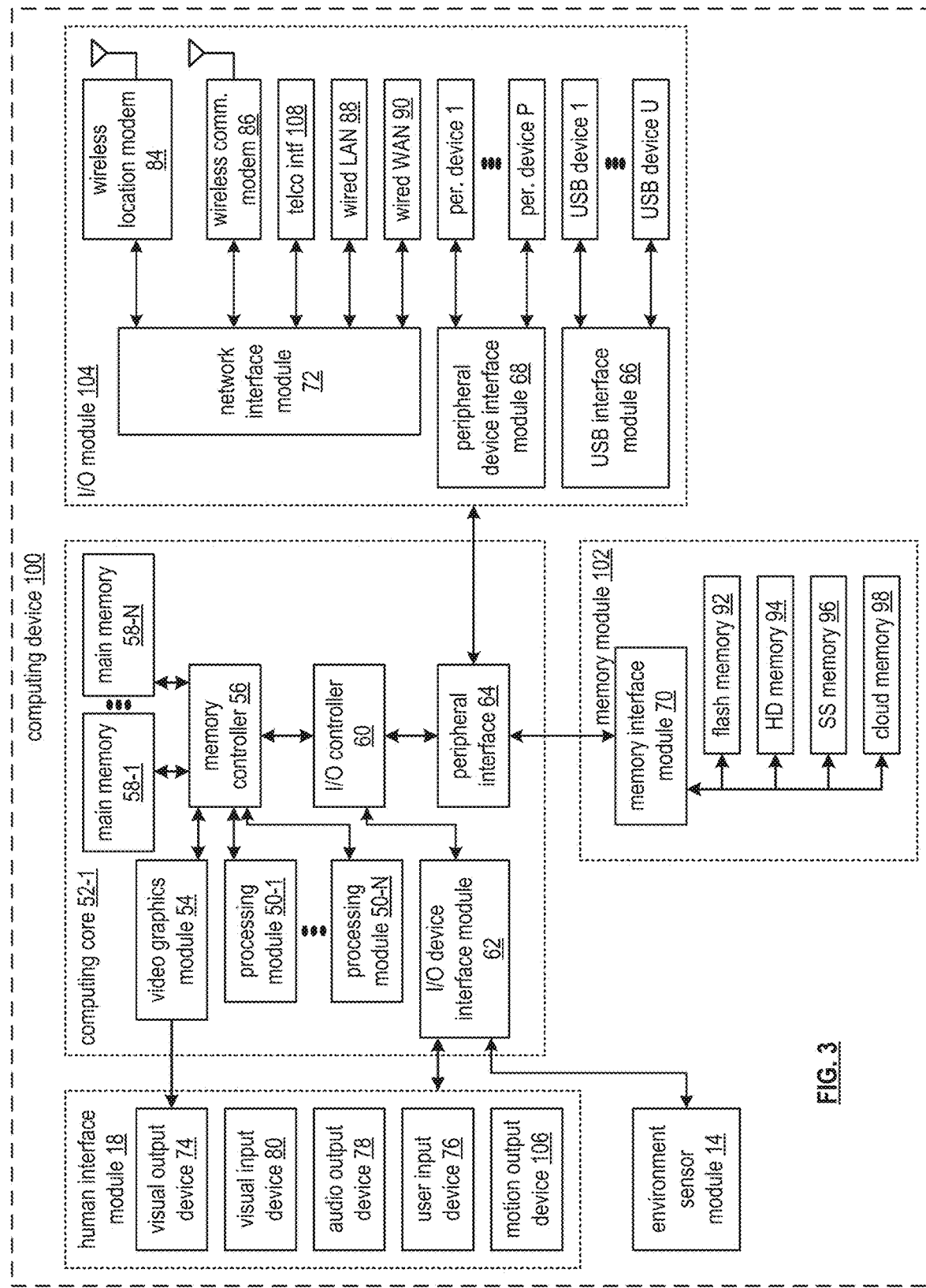
FIG. 3 is a schematic block diagram of another embodiment of a computing device of a computing system in accordance with the present invention.

FIG. 3 is a schematic block diagram of another embodiment of the computing device 100 of the computing system 10 that includes the human interface module 18, the environment sensor module 14, the computing core 52-1, the memory module 102, and the I/O module 104. The human interface module 18 includes one or more visual output devices 74 (e.g., video graphics display, 3-D viewer, touchscreen, LED, etc.), one or more visual input devices 80 (e.g., a still image camera, a video camera, a 3-D video camera, photocell, etc.), and one or more audio output devices 78 (e.g., speaker(s), headphone jack, a motor, etc.). The human interface module 18 further includes one or more user input devices 76 (e.g., keypad, keyboard, touchscreen, voice to text, a push button, a microphone, a card reader, a door position switch, a biometric input device, etc.) and one or more motion output devices 106 (e.g., servos, motors, lifts, pumps, actuators, anything to get real-world objects to move).

The computing core 52-1 includes a video graphics module 54, one or more processing modules 50-1 through 50-N, a memory controller 56, one or more main memories 58-1 through 58-N (e.g., RAM), one or more input/output (I/O) device interface modules 62, an input/output (I/O) controller 60, and a peripheral interface 64. A processing module is as defined at the end of the detailed description.

The memory module 102 includes a memory interface module 70 and one or more memory devices, including flash memory devices 92, hard drive (HD) memory 94, solid state (SS) memory 96, and cloud memory 98. The cloud memory 98 includes an on-line storage system and an on-line backup system.

The I/O module 104 includes a network interface module 72, a peripheral device interface module 68, and a universal serial bus (USB) interface module 66. Each of the I/O device interface module 62, the peripheral interface 64, the memory interface module 70, the network interface module 72, the peripheral device interface module 68, and the USB interface modules 66 includes a combination of hardware (e.g., connectors, wiring, etc.) and operational instructions stored on memory (e.g., driver software) that are executed by one or more of the processing modules 50-1 through 50-N and/or a processing circuit within the particular module.

The I/O module 104 further includes one or more wireless location modems 84 (e.g., global positioning satellite (GPS), Wi-Fi, angle of arrival, time difference of arrival, signal strength, dedicated wireless location, etc.) and one or more wireless communication modems 86 (e.g., a cellular network transceiver, a wireless data network transceiver, a Wi-Fi transceiver, a Bluetooth transceiver, a 315 MHz transceiver, a zig bee transceiver, a 60 GHz transceiver, etc.). The I/O module 104 further includes a telco interface 108 (e.g., to interface to a public switched telephone network), a wired local area network (LAN) 88 (e.g., optical, electrical), and a wired wide area network (WAN) 90 (e.g., optical, electrical). The I/O module 104 further includes one or more peripheral devices (e.g., peripheral devices 1-P) and one or more universal serial bus (USB) devices (USB devices 1-U). In other embodiments, the computing device 100 may include more or less devices and modules than shown in this example embodiment.

FIG. 4 is a schematic block diagram of an embodiment of the environment sensor module 14 of the computing system 10 that includes a sensor interface module 120 to output environment sensor information 150 based on information communicated with a set of sensors. The set of sensors includes a visual sensor 122 (e.g., to the camera, 3-D camera, 360° view camera, a camera array, an optical spectrometer, etc.) and an audio sensor 124 (e.g., a microphone, a microphone array). The set of sensors further includes a motion sensor 126 (e.g., a solid-state Gyro, a vibration detector, a laser motion detector) and a position sensor 128 (e.g., a Hall effect sensor, an image detector, a GPS receiver, a radar system).

The set of sensors further includes a scanning sensor 130 (e.g., CAT scan, MRI, x-ray, ultrasound, radio scatter, particle detector, laser measure, further radar) and a temperature sensor 132 (e.g., thermometer, thermal coupler). The set of sensors further includes a humidity sensor 134 (resistance based, capacitance based) and an altitude sensor 136 (e.g., pressure based, GPS-based, laser-based).

The set of sensors further includes a biosensor 138 (e.g., enzyme, immuno, microbial) and a chemical sensor 140 (e.g., mass spectrometer, gas, polymer). The set of sensors further includes a magnetic sensor 142 (e.g., Hall effect, piezo electric, coil, magnetic tunnel junction) and any generic sensor 144 (e.g., including a hybrid combination of two or more of the other sensors).

Figure 5A:
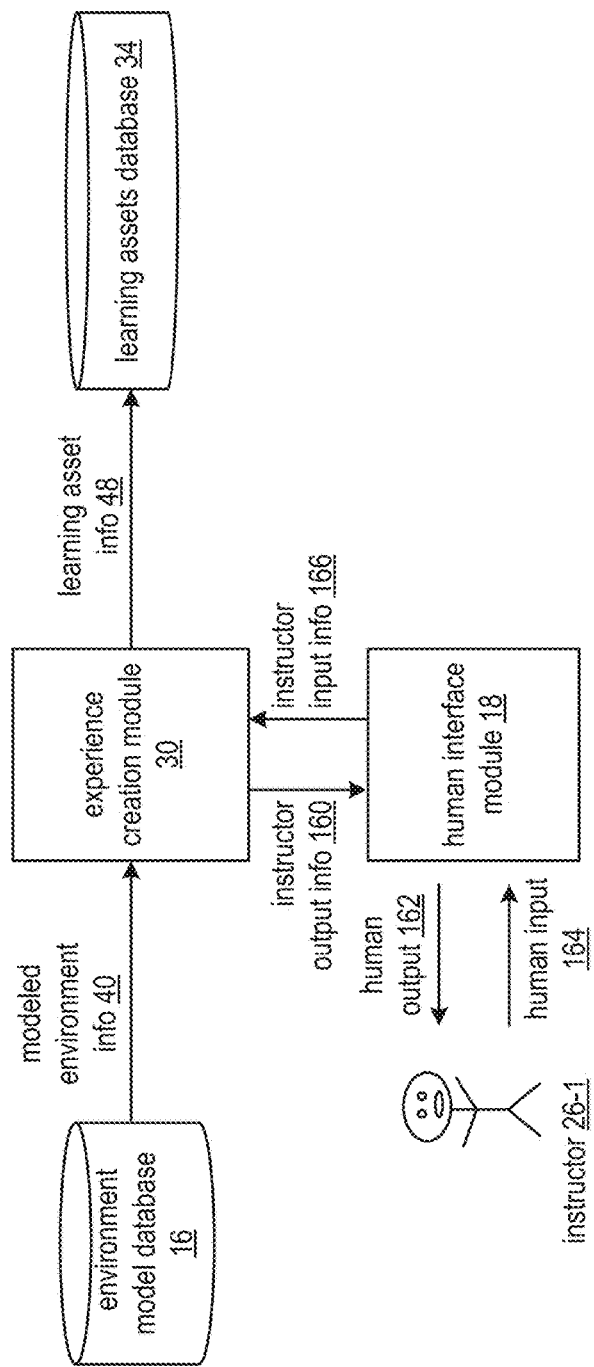
FIG. 5A is a schematic block diagram of another embodiment of a computing system in accordance with the present invention.

FIG. 5A is a schematic block diagram of another embodiment of a computing system that includes the environment model database 16, the human interface module 18, the instructor 26-1, the experience creation module 30, and the learning assets database 34 of FIG. 1. In an example of operation, the experience creation module 30 obtains modeled environment information 40 from the environment model database 16 and renders a representation of an environment and objects of the modeled environment information 40 to output as instructor output information 160. The human interface module 18 transforms the instructor output information 160 into human output 162 for presentation to the instructor 26-1. For example, the human output 162 includes a 3-D visualization and stereo audio output.

In response to the human output 162, the human interface module 18 receives human input 164 from the instructor 26-1. For example, the human input 164 includes pointer movement information and human speech associated with a lesson. The human interface module 18 transforms the human input 164 into instructor input information 166. The instructor input information 166 includes one or more of representations of instructor interactions with objects within the environment and explicit evaluation information (e.g., questions to test for comprehension level, and correct answers to the questions).

Having received the instructor input information 166, the experience creation module 30 renders a representation of the instructor input information 166 within the environment utilizing the objects of the modeled environment information 40 to produce learning asset information 48 for storage in the learnings assets database 34. Subsequent access of the learning assets information 48 facilitates a learning experience.

Figure 5B:
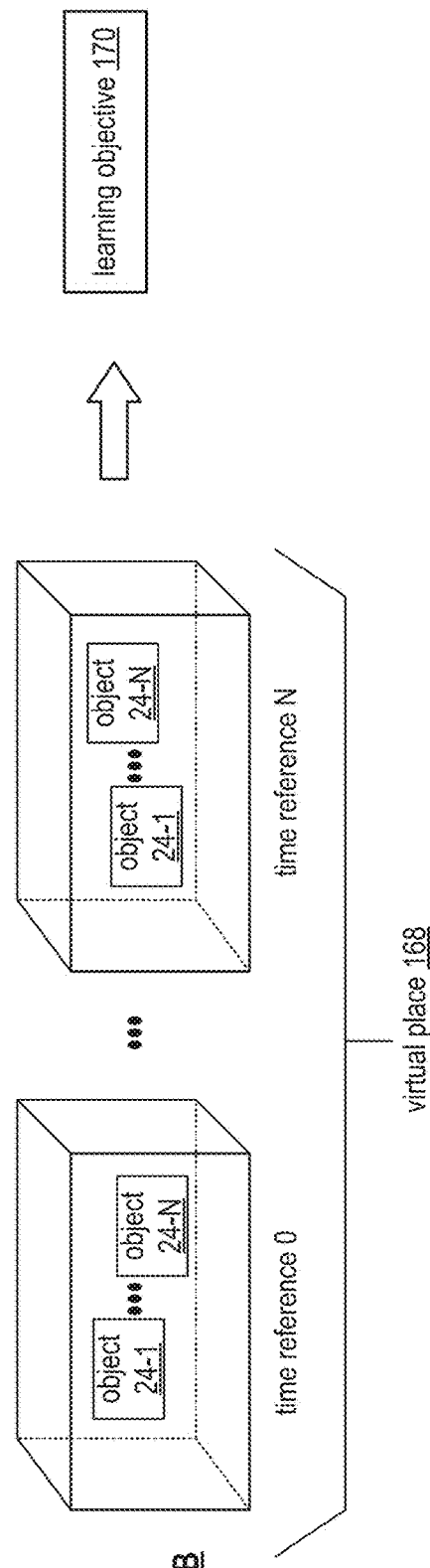
FIG. 5B is a schematic block diagram of an embodiment of a representation of a learning experience in accordance with the present invention.

FIG. 5B is a schematic block diagram of an embodiment of a representation of a learning experience that includes a virtual place 168 and a resulting learning objective 170. A learning objective represents a portion of an overall learning experience, where the learning objective is associated with at least one major concept of knowledge to be imparted to a learner. The major concept may include several sub-concepts. The makeup of the learning objective is discussed in greater detail with reference to FIG. 6.

The virtual place 168 includes a representation of an environment (e.g., a place) over a series of time intervals (e.g., time 0-N). The environment includes a plurality of objects 24-1 through 24-N. At each time reference, the positions of the objects can change in accordance with the learning experience. For example, the instructor 26-1 of FIG. 5A interacts with the objects to convey a concept. The sum of the positions of the environment and objects within the virtual place 168 is wrapped into the learning objective 170 for storage and subsequent utilization when executing the learning experience.

Figure 6:
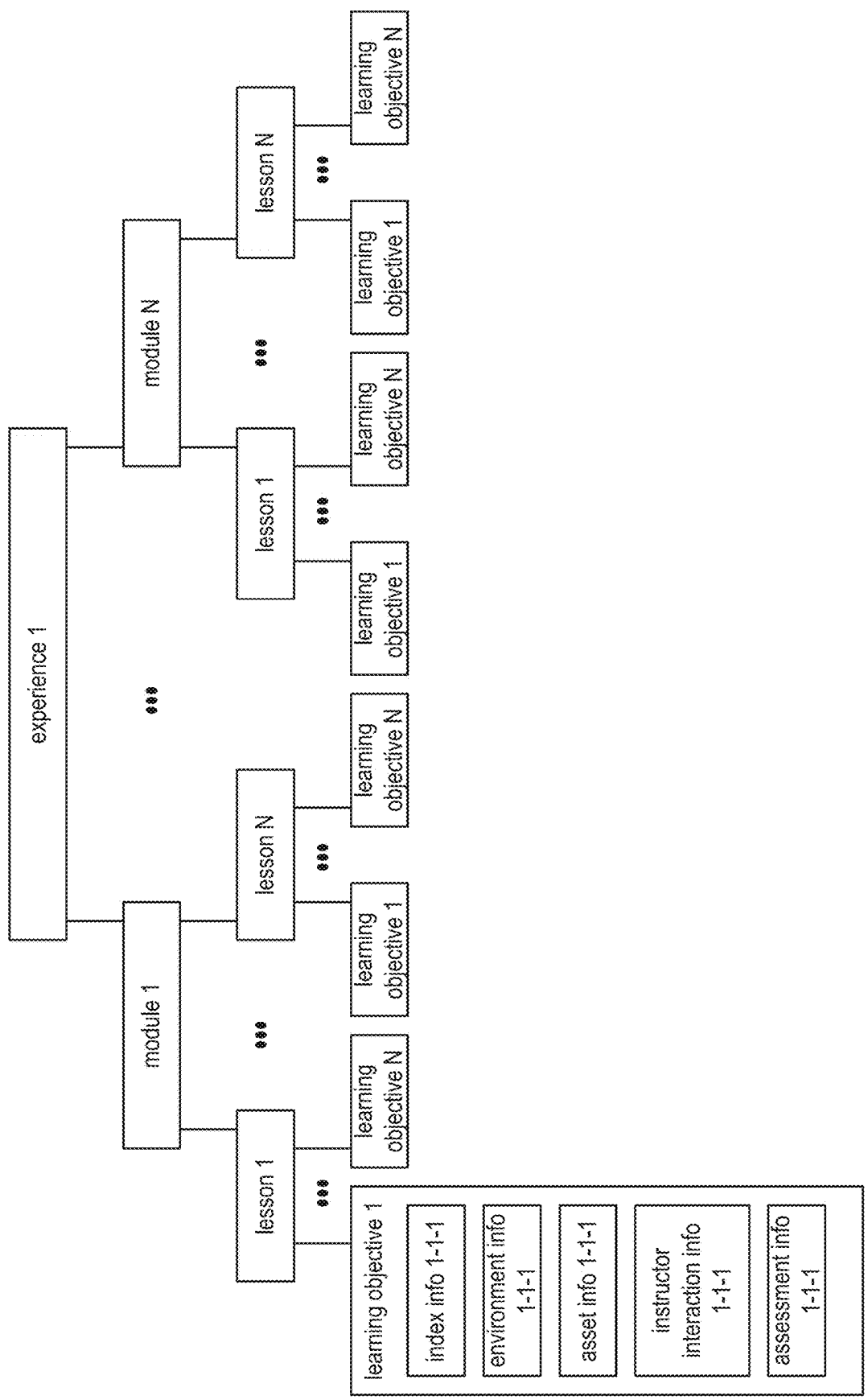
FIG. 6 is a schematic block diagram of another embodiment of a representation of a learning experience in accordance with the present invention.

FIG. 6 is a schematic block diagram of another embodiment of a representation of a learning experience that includes a plurality of modules 1-N. Each module includes a set of lessons 1-N. Each lesson includes a plurality of learning objectives 1-N. The learning experience typically is played from left to right where learning objectives are sequentially executed in lesson 1 of module 1 followed by learning objectives of lesson 2 of module 1 etc.

As learners access the learning experience during execution, the ordering may be accessed in different ways to suit the needs of the unique learner based on one or more of preferences, experience, previously demonstrated comprehension levels, etc. For example, a particular learner may skip over lesson 1 of module 1 and go right to lesson 2 of module 1 when having previously demonstrated competency of the concepts associated with lesson 1.

Each learning objective includes indexing information, environment information, asset information, instructor interaction information, and assessment information. The index information includes one or more of categorization information, topics list, instructor identification, author identification, identification of copyrighted materials, keywords, concept titles, prerequisites for access, and links to related learning objectives.

The environment information includes one or more of structure information, environment model information, background information, identifiers of places, and categories of environments. The asset information includes one or more of object identifiers, object information (e.g., modeling information), asset ownership information, asset type descriptors (e.g., 2-D, 3-D). Examples include models of physical objects, stored media such as videos, scans, images, digital representations of text, digital audio, and graphics.

The instructor interaction information includes representations of instructor annotations, actions, motions, gestures, expressions, eye movement information, facial expression information, speech, and speech inflections. The content associated with the instructor interaction information includes overview information, speaker notes, actions associated with assessment information, (e.g., pointing to questions, revealing answers to the questions, motioning related to posing questions) and conditional learning objective execution ordering information (e.g., if the learner does this then take this path, otherwise take another path).

The assessment information includes a summary of desired knowledge to impart, specific questions for a learner, correct answers to the specific questions, multiple-choice question sets, and scoring information associated with writing answers. The assessment information further includes historical interactions by other learners with the learning objective (e.g., where did previous learners look most often within the environment of the learning objective, etc.), historical responses to previous comprehension evaluations, and actions to facilitate when a learner responds with a correct or incorrect answer (e.g., motion stimulus to activate upon an incorrect answer to increase a human stress level).

Figure 7A:
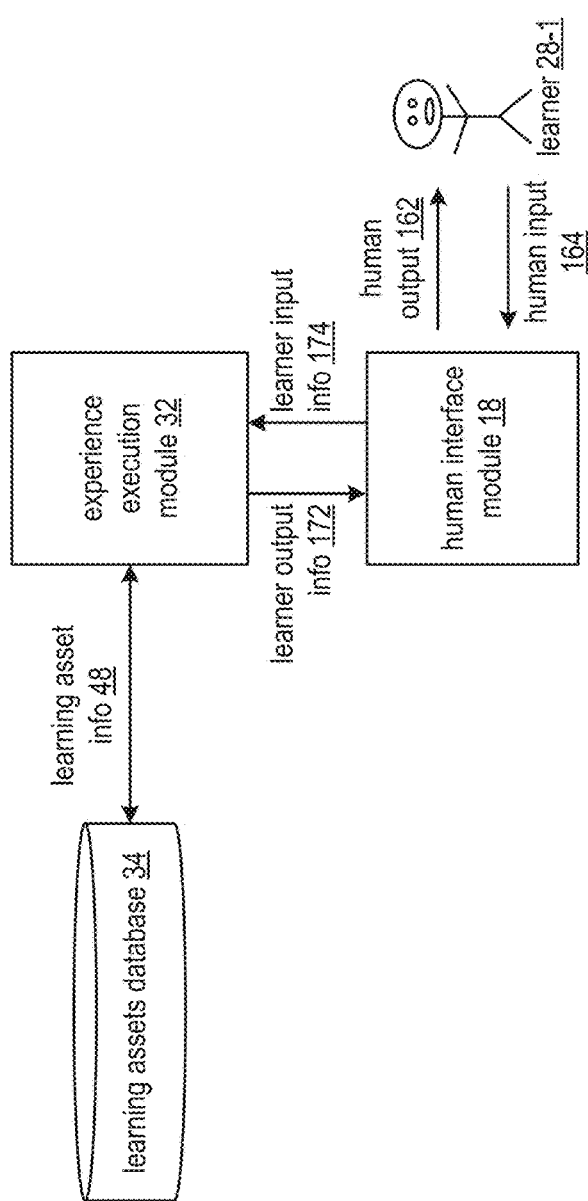
FIG. 7A is a schematic block diagram of another embodiment of a computing system in accordance with the present invention.

FIG. 7A is a schematic block diagram of another embodiment of a computing system that includes the learning assets database 34, the experience execution module 32, the human interface module 18, and the learner 28-1 of FIG. 1. In an example of operation, the experience execution module 32 recovers learning asset information 48 from the learning assets database 34 (e.g., in accordance with a selection by the learner 28-1). The experience execution module 32 renders a group of learning objectives associated with a common lesson within an environment utilizing objects associated with the lesson to produce learner output information 172. The learner output information 172 includes a representation of a virtual place and objects that includes instructor interactions and learner interactions from a perspective of the learner.

The human interface module 18 transforms the learner output information 172 into human output 162 for conveyance of the learner output information 172 to the learner 28-1. For example, the human interface module 18 facilitates displaying a 3-D image of the virtual environment to the learner 28-1.

The human interface module 18 transforms human input 164 from the learner 28-1 to produce learner input information 174. The learner input information 174 includes representations of learner interactions with objects within the virtual place (e.g., answering comprehension level evaluation questions).

The experience execution module 32 updates the representation of the virtual place by modifying the learner output information 172 based on the learner input information 174 so that the learner 28-1 enjoys representations of interactions caused by the learner within the virtual environment. The experience execution module 32 evaluates the learner input information 174 with regards to evaluation information of the learning objectives to evaluate a comprehension level by the learner 28-1 with regards to the set of learning objectives of the lesson.

Figure 7B:
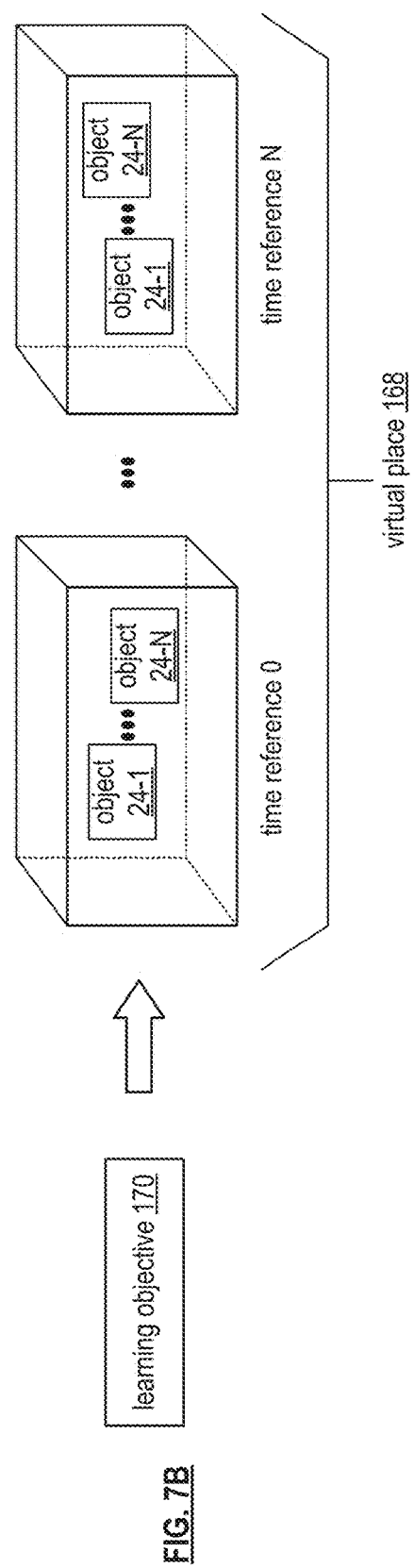
FIG. 7B is a schematic block diagram of another embodiment of a representation of a learning experience in accordance with the present invention.

FIG. 7B is a schematic block diagram of another embodiment of a representation of a learning experience that includes the learning objective 170 and the virtual place 168. In an example of operation, the learning objective 170 is recovered from the learning assets database 34 of FIG. 7A and rendered to create the virtual place 168 representations of objects 24-1 through 24-N in the environment from time references zero through N. For example, a first object is the instructor 26-1 of FIG. 5A, a second object is the learner 28-1 of FIG. 7A, and the remaining objects are associated with the learning objectives of the lesson, where the objects are manipulated in accordance with annotations of instructions provided by the instructor 26-1.

The learner 28-1 experiences a unique viewpoint of the environment and gains knowledge from accessing (e.g., playing) the learning experience. The learner 28-1 further manipulates objects within the environment to support learning and assessment of comprehension of objectives of the learning experience.

Figure 8B:
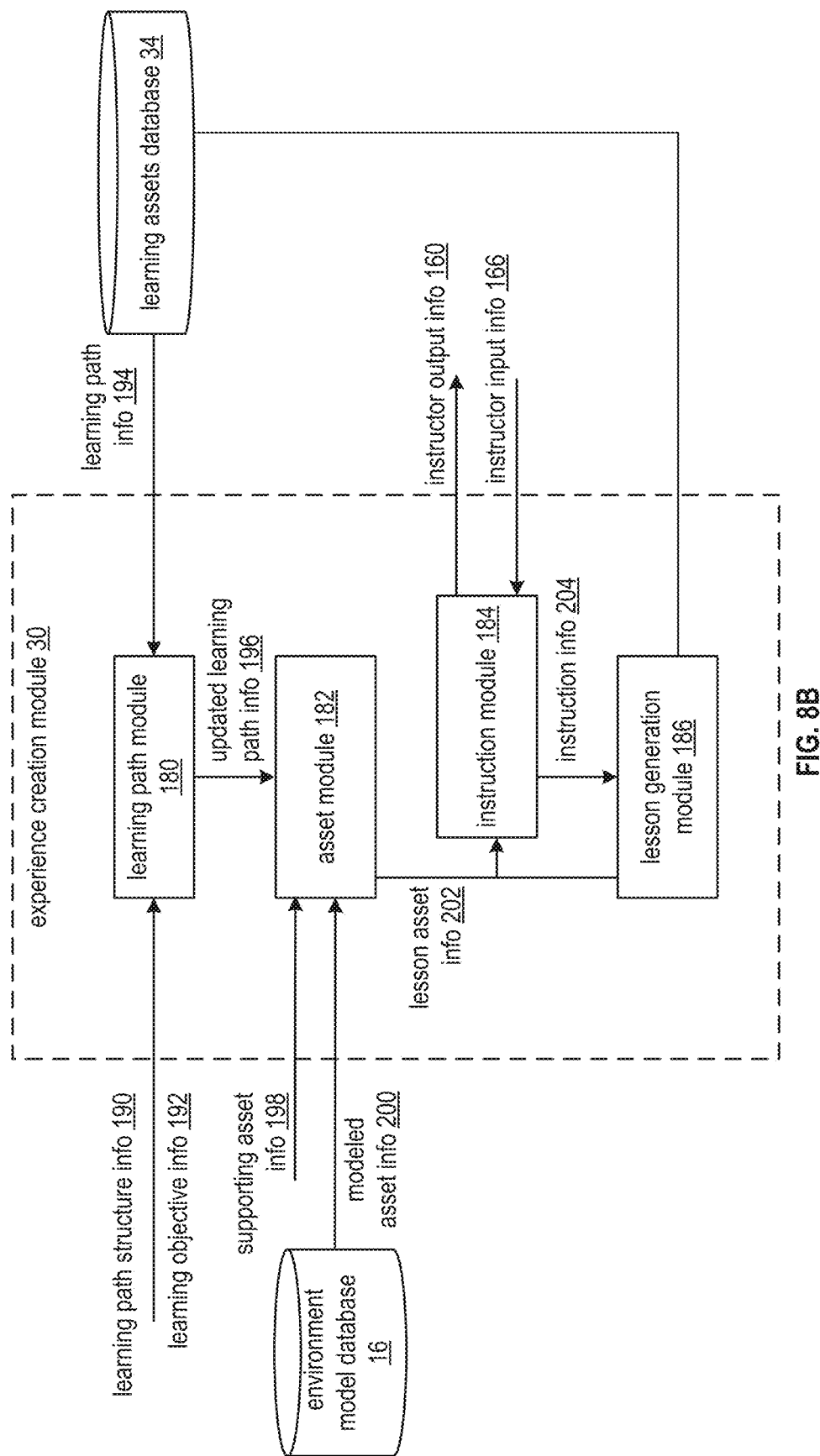
FIGS. 8A-8C are schematic block diagrams of another embodiment of a computing system illustrating an example of creating a learning experience in accordance with the present invention.
Figure 8C:
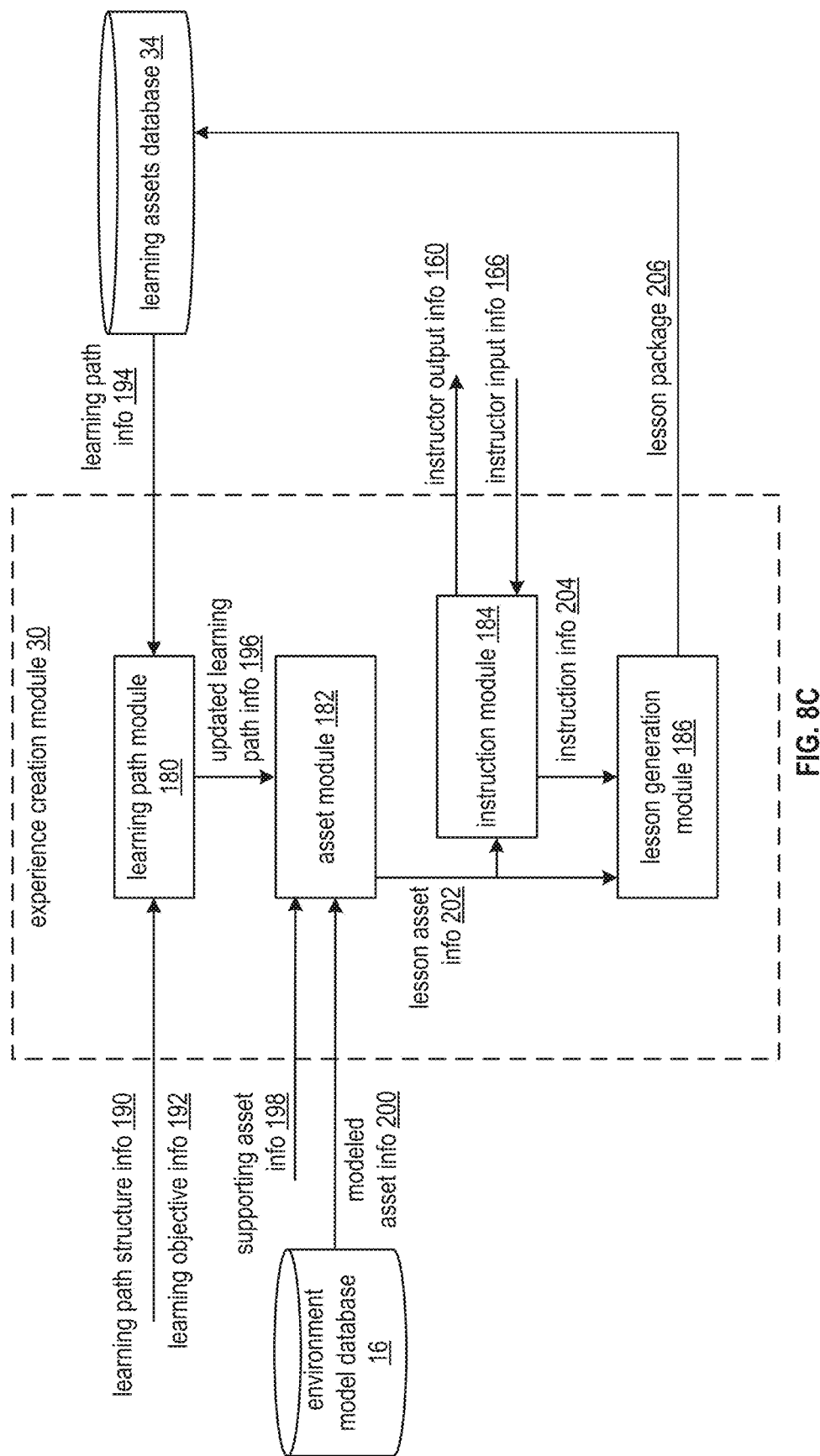

FIGS. 8A-8C are schematic block diagrams of another embodiment of a computing system illustrating an example of creating a learning experience. The computing system includes the environment model database 16, the experience creation module 30, and the learning assets database 34 of FIG. 1. The experience creation module 30 includes a learning path module 180, an asset module 182, an instruction module 184, and a lesson generation module 186.

In an example of operation, FIG. 8A illustrates the learning path module 180 determining a learning path (e.g., structure and ordering of learning objectives to complete towards a goal such as a certificate or degree) to include multiple modules and/or lessons. For example, the learning path module 180 obtains learning path information 194 from the learning assets database 34 and receives learning path structure information 190 and learning objective information 192 (e.g., from an instructor) to generate updated learning path information 196.

The learning path structure information 190 includes attributes of the learning path and the learning objective information 192 includes a summary of desired knowledge to impart. The updated learning path information 196 is generated to include modifications to the learning path information 194 in accordance with the learning path structure information 190 in the learning objective information 192.

The asset module 182 determines a collection of common assets for each lesson of the learning path. For example, the asset module 182 receives supporting asset information 198 (e.g., representation information of objects in the virtual space) and modeled asset information 200 from the environment model database 16 to produce lesson asset information 202. The modeled asset information 200 includes representations of an environment to support the updated learning path information 196 (e.g., modeled places and modeled objects) and the lesson asset information 202 includes a representation of the environment, learning path, the objectives, and the desired knowledge to impart.

FIG. 8B further illustrates the example of operation where the instruction module 184 outputs a representation of the lesson asset information 202 as instructor output information 160. The instructor output information 160 includes a representation of the environment and the asset so far to be experienced by an instructor who is about to input interactions with the environment to impart the desired knowledge.

The instruction module 184 receives instructor input information 166 from the instructor in response to the instructor output information 160. The instructor input information 166 includes interactions from the instructor to facilitate imparting of the knowledge (e.g., instructor annotations, pointer movements, highlighting, text notes, and speech) and testing of comprehension of the knowledge (e.g., valuation information such as questions and correct answers). The instruction module 184 obtains assessment information (e.g., comprehension test points, questions, correct answers to the questions) for each learning objective based on the lesson asset information 202 and produces instruction information 204 (e.g., representation of instructor interactions with objects within the virtual place, evaluation information).

FIG. 8C further illustrates the example of operation where the lesson generation module 186 renders (e.g., as a multi-dimensional representation) the objects associated with each lesson (e.g., assets of the environment) within the environment in accordance with the instructor interactions for the instruction portion and the assessment portion of the learning experience. Each object is assigned a relative position in XYZ world space within the environment to produce the lesson rendering.

The lesson generation module 186 outputs the rendering as a lesson package 206 for storage in the learning assets database 34. The lesson package 206 includes everything required to replay the lesson for a subsequent learner (e.g., representation of the environment, the objects, the interactions of the instructor during both the instruction and evaluation portions, questions to test comprehension, correct answers to the questions, a scoring approach for evaluating comprehension, all of the learning objective information associated with each learning objective of the lesson).

Figure 8D:
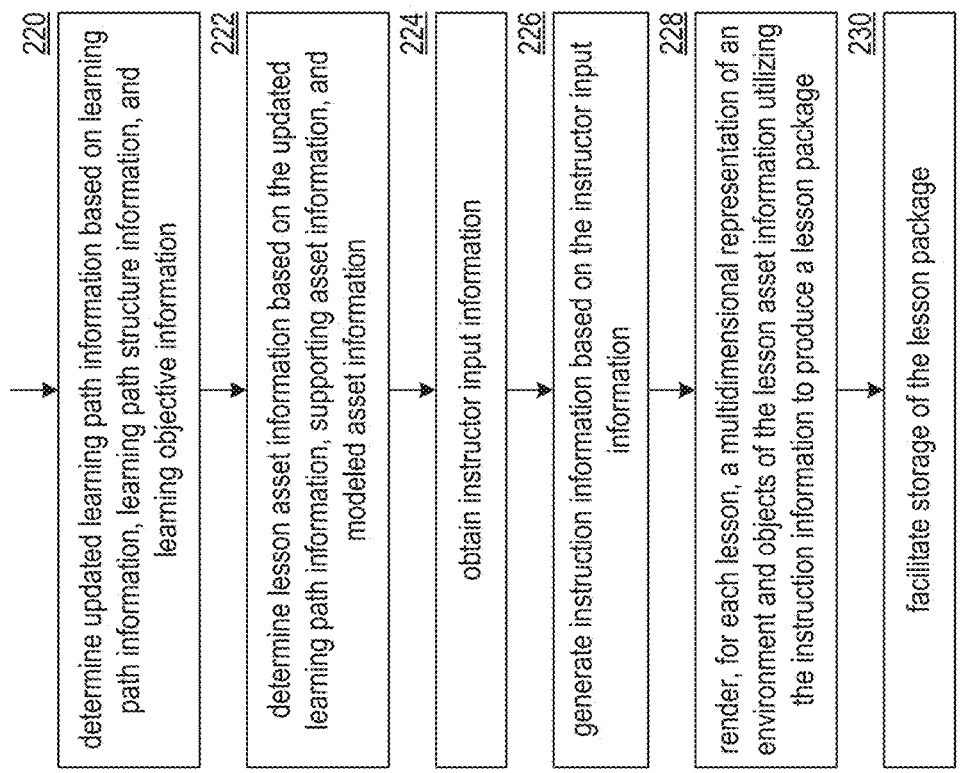
FIG. 8D is a logic diagram of an embodiment of a method for creating a learning experience within a computing system in accordance with the present invention.

FIG. 8D is a logic diagram of an embodiment of a method for creating a learning experience within a computing system (e.g., the computing system 10 of FIG. 1). In particular, a method is presented in conjunction with one or more functions and features described in conjunction with FIGS. 1-7B, and also FIGS. 8A-8C. The method includes step 220 where a processing module of one or more processing modules of one or more computing devices within the computing system determines updated learning path information based on learning path information, learning path structure information, and learning objective information. For example, the processing module combines a previous learning path with obtained learning path structure information in accordance with learning objective information to produce the updated learning path information (i.e., specifics for a series of learning objectives of a lesson).

The method continues at step 222 where the processing module determines lesson asset information based on the updated learning path information, supporting asset information, and modeled asset information. For example, the processing module combines assets of the supporting asset information (e.g., received from an instructor) with assets and a place of the modeled asset information in accordance with the updated learning path information to produce the lesson asset information. The processing module selects assets as appropriate for each learning objective (e.g., to facilitate the imparting of knowledge based on a predetermination and/or historical results).

The method continues at step 224 where the processing module obtains instructor input information. For example, the processing module outputs a representation of the lesson asset information as instructor output information and captures instructor input information for each lesson in response to the instructor output information. Further obtain asset information for each learning objective (e.g., extract from the instructor input information).

The method continues at step 226 where the processing module generates instruction information based on the instructor input information. For example, the processing module combines instructor gestures and further environment manipulations based on the assessment information to produce the instruction information.

The method continues at step 228 where the processing module renders, for each lesson, a multidimensional representation of environment and objects of the lesson asset information utilizing the instruction information to produce a lesson package. For example, the processing module generates the multidimensional representation of the environment that includes the objects and the instructor interactions of the instruction information to produce the lesson package. For instance, the processing module includes a 3-D rendering of a place, background objects, recorded objects, and the instructor in a relative position XYZ world space over time.

The method continues at step 230 where the processing module facilitates storage of the lesson package. For example, the processing module indexes the one or more lesson packages of the one or more lessons of the learning path to produce indexing information (e.g., title, author, instructor identifier, topic area, etc.). The processing module stores the indexed lesson package as learning asset information in a learning assets database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 8E, 8F, 8G, 8H, 8J, and 8K are schematic block diagrams of another embodiment of a computing system illustrating another example of a method to create a learning experience. The embodiment includes creating a multi-disciplined learning tool regarding a topic. The multi-disciplined aspect of the learning tool includes both disciplines of learning and any form/format of presentation of content regarding the topic. For example, a first discipline includes mechanical systems, a second discipline includes electrical systems, and a third discipline includes fluid systems when the topic includes operation of a combustion based engine. The computing system includes the environment model database 16 of FIG. 1, the learning assets database 34 of FIG. 1, and the experience creation module 30 of FIG. 1.

Figure 8E:
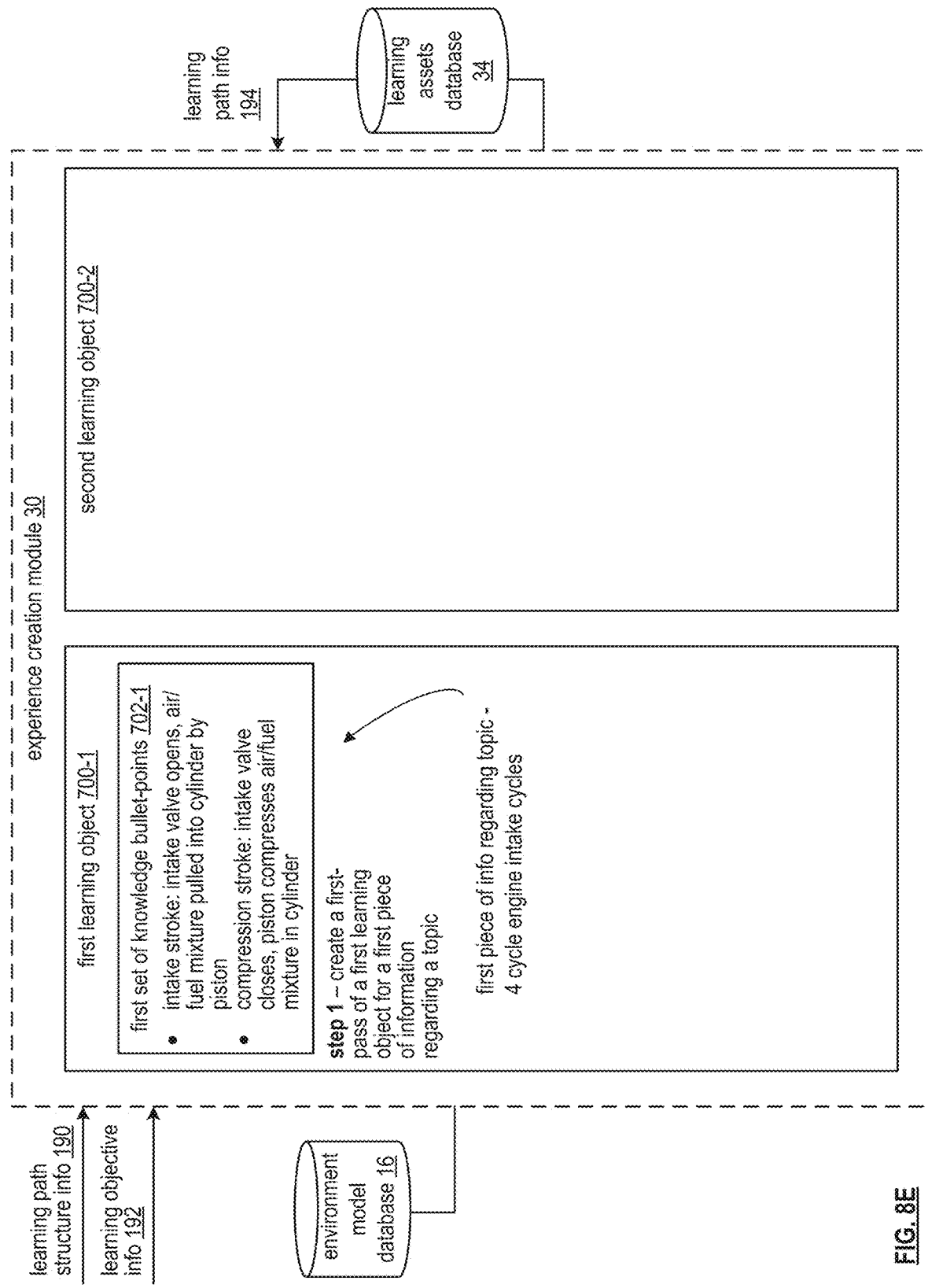

FIG. 8E illustrates the example of operation where the experience creation module 30 creates a first-pass of a first learning object 700-1 for a first piece of information regarding the topic to include a first set of knowledge bullet-points 702-1 regarding the first piece of information. The creating includes utilizing guidance from an instructor and/or reusing previous knowledge bullet-points for a related topic. For example, the experience creation module 30 extracts the bullet-points from one or more of learning path structure information 190 and learning objective information 192 when utilizing the guidance from the instructor. As another example, the experience creation module 30 extracts the bullet-points from learning path information 194 retrieved from the learning assets database 34 when utilizing previous knowledge bullet points for the related topic.

Each piece of information is to impart additional knowledge related to the topic. The additional knowledge of the piece of information includes a characterization of learnable material by most learners in just a few minutes. As a specific example, the first piece of information includes "4 cycle engine intake cycles" when the topic includes "how a 4 cycle engine works."

Each of the knowledge bullet-points are to impart knowledge associated with the associated piece of information in a logical (e.g., sequential) and knowledge building fashion. As a specific example, the experience creation module 30 creates the first set of knowledge bullet-points 702-1 based on instructor input to include a first bullet point "intake stroke: intake valve opens, air/fuel mixture pulled into cylinder by piston" and a second bullet point "compression stroke: intake valve closes, piston compresses air/fuel mixture in cylinder" when the first piece of information includes the "4 cycle engine intake cycles."

Figure 8F:
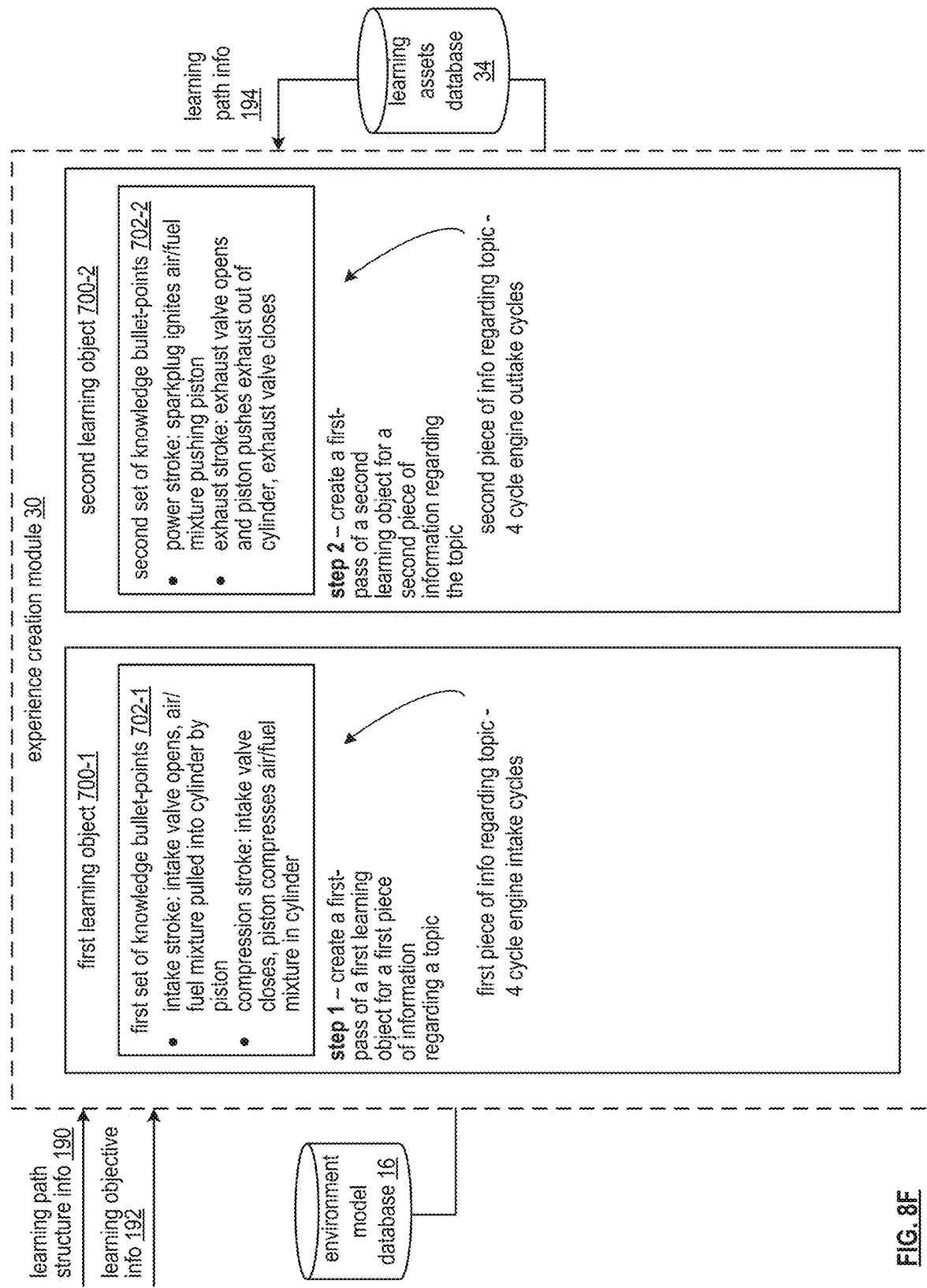

FIG. 8F further illustrates the example of operation where the experience creation module 30 creates a first-pass of a second learning object 700-2 for a second piece of information regarding the topic to include a second set of knowledge bullet-points 702-2 regarding the second piece of information. As a specific example, the experience creation module 30 creates the second set of knowledge bullet-points 702-2 based on the instructor input to include a first bullet point "power stroke: spark plug ignites air/fuel mixture pushing piston" and a second bullet point "exhaust stroke: exhaust valve opens and piston pushes exhaust out of cylinder, exhaust valve closes" when the second piece of information includes "4 cycle engine outtake cycles."

Figure 8G:
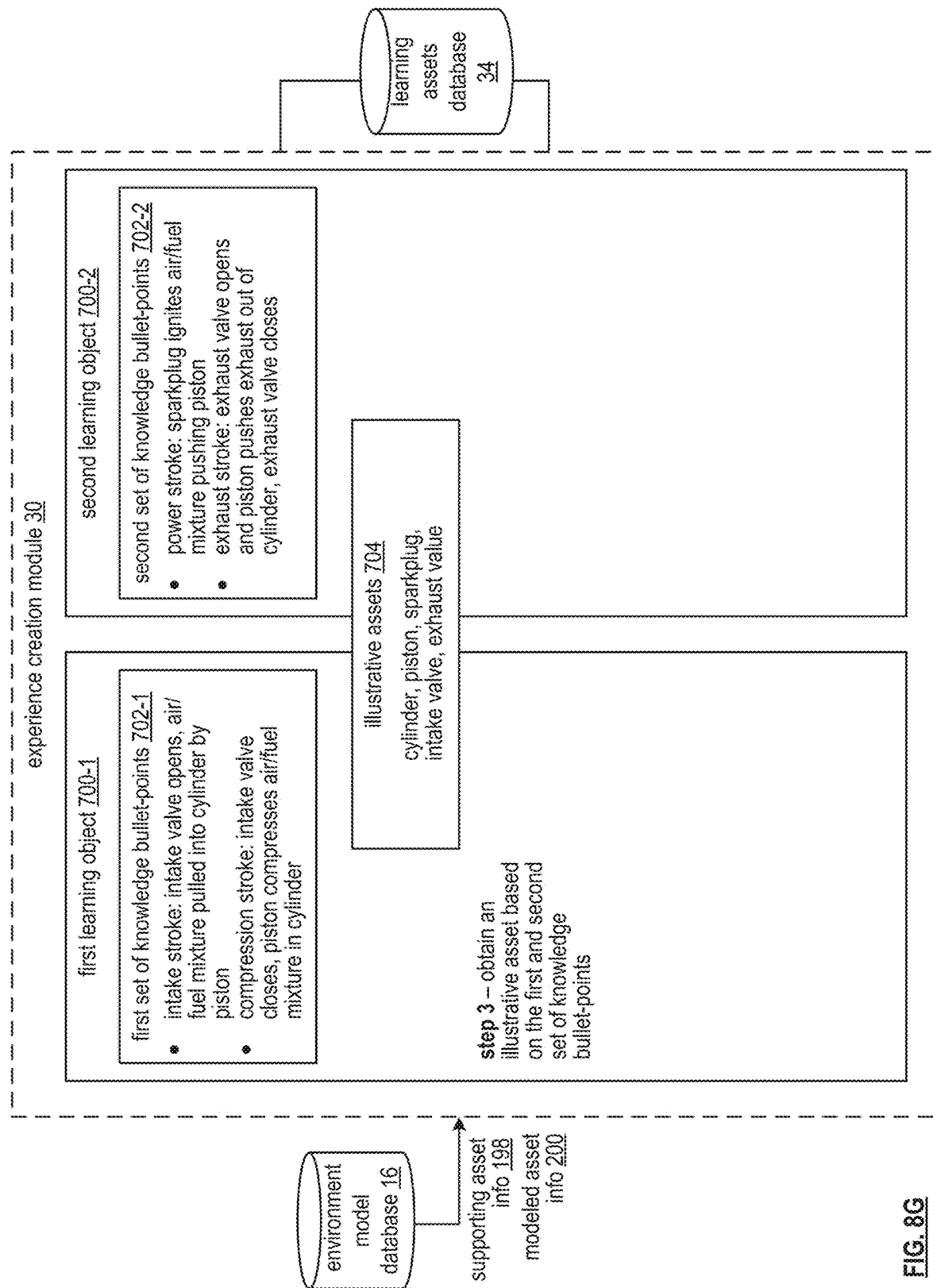

FIG. 8G further illustrates the example of operation where the experience creation module 30 obtains illustrative assets 704 based on the first and second set of knowledge bullet-points 702-1 and 702-2. The illustrative assets 704 depicts one or more aspects regarding the topic pertaining to the first and second pieces of information. Examples of illustrative assets includes background environments, objects within the environment (e.g., things, tools), where the objects and the environment are represented by multidimensional models (e.g., 3-D model) utilizing a variety of representation formats including video, scans, images, text, audio, graphics etc.

The obtaining of the illustrative assets 704 includes a variety of approaches. A first approach includes interpreting instructor input information to identify the illustrative asset. For example, the experience creation module 30 interprets instructor input information to identify a cylinder asset.

A second approach includes identifying a first object of the first and second set of knowledge bullet-points as an illustrative asset. For example, the experience creation module 30 identifies the piston object from both the first and second set of knowledge bullet-points.

A third approach includes determining the illustrative assets 704 based on the first object of the first and second set of knowledge bullet-points. For example, the experience creation module 30 accesses the environment model database 16 to extract information about an asset from one or more of supporting asset information 198 and modeled asset information 200 for a sparkplug when interpreting the first and second set of knowledge bullet-points.

Figure 8H:
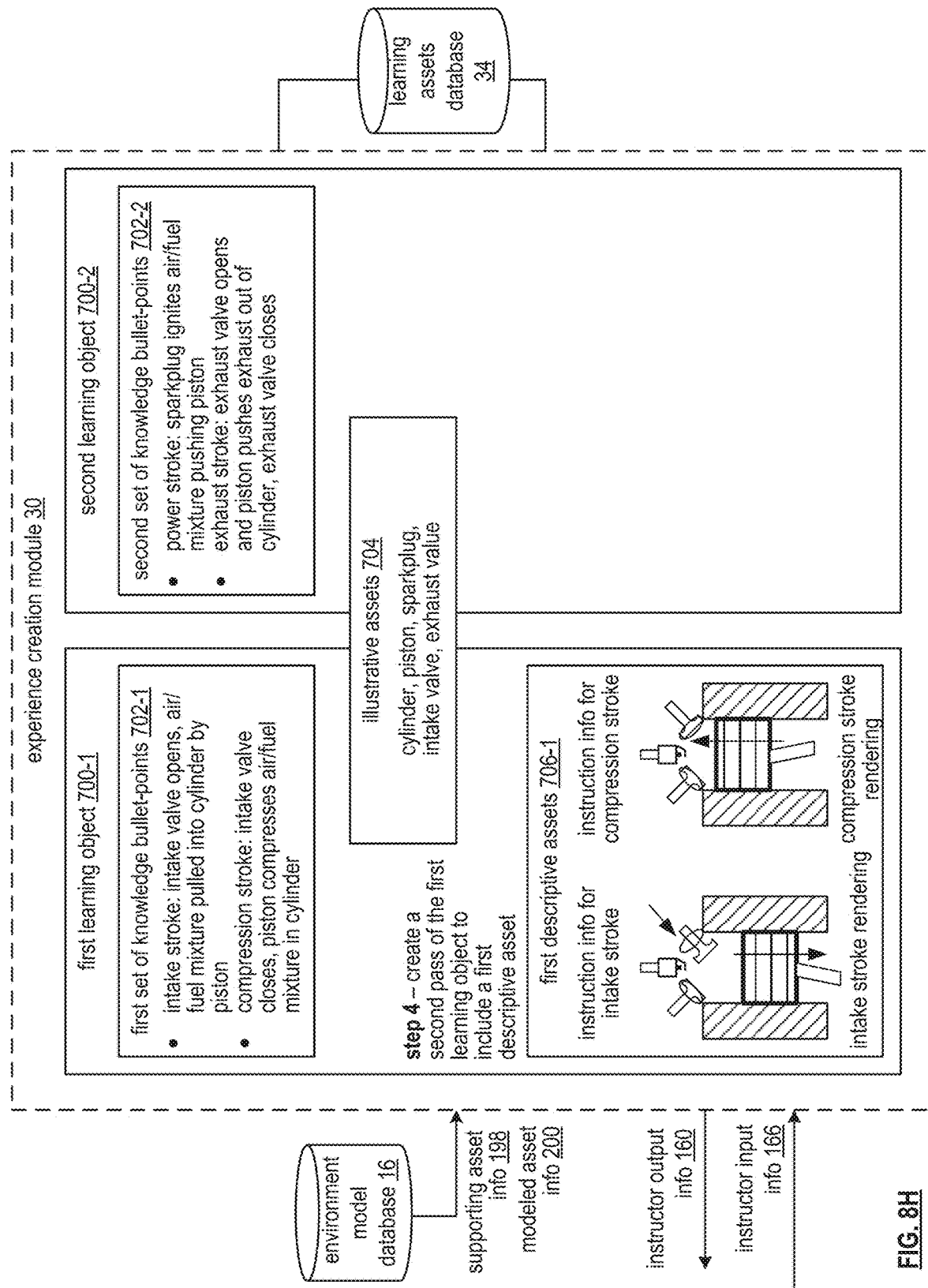

FIG. 8H further illustrates the example of operation where the experience creation module 30 creates a second-pass of the first learning object 700-1 to further include first descriptive assets 706-1 regarding the first piece of information based on the first set of knowledge bullet-points 702-1 and the illustrative assets 704. Descriptive assets include instruction information that utilizes the illustrative asset 704 to impart knowledge and subsequently test for knowledge retention. The embodiments of the descriptive assets includes multiple disciplines and multiple dimensions to provide improved learning by utilizing multiple senses of a learner. Examples of the instruction information includes annotations, actions, motions, gestures, expressions, recorded speech, speech inflection information, review information, speaker notes, and assessment information.

The creating the second-pass of the first learning object 700-1 includes generating a representation of the illustrative assets 704 based on a first knowledge bullet-point of the first set of knowledge bullet-points 702-1. For example, the experience creation module 30 renders 3-D frames of a 3-D model of the cylinder, the piston, the spark plug, the intake valve, and the exhaust valve in motion when performing the intake stroke where the intake valve opens and the air/fuel mixture is pulled into the cylinder by the piston.

The creating of the second-pass of the first learning object 700-1 further includes generating the first descriptive assets 706-1 utilizing the representation of the illustrative assets 704. For example, the experience creation module 30 renders 3-D frames of the 3-D models of the various engine parts without necessarily illustrating the first set of knowledge bullet-points 702-1.

In an embodiment where the experience creation module 30 generates the representation of the illustrative assets 704, the experience creation module 30 outputs the representation of the illustrative asset 704 as instructor output information 160 to an instructor. For example, the 3-D model of the cylinder and associated parts.

The experience creation module 30 receives instructor input information 166 in response to the instructor output information 160. For example, the instructor input information 166 includes instructor annotations to help explain the intake stroke (e.g., instructor speech, instructor pointer motions). The experience creation module 30 interprets the instructor input information 166 to produce the first descriptive assets 706-1. For example, the renderings of the engine parts include the intake stroke as annotated by the instructor.

Figure 8J:
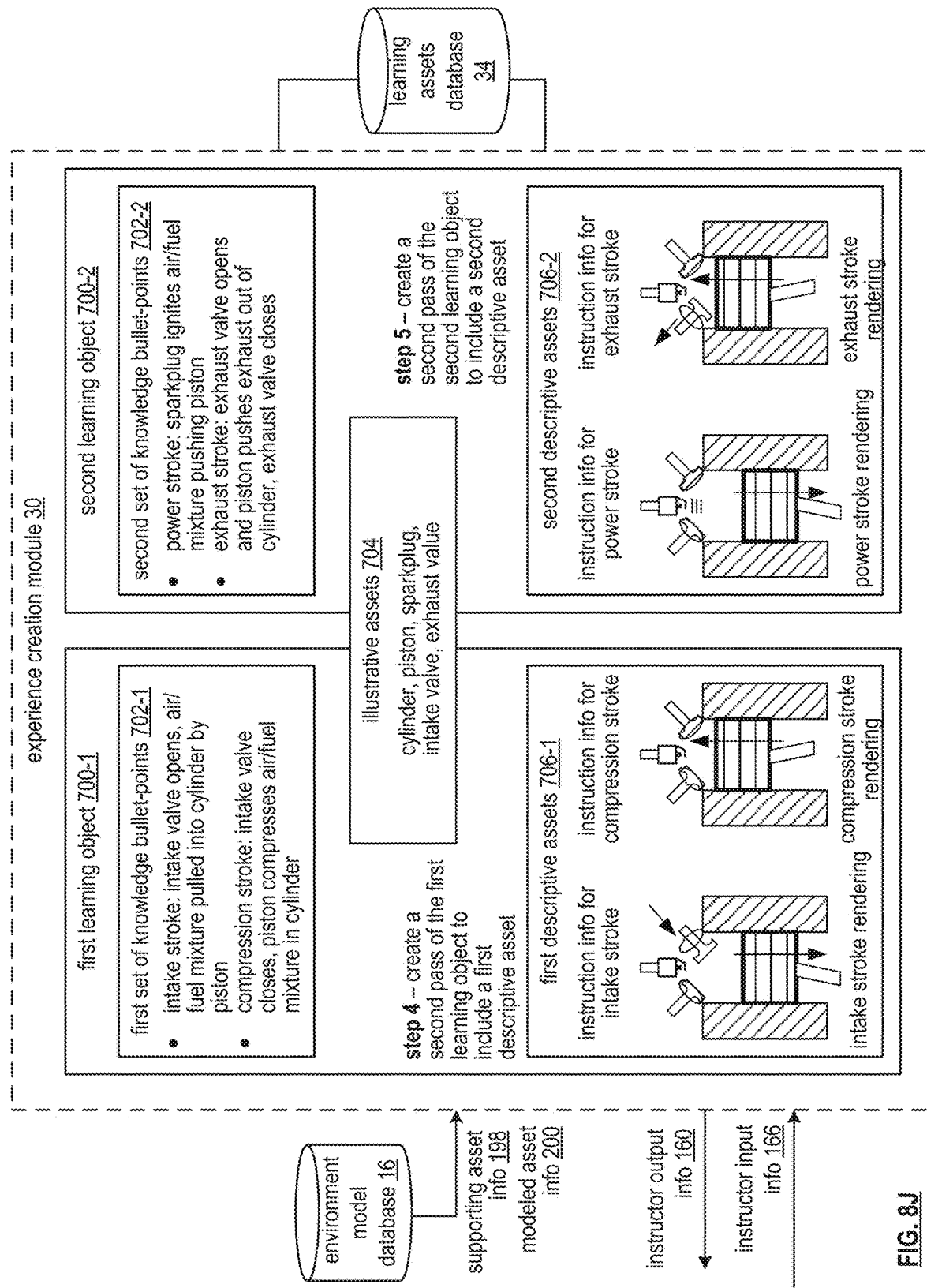

FIG. 8J further illustrates the example of operation where the experience creation module 30 creates a second-pass of the second learning object 700-2 to further include second descriptive assets 706-2 regarding the second piece of information based on the second set of knowledge bullet-points 702-2 and the illustrative assets 704. For example, the experience creation module 30 creates 3-D renderings of the power stroke and the exhaust stroke as annotated by the instructor based on further instructor input information 166.

Figure 8K:
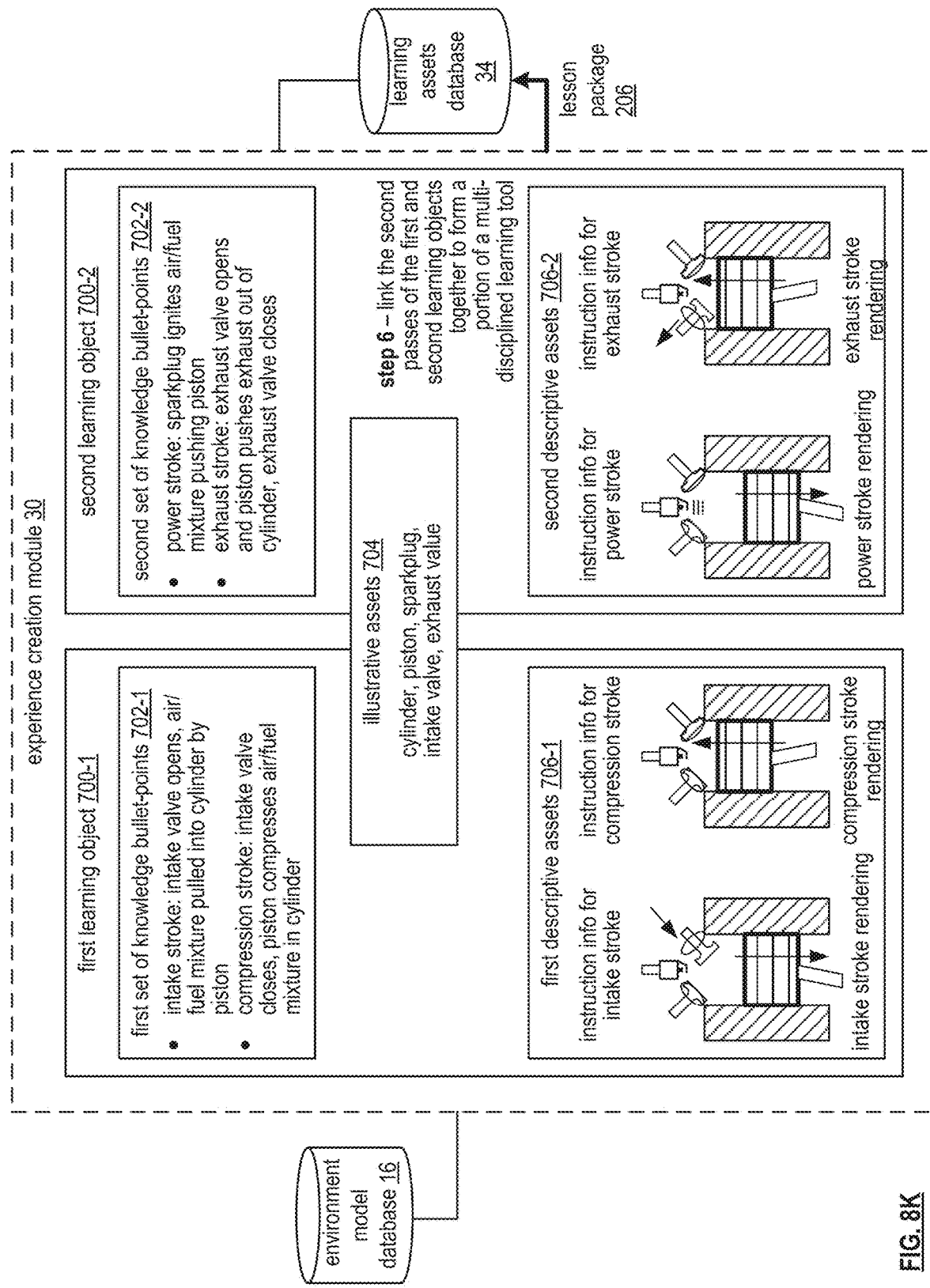

FIG. 8K further illustrates the example of operation where the experience creation module 30 links the second-passes of the first and second learning objects 700-1 and 700-2 together to form at least a portion of the multi-disciplined learning tool. For example, the experience creation module 30 aggregates the first learning object 700-1 and the second learning object 700-2 to produce a lesson package 206 for storage in the learning assets database 34.

In an embodiment, the linking of the second-passes of the first and second learning objects 700-1 and 700-2 together to form the at least the portion of the multi-disciplined learning tool includes generating index information for the second-passes of first and second learning objects to indicate sharing of the illustrative asset 704. For example, the experience creation module 30 generates the index information to identify the first learning object 700-1 and the second learning object 700-2 as related to the same topic.

The linking further includes facilitating storage of the index information and the first and second learning objects 700-1 and 700-2 in the learning assets database 34 to enable subsequent utilization of the multi-disciplined learning tool. For example, the experience creation module 30 aggregates the first learning object 700-1, the second learning object 700-2, and the index information to produce the lesson package 206 for storage in the learning assets database 34.

The method described above with reference to FIGS. 8E-8K in conjunction with the experience creation module 30 can alternatively be performed by other modules of the computing system 10 of FIG. 1 or by other devices including various embodiments of the computing entity 20 of FIG. 2A. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing entities of the computing system 10, cause boy one or more computing devices to perform any or all of the method steps described above.

FIGS. 9A, 9B, 9C, and 9D are schematic block diagrams of an embodiment of a computing system illustrating an example of creating a lesson package. The computing system includes the experience creation module 30 of FIG. 1 and the learning assets database 34 of FIG. 1.

Figure 9A:
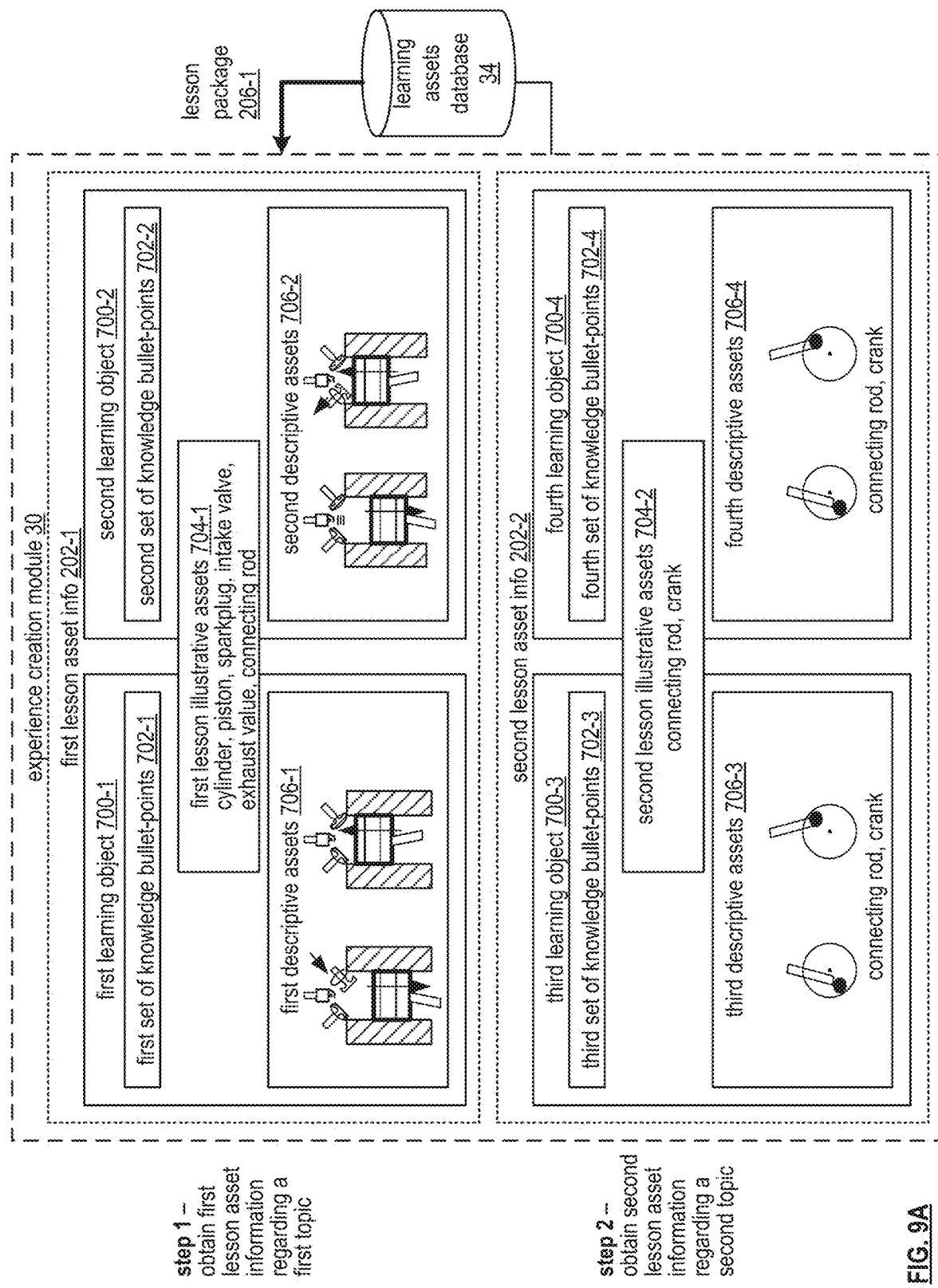

FIG. 9A illustrates an example of operation of steps of a method for creating a lesson package for a multi-disciplined learning tool regarding first and second topics, where, in a first step, the experience creation module 30 obtains first lesson asset information 202-1 regarding the first topic. The experience creation module 30 obtains first lesson asset information 202-1 regarding the first topic by at least one of generating the first lesson asset information 202-1 as previously discussed and extracting the first lesson asset information 202-1 from a lesson package 206-1 recovered from the learning assets database 34.

The first lesson asset information 202-1 is regarding the first topic that includes operation of a piston within a cylinder of an engine. The first lesson asset information 202-1 includes a first learning object 700-1 and a second learning object 700-2. The first learning object 700-1 includes a first set of knowledge bullet-points 702-1 for a first piece of information regarding the first topic. For example, the first piece of information regarding the first topic includes piston and valve operation during intake and compression strokes of the engine.

The second learning object 700-2 includes a second set of knowledge bullet-points 702-2 for a second piece of information regarding the first topic. For example, the second piece of information regarding the first topic includes piston and valve operation during power and exhaust strokes of the engine.

The first learning object 700-1 and the second learning object 700-2 further include a first lesson illustrative asset 704-1 that depicts an aspect regarding the first topic pertaining to the first and second pieces of information. For example, first lesson illustrative assets 704-1 includes those assets associated with the first learning object 700-1 and the second learning object 700-2, where at least one asset is common to both the first and second learning objects. For instance, first lesson illustrative assets 704-1 includes assets for a cylinder, a piston, a spark plug, and intake valve, and exhaust valve, and a connecting rod.

The first learning object 700-1 further includes a first descriptive asset 706-1 regarding the first piece of information based on the first set of knowledge bullet-points 702-1 and the first lesson illustrative asset 704-1. For example, first descriptive assets 706-1 illustrate the operation of the piston and valves of the engine for the intake and compression strokes to illustrate the first set of knowledge bullet points 702-1 utilizing the first lesson illustrative assets 704-1.

The second learning object 700-2 further includes a second descriptive asset 706-2 regarding the second piece of information based on the second set of knowledge bullet-points 702-2 and the first lesson illustrative asset 704-1. For example, second descriptive assets 706-2 illustrate the operation of the piston and valves of the engine for the power and exhaust strokes to illustrate the second set of knowledge bullet-points 702-2 utilizing the first lesson illustrative assets 704-1.

Having obtained the first lesson asset information 202-1 regarding the first topic, in a second step of the example method for creating the lesson package for the multi-disciplined learning tool regarding the first and second topics, the experience creation module 30 obtains second lesson asset information 202-2 regarding the second topic. The experience creation module 30 obtains the second lesson asset information 202-2 regarding the second topic by at least one of generating the second lesson asset information 202-2 and extracting the second lesson asset information 202-2 from the lesson package 206-1 recovered from the learning assets database 34.

As an example of generating the second lesson asset information 202-2, the experience creation module 30 generates the third learning object 700-3 and the fourth learning object 700-4 based on the first learning object 700-1 and the second learning object 700-2, where the aspect regarding the second topic is associated with the aspect regarding the first topic. For example, the experience creation module 30 generates the third learning object 700-3 and the fourth learning object 700-4 to further illustrate operation of the engine with regards to the connecting rod and a crank, where the connecting rod is common to the third and fourth learning objects and to the first and second learning objects.

The second lesson asset information 202-2 is regarding the second topic that includes operation of the connecting rod and a crank of the engine. The second lesson asset information 202-2 includes a third learning object 700-3 and a fourth learning object 700-4. The third learning object 700-3 includes a third set of knowledge bullet-points points 702-3 for a third piece of information regarding the second topic. For example, the third piece of information regarding the second topic includes connecting rod and crank operation during the intake and compression strokes of the engine.

The fourth learning object 700-4 includes a fourth set of knowledge bullet-points 702-4 for a fourth piece of information regarding the second topic. For example, the fourth piece of information regarding the second topic includes connecting rod and crank operation during the power and exhaust strokes of the engine.

The third learning object 700-3 and the fourth learning object 700-4 further include a second lesson illustrative asset 704-2 that depicts an aspect regarding the second topic pertaining to the third and fourth pieces of information. For example, second lesson illustrative assets 704-2 includes those assets associated with the third learning object 700-3 and the fourth learning object 700-4, where at least one asset is common to both the third and fourth learning objects. For instance, second lesson illustrative assets 704-2 includes assets for the connecting rod and crank.

The third learning object 700-3 further includes a third descriptive asset 706-3 regarding the third piece of information based on the third set of knowledge bullet-points 702-3 and the second lesson illustrative asset 704-2. For example, third descriptive assets 706-3 illustrate the operation of the connecting rod and crank of the engine for the intake and compression strokes to illustrate the third set of knowledge bullet-points 702-3 utilizing the second lesson illustrative assets 704-2.

The fourth learning object 700-4 further includes a fourth descriptive asset 706-4 regarding the fourth piece of information based on the fourth set of knowledge bullet-points 702-4 and the second lesson illustrative asset 704-2. For example, fourth descriptive assets 706-4 illustrate the operation of the connecting rod and crank of the engine for the power and exhaust strokes to illustrate the fourth set of knowledge bullet-points 702-4 utilizing the second lesson illustrative assets 704-2.

Figure 9B:
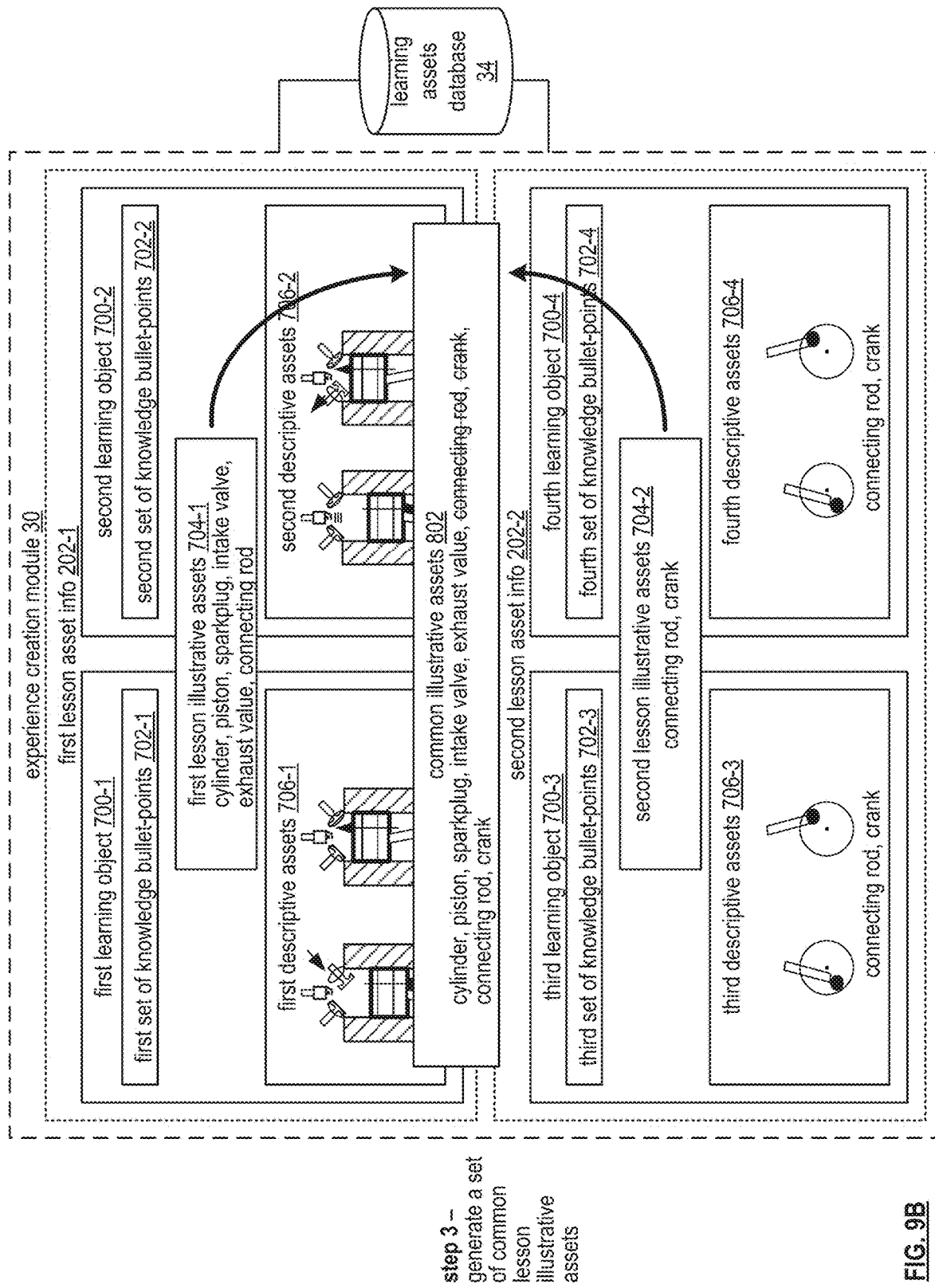

FIG. 9B further illustrates the example of operation of the steps of the method for creating the lesson package where, having obtained the first and second lesson asset information, in a third step, the experience creation module 30 generates a set of common lesson illustrative assets 802 based on the first lesson illustrative asset 704-1 and the second lesson illustrative asset 704-2. The generating the set of common lesson illustrative assets 802 includes a series of sub-steps.

A first sub-step includes establishing the set of common lesson illustrative assets 802 to include the first and second lesson illustrative assets. For example, the experience creation module 30 imports the first lesson illustrative asset 704-1 (e.g., just one asset such as the piston) and the second lesson illustrative asset 704-2 (e.g., just another one such as the connecting rod) to produce the common lesson illustrative asset 802. A second sub-step includes updating the set of common lesson illustrative assets 802 to further include another illustrative asset associated with the first lesson illustrative asset 704-1. For example, the experience creation module 30 imports all remaining assets of the first lesson illustrative assets 704-1 (e.g., cylinder, spark plug, intake valve, exhaust valve, and connecting rod).

A third sub-step of the generating of the set of common lesson illustrative assets 802 includes updating the set of common lesson illustrative assets 802 to further include yet another illustrative asset associated with the second lesson illustrative asset 704-2. For example, the experience creation module 30 imports all remaining assets of the second lesson illustrative assets 704-2 (e.g., the crank).

When the set of common lesson illustrative assets 802 includes a redundant lesson illustrative asset (e.g., the connecting rod), the generating of the set of common lesson illustrative assets 802 further includes a fourth sub-step that includes updating the set of common lesson illustrative assets 802 to eliminate the redundant lesson illustrative asset. For example, the experience creation module 30 eliminates redundant assets for the connecting rod.

Figure 9C:
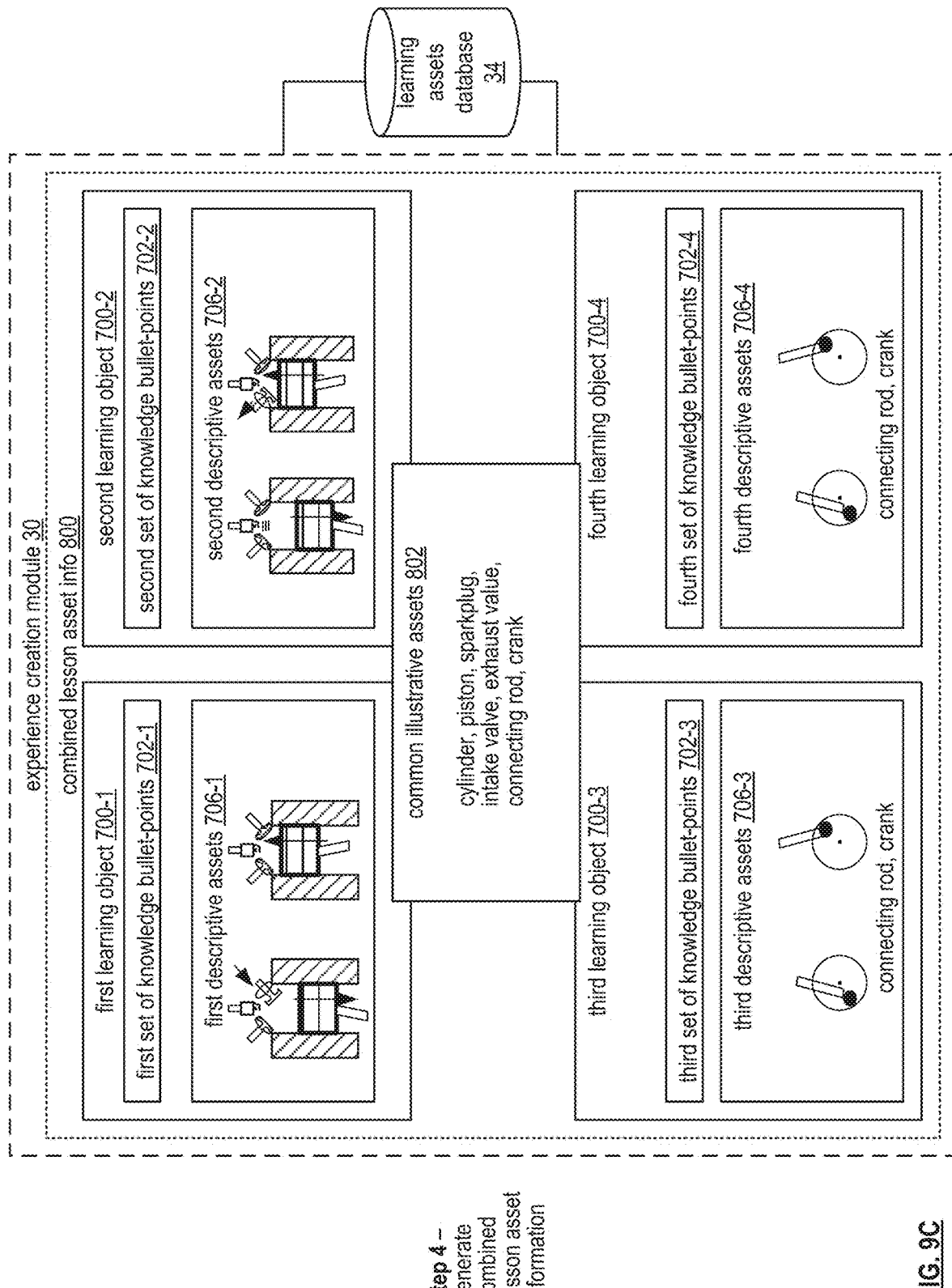

FIG. 9C further illustrates the example of operation of the steps of the method for creating the lesson package where, having produced the set of common lesson illustrative assets 802, in a fourth step, the experience creation module 30 generates combined lesson asset information 800 regarding the first and second topics utilizing the common lesson illustrative assets 802. The combined lesson asset information 800 includes a representation of the first learning object 700-1, the second learning object 700-2, the third learning object 700-3, and the fourth learning object 700-4.

The generating of the combined lesson asset information 800 regarding the first and second topics includes establishing the combined lesson asset information 800 to include the first learning object 700-1, the second learning object 700-2, the third learning object 700-3, and the fourth learning object 700-4.

Figure 9D:
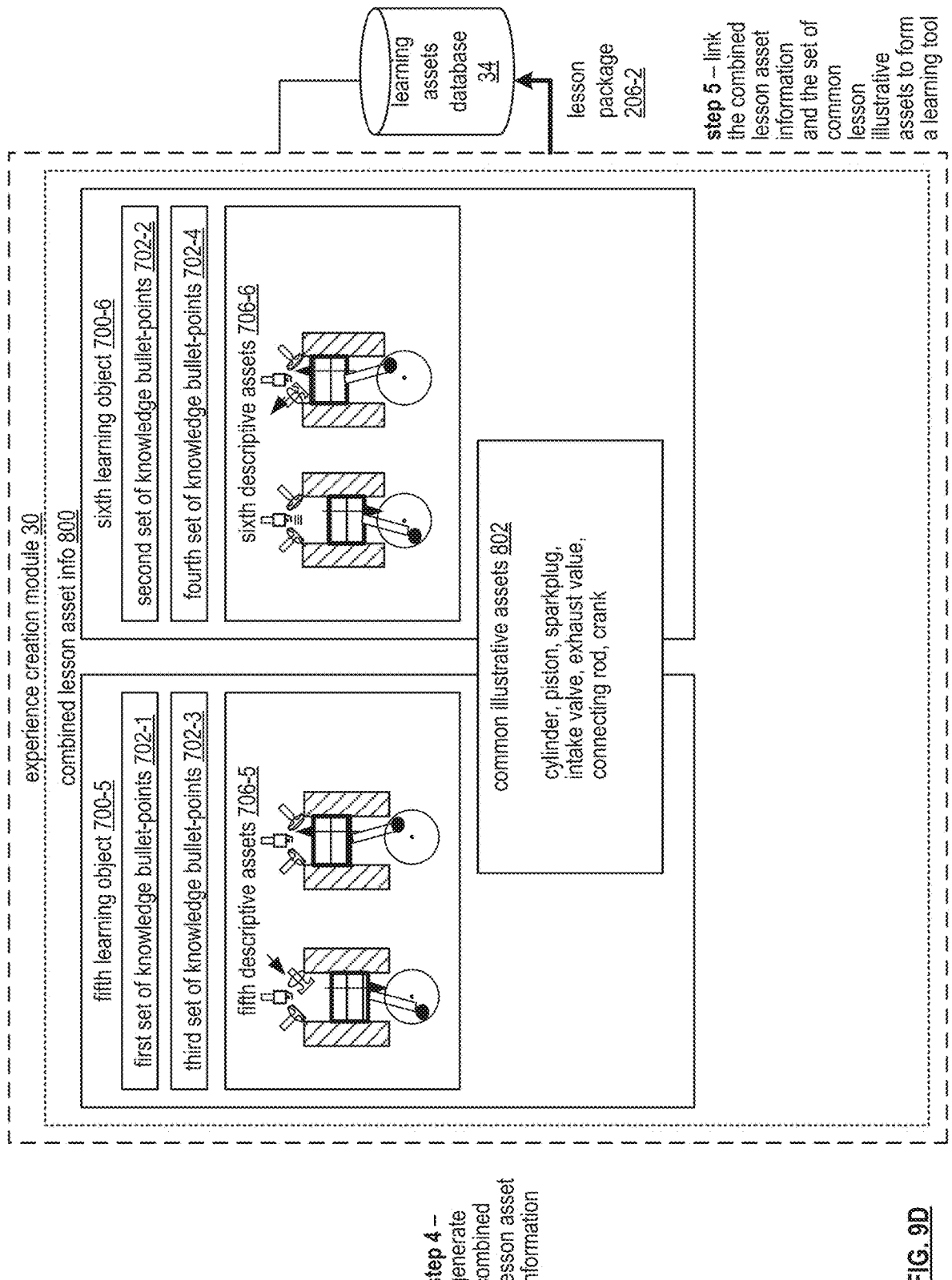

FIG. 9D further illustrates the example of operation of the steps of the method for creating the lesson package where, having produce the set of common lesson illustrative assets 802, in a fifth step (e.g., as an additional step to step 4 or as an alternative step to step 4), the experience creation module 30 generates the combined lesson asset information 800 regarding the first and second topics by one or more of a variety of steps. A first step of the variety of steps includes generating a fifth learning object 700-5 to include the first and third learning objects. The fifth learning object 700-5 includes the first set of knowledge bullet-points 702-1 and the third set of knowledge bullet-points points 702-3.

A second step of the variety of steps includes generating a sixth learning object 700-6 to include the second and fourth learning objects. The sixth learning object 700-6 includes the second set of knowledge bullet-points 702-2 and the fourth set of knowledge bullet-points points 7 2-4.

A third step of the variety of steps includes generating a fifth descriptive asset 706-5 for the fifth learning object 700-5 based on the first set of knowledge bullet-points 702-1, the third set of knowledge bullet-points points 702-3, and the set of common lesson illustrative assets 802. For example, the experience creation module 30 generates the fifth descriptive asset 706-5 to illustrate the operation of the engine including all of the assets for the intake and compression strokes.

A fourth step of the variety of steps includes generating a sixth descriptive asset 706-6 for the sixth learning object 700-6 based on the second set of knowledge bullet-points 702-2, the fourth set of knowledge bullet-points 702-4, and the set of common lesson illustrative assets 802. For example, the experience creation module 30 generates the sixth descriptive asset 706-6 to illustrate the operation of the engine including all of the assets for the power and exhaust strokes.

Having generated the combined lesson asset information 800, in a fifth step of the in a second step of the example method for creating the lesson package for the multi-disciplined learning tool regarding the first and second topics, the experience creation module 30 links the combined lesson asset information 800 and the set of common lesson illustrative assets 802 to form at least a portion of the multi-disciplined learning tool. For example, the experience creation module 30 aggregates the combined lesson asset information 800 and the set of common lesson illustrative assets 802 to produce a lesson package 206 for storage in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth memory element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 10A, 10B, 10C, 10D, and 10E are schematic block diagrams of an embodiment of a computing system illustrating an example of creating updated learning path information. The computing system includes the experience creation module 30 of FIG. 1 and the learning assets database 34 of FIG. 1. The experience creation module 30 includes the learning path module 180 of FIG. 8A.

Figure 10A:
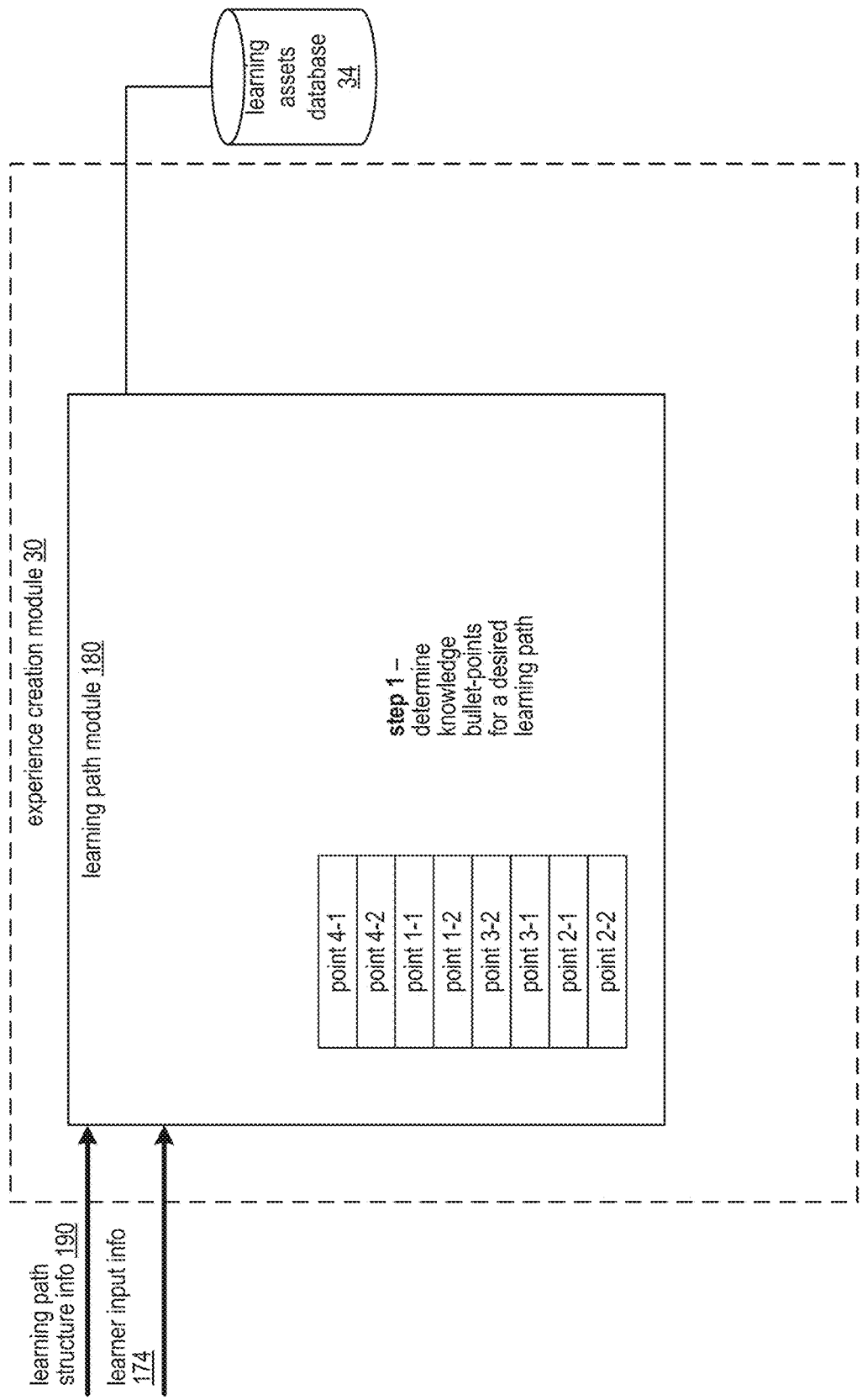

FIG. 10A illustrates a method of operation where in a first step the experience creation module 30 determines knowledge bullet-points for a desired learning path. In a first example, the experience creation module 30 recovers the knowledge bullet-points from the learning assets database 34. In a second example, the experience creation module 30 generates the knowledge bullet-points based on learning path structure information 190 and/or learner input information 174. For instance, the experience creation module 30 extracts knowledge bullet-points as specified by an instructor from the learning path structure information 190. In another instance, the experience creation module 30 extracts further knowledge bullet-points as desired by a student from the learner input information 174 (e.g., expressions of desired learnings, learning objective requirements, interests, previous lessons, explicit new learning objective requirements, etc.).

Figure 10B:
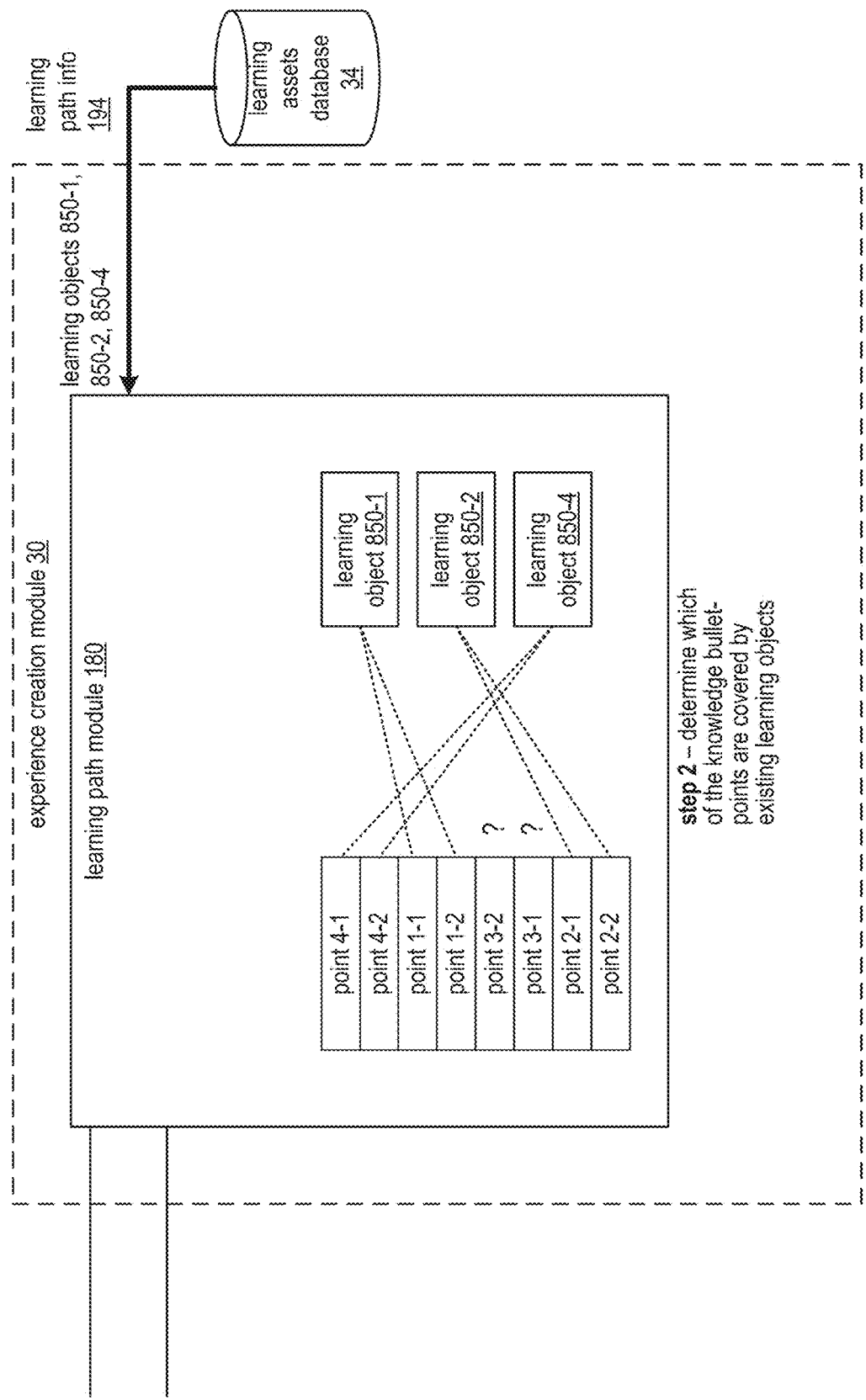

FIG. 10B further illustrates the method of operation where, having determined the knowledge bullet-points, in a second step the experience creation module 30 determines which of the knowledge bullet-points are covered by existing learning objects. For example, the learning path module 180 compares the knowledge bullet-points to knowledge bullet-points extracted from learning path information 194 recovered from the learning assets database 34 to identify learning objects already available from the learning assets database 34. For instance, the learning path module 180 identifies learning objects 850-1, 850-2, and 850-4 that include knowledge bullet-points that compare favorably to the knowledge bullet-points determined in the preceding step.

During the step of identifying which of the knowledge bullet-points compared to those stored in learning objects of the learning assets database 34, the learning path module 180 may identify knowledge bullet-points that do not favorably map to those stored in the learning assets database 34. Such orphaned knowledge bullet-points will require further steps for support as discussed below.

FIG. 10C further illustrates the method of operation where, having determined which of the knowledge bullet-points are covered by the existing learning objects, in a third step the experience creation module 30 determines a learning path that includes the existing learning objects. For example, the learning path module 180 arranges the identified learning objects 850-1, 850-2, and 850-4 as part of the learning path. Note that the knowledge bullet-points 3-2 and 3-1 at this point do not map to an existing learning object.

Figure 10D:
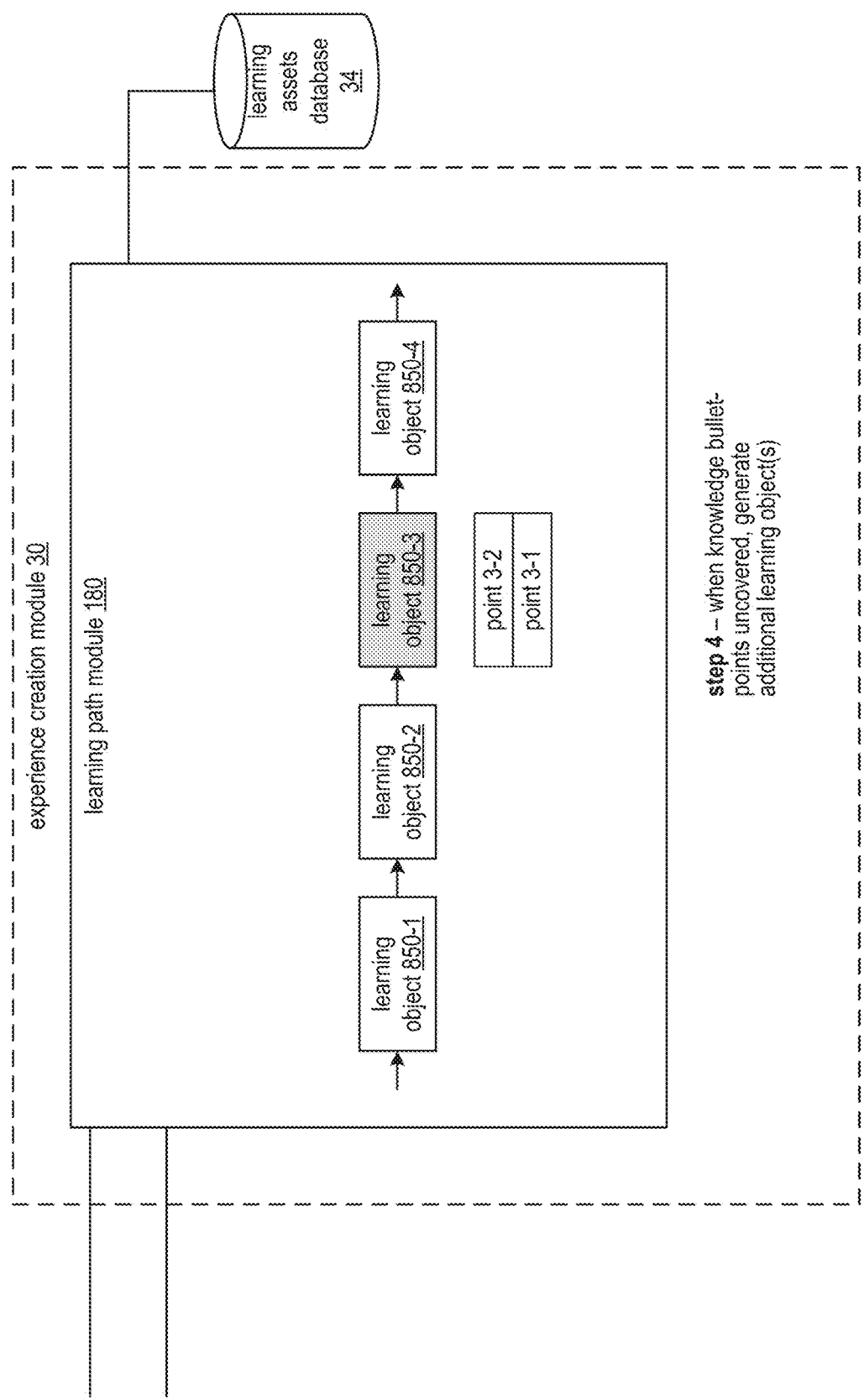

FIG. 10D further illustrates the method of operation where, when a particular knowledge bullet-point is uncovered, in a fourth step the experience creation module 30 generates an additional learning object. For example, the learning path module 180 generates a learning object 850-3 based on the knowledge bullet-points 3-2 and 3-1 as previously discussed with regards to FIGS. 8A-8K.

Figure 10E:
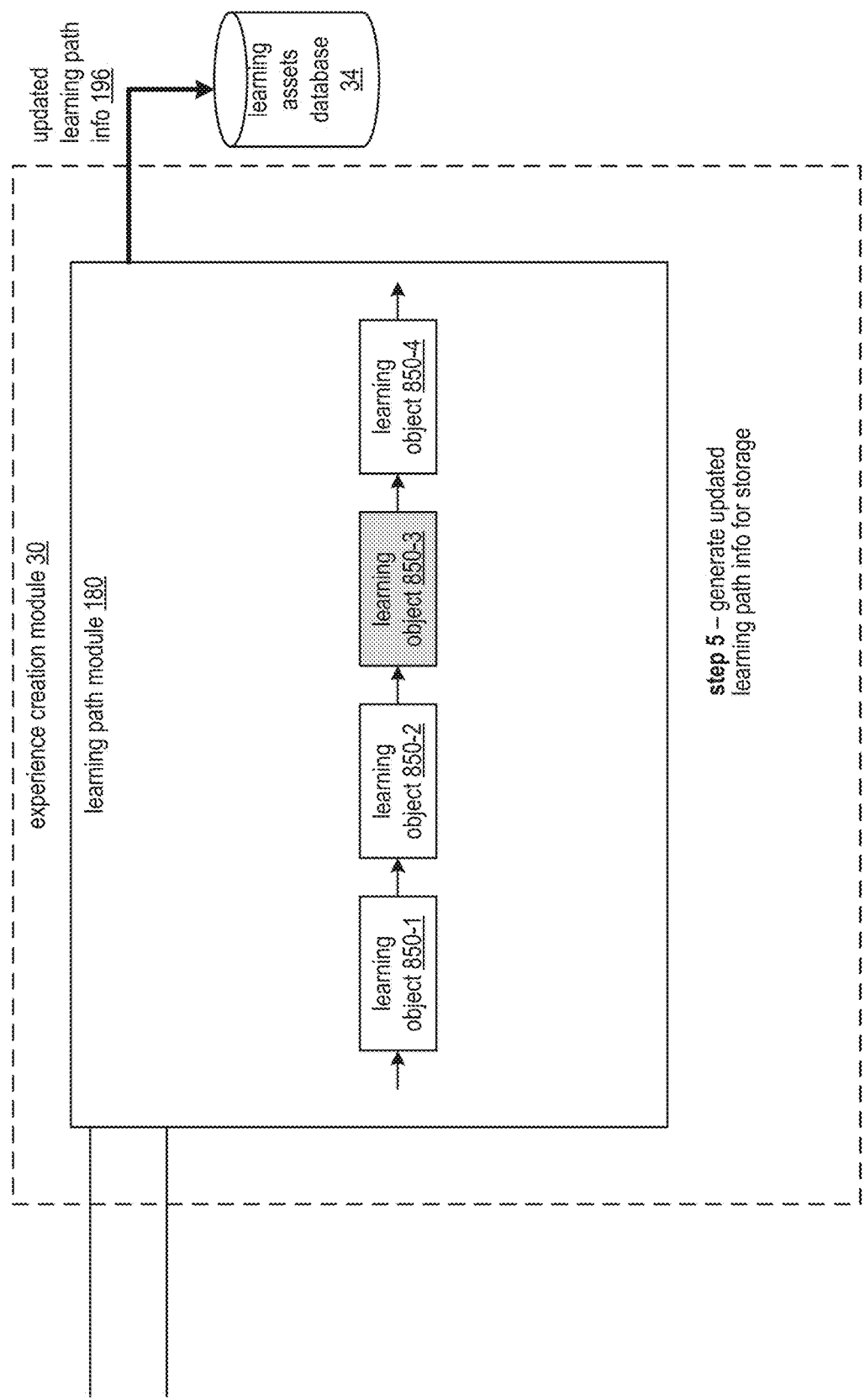

FIG. 10E further illustrates the method of operation where, when a sufficient number of learning objects have been generated, in a fifth step the experience creation module 30 generates updated learning path information for storage. For example, the learning path module 180 arranges the learning objects 850-1 through 850-4 in a logical order to support a lesson and generates the updated learning path information 196 utilizing the learning objects for storage in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 11A, 11B, 11C, 10D, and 11E are schematic block diagrams of an embodiment of a computing system illustrating an example of creating lesson asset information. The computing system includes the experience creation module 30 of FIG. 1, the environment sensor module 14 of FIG. 1, and the learning assets database 34 of FIG. 1. The experience creation module 30 includes the asset module 182 of FIG. 8A.

Figure 11A:
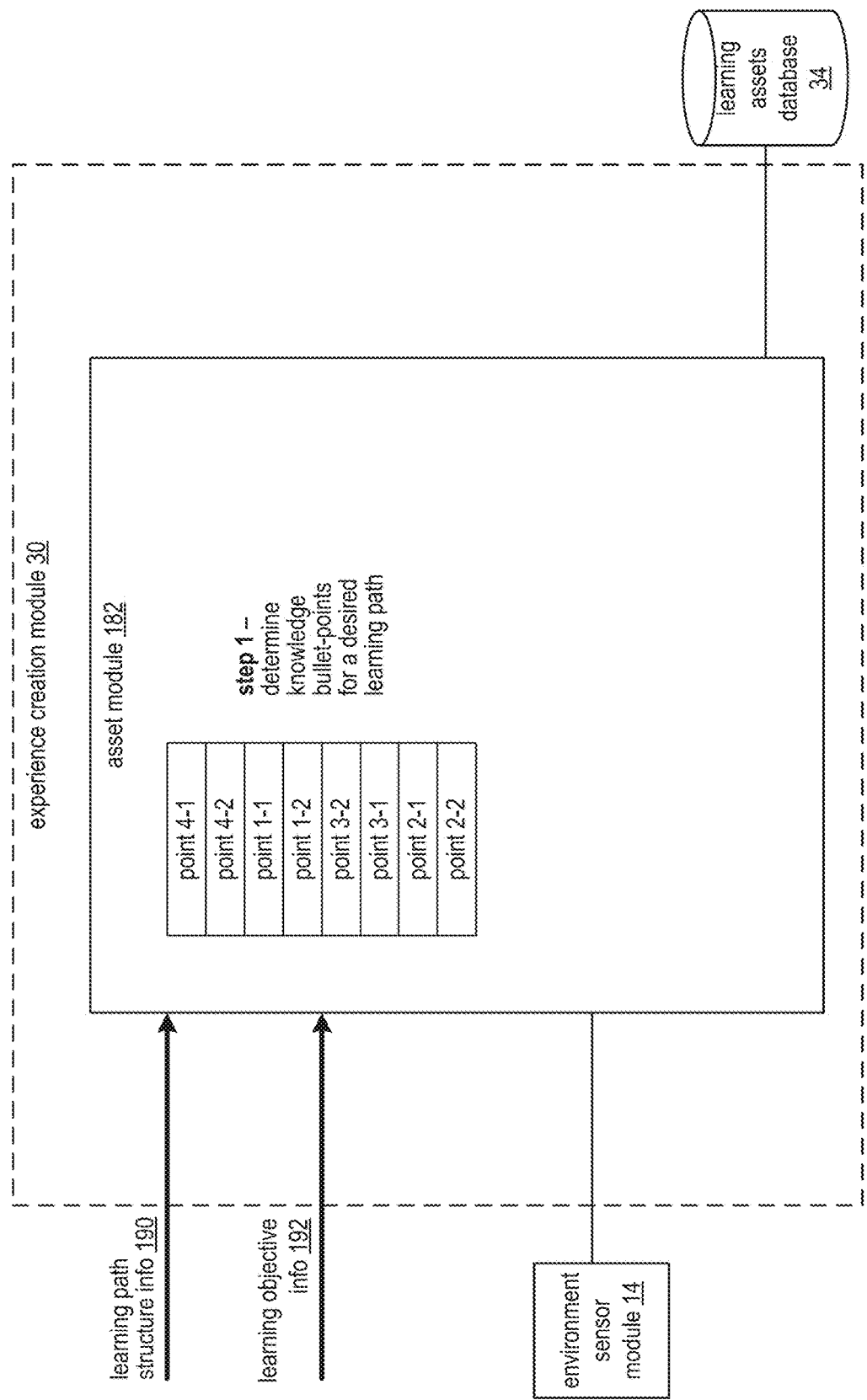

FIG. 11A illustrates a method of operation where in a first step the experience creation module 30 determines knowledge bullet-points for a desired learning path. In a first example, the asset module 182 recovers the knowledge bullet-points from the learning assets database 34. In a second example, the asset module 182 generates the knowledge bullet-points based on learning path structure information 190 and/or learning objective information 192. For instance, the asset module 182 extracts knowledge bullet-points as specified by an instructor from the learning path structure information 190. In another instance, the asset module 182 extracts further knowledge bullet-points as desired by the instructor for specific learning objects from the learning objective information 192.

Figure 11B:
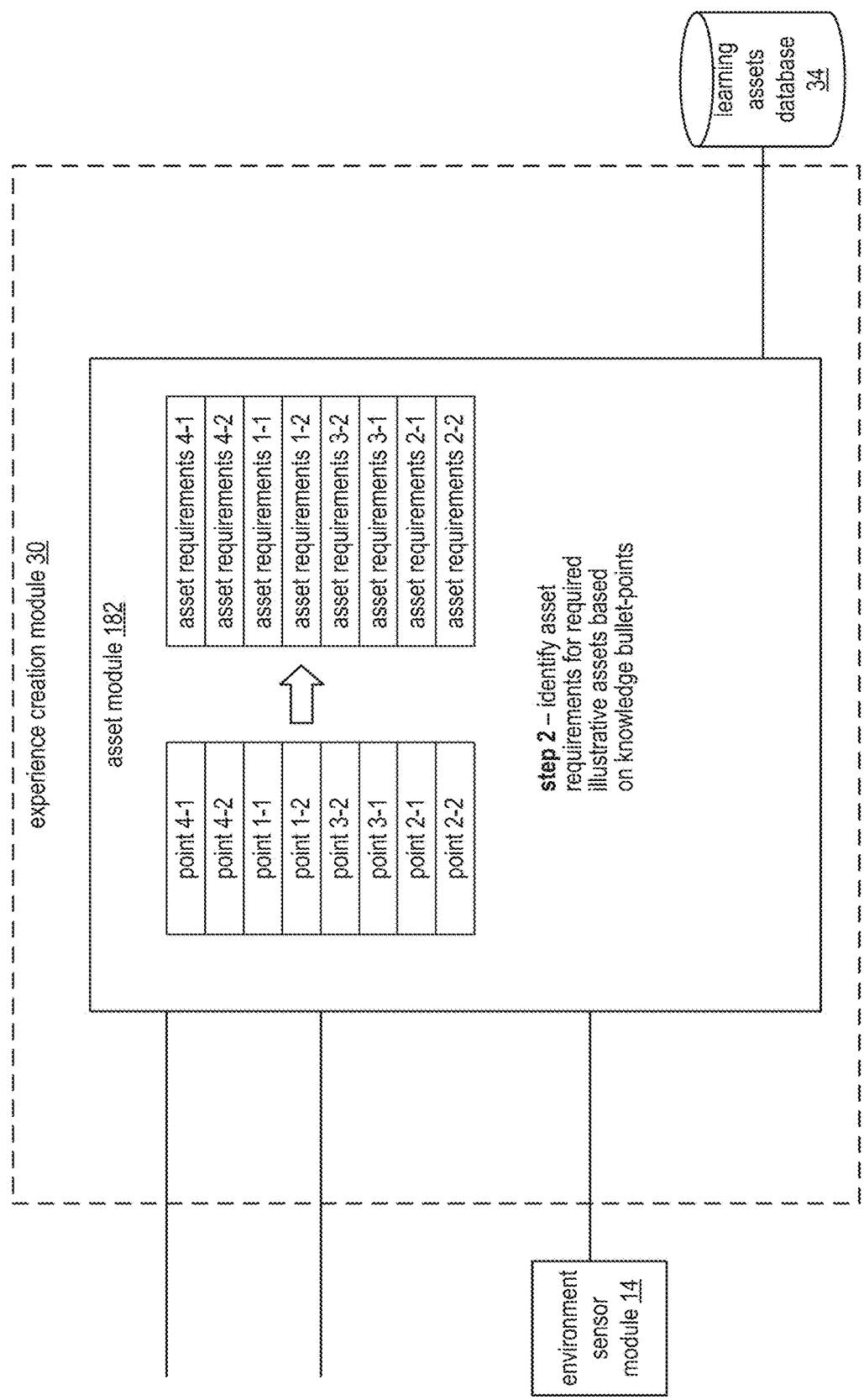

FIG. 11B further illustrates the method of operation where, having determined the knowledge bullet-points, in a second step the experience creation module 30 identifies asset requirements for required illustrative assets based on the knowledge bullet-points. For example, the asset module 182 maps each knowledge bullet-point to an asset requirement and to a particular asset (e.g., particular object) to help portray the knowledge bullet-point.

Figure 11C:
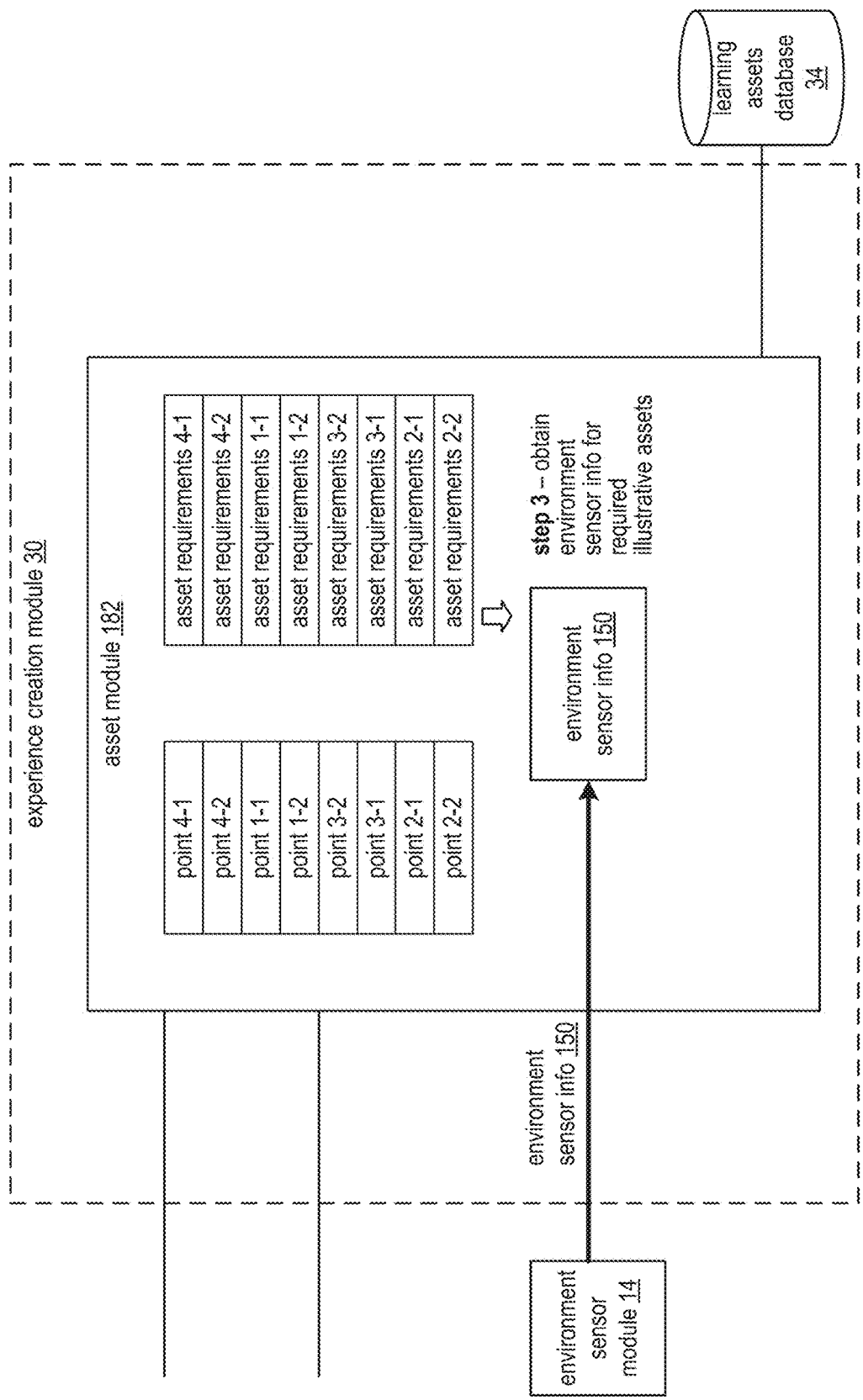

FIG. 11C further illustrates the method of operation where, having identified the required illustrative assets, in a third step the experience creation module 30 obtains environment sensor information for the required illustrative assets. For example, the asset module 182 obtains environment sensor information 150 from the environment sensor module 14, where the environment sensor information 150 is associated with at least some of the required illustrative assets. For instance, the asset module 182 obtains environment sensor information 150 with regards to scans of an engine piston when the required illustrative assets includes the piston.

Figure 11D:
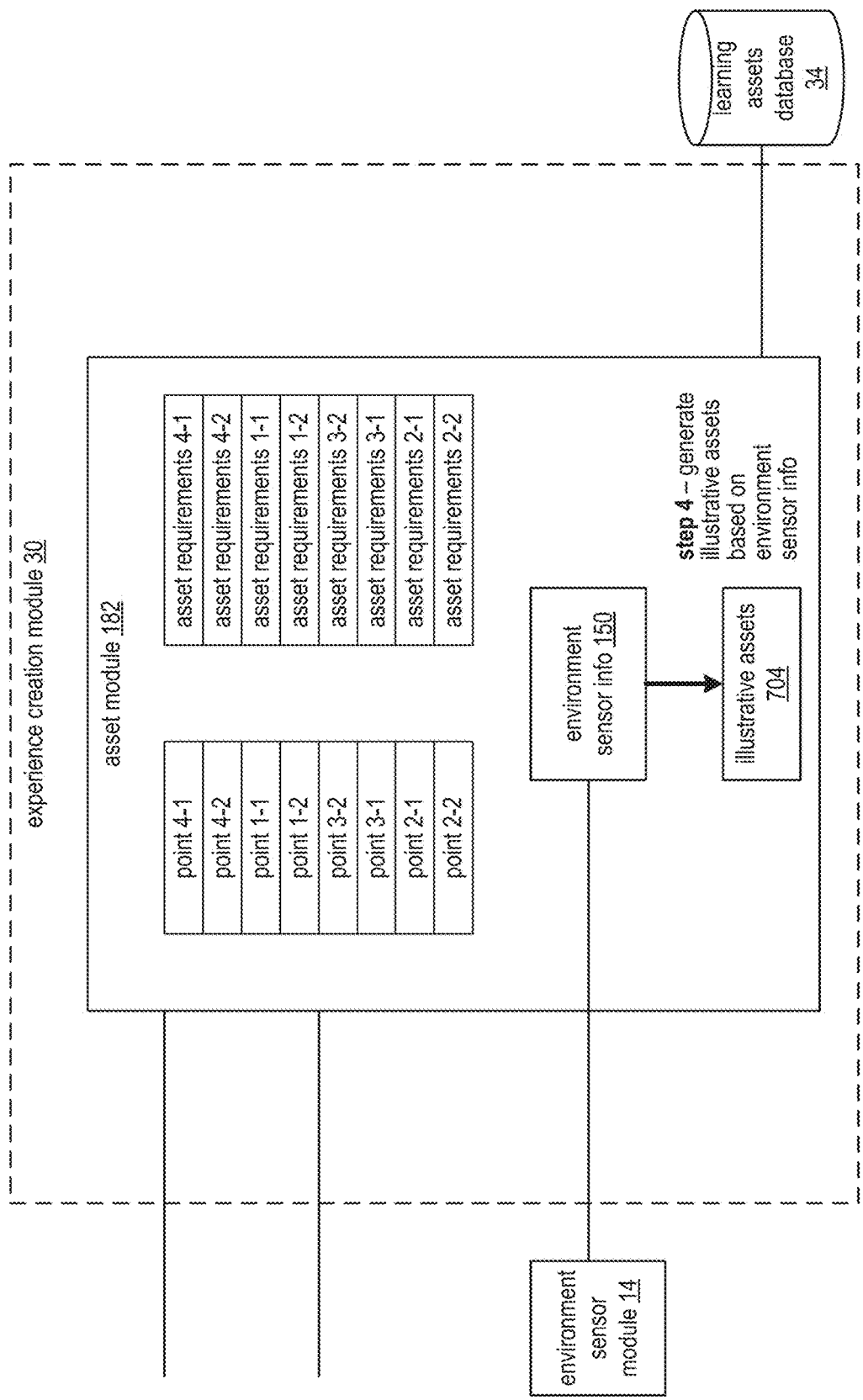

FIG. 11D further illustrates the method of operation where, having obtained the environment sensor information 150, in a fourth step the experience creation module 30 generates illustrative assets based on the environment sensor information 150. For example, the asset module 182 generates a three-dimensional model of the piston associated with the scan included in the environment sensor information 150 to produce illustrative asset 704.

Figure 11E:
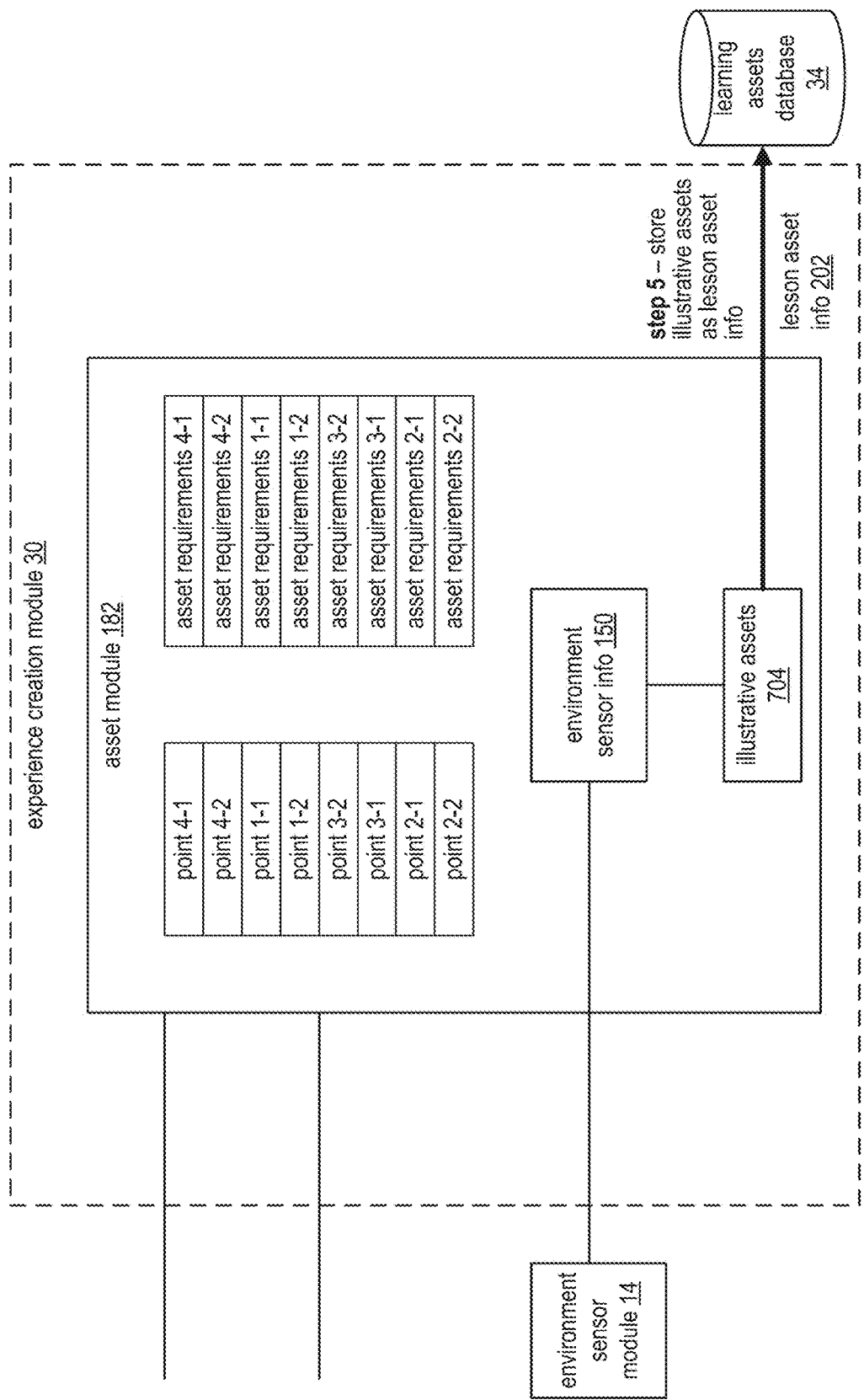

FIG. 11E further illustrates the method of operation where, having produced the illustrative assets 704, in a fifth step the experience creation module 30 stores the illustrative assets as lesson asset information. For example, the asset module 182 stores the illustrative asset 704 as lesson asset information 202 in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 12A, 12B, 12C, and 12D are schematic block diagrams of an embodiment of a computing system illustrating an example of creating modeled asset information. The computing system includes the experience creation module 30 of FIG. 1, the environment sensor module 14 of FIG. 1, the environment model database 16 of FIG. 1, and the learning assets database 34 of FIG. 1. The experience creation module 30 includes the asset module 182 of FIG. 8A.

Figure 12A:
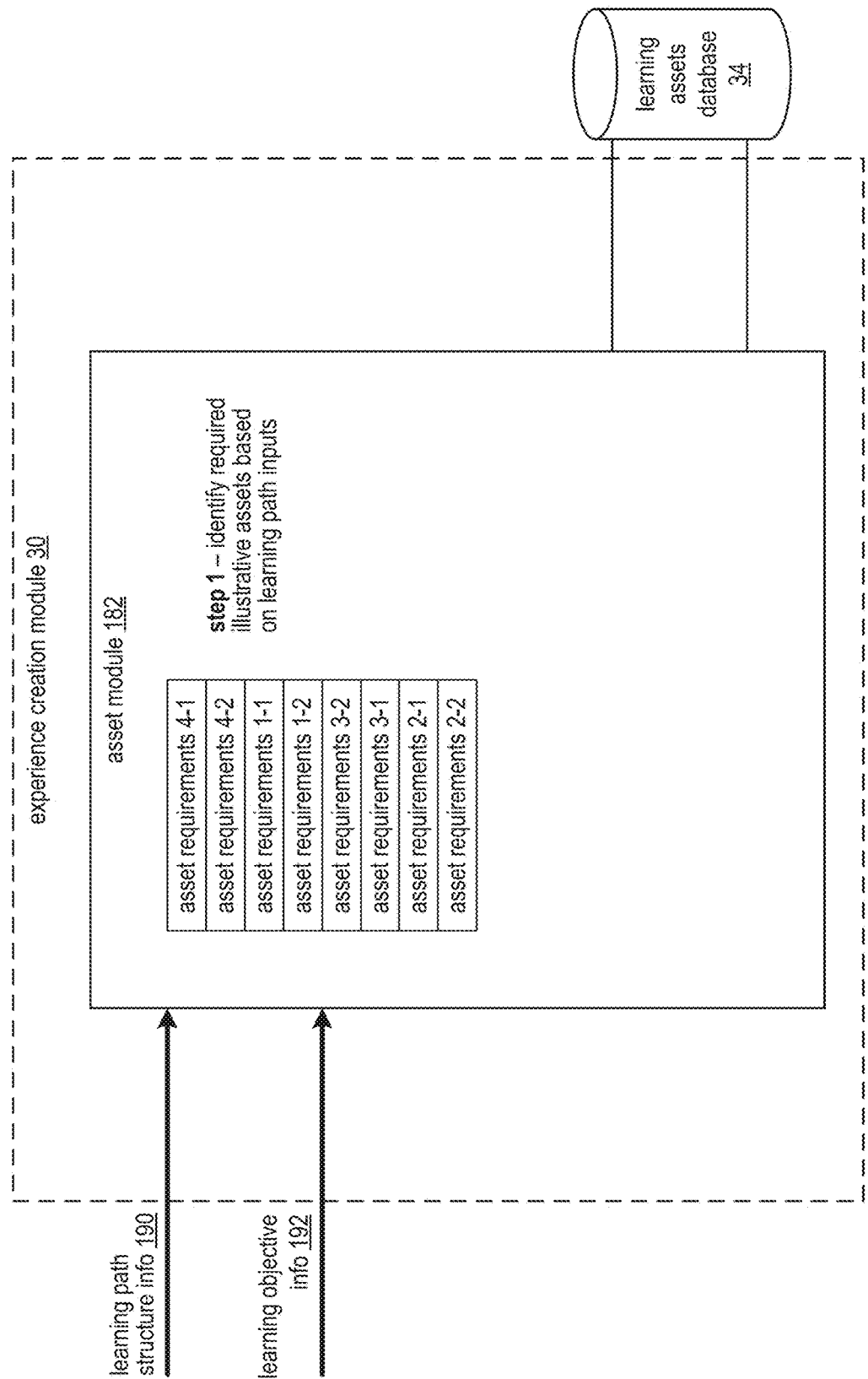

FIG. 12A illustrates a method of operation where in a first step the experience creation module 30 identifies required illustrative assets based on learning path inputs. In a first example, the asset module 182 recovers asset requirements from the learning assets database 34. In a second example, the asset module 182 determines asset requirements from learning path structure information 190 and/or learning objective information 192. For instance, the asset module 182 extracts asset requirements as specified by an instructor from the learning path structure information 190. In another instance, the asset module 182 extracts further asset requirements as desired by the instructor for specific learning objects from the learning objective information 192.

Figure 12B:
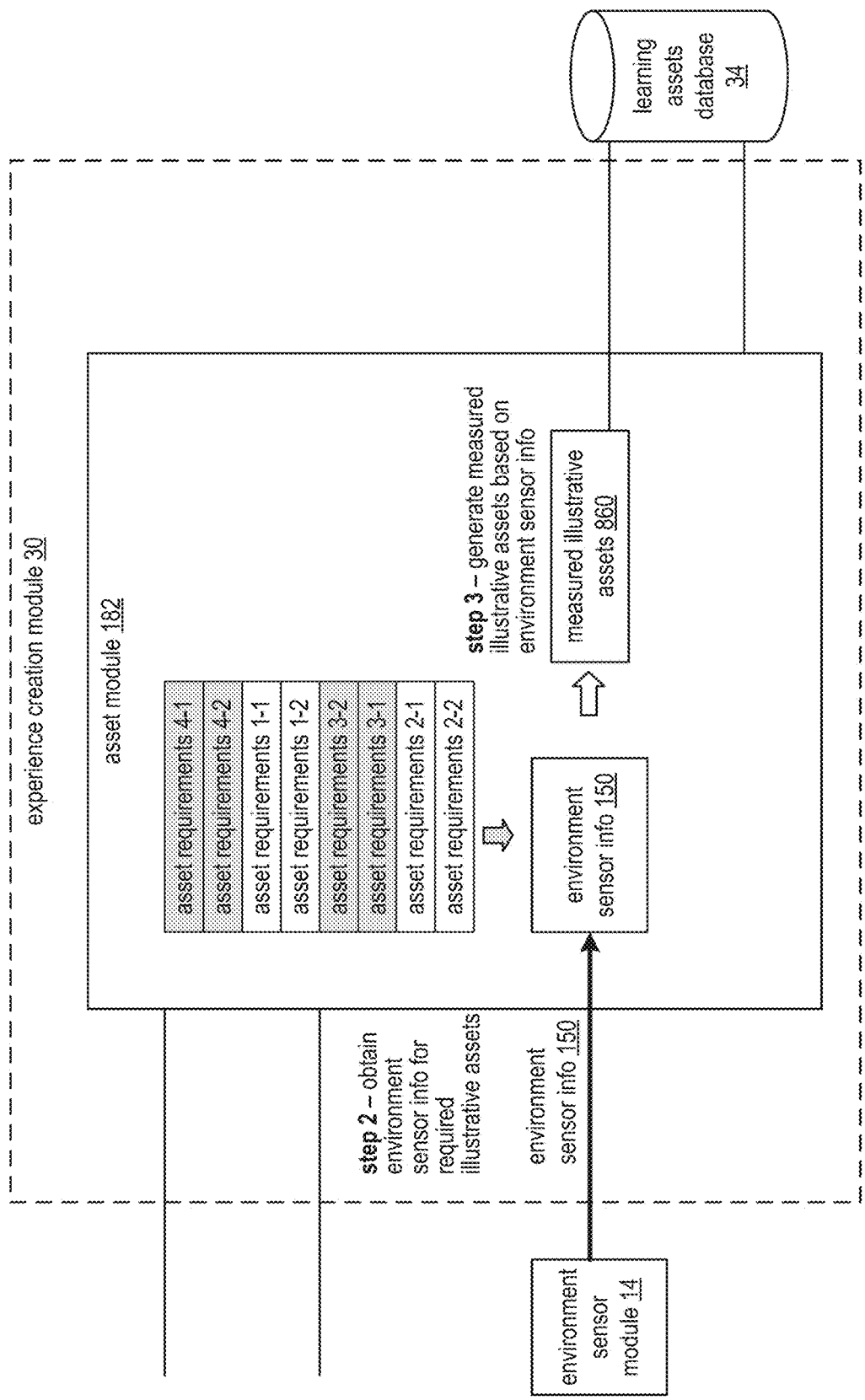

FIG. 12B further illustrates the method of operation where, having identified the required illustrative assets, in a first step the experience creation module 30 obtains environment sensor information for the required illustrative assets. For example the asset module 182 obtains environment sensor information 150 from the environment sensor information module for a cylinder wall of an engine as required by at least some of the asset requirements.

Having obtained the environment sensor information, in a second step the experience creation module 30 generates measured illustrative assets based on the environment sensor information. For example, the asset module 182 generates the measured illustrative assets 860 based the environment sensor information 150 that pertains to the cylinder wall of an actual engine.

FIG. 12C further illustrates the method of operation where, having generated the measured illustrative assets 860 and when the illustrative assets are incomplete, in a fourth step the experience creation module 30 obtains modeled environment information for remaining required illustrative assets. For example, the asset module 182 obtains modeled environment information 40 from the environment model database 16. For instance, the asset module 182 recovers modeled environment information 40 that pertains to a new model for a new piston to accompany the cylinder walls of the engine.

Having obtained the modeled environment information 40, in a fifth step the experience creation module 30 generates engineered illustrative assets based on the modeled environment information 40. For example, the asset module 182 generates the engineered illustrative assets 862 to include the new model of the new piston.

Figure 12D:
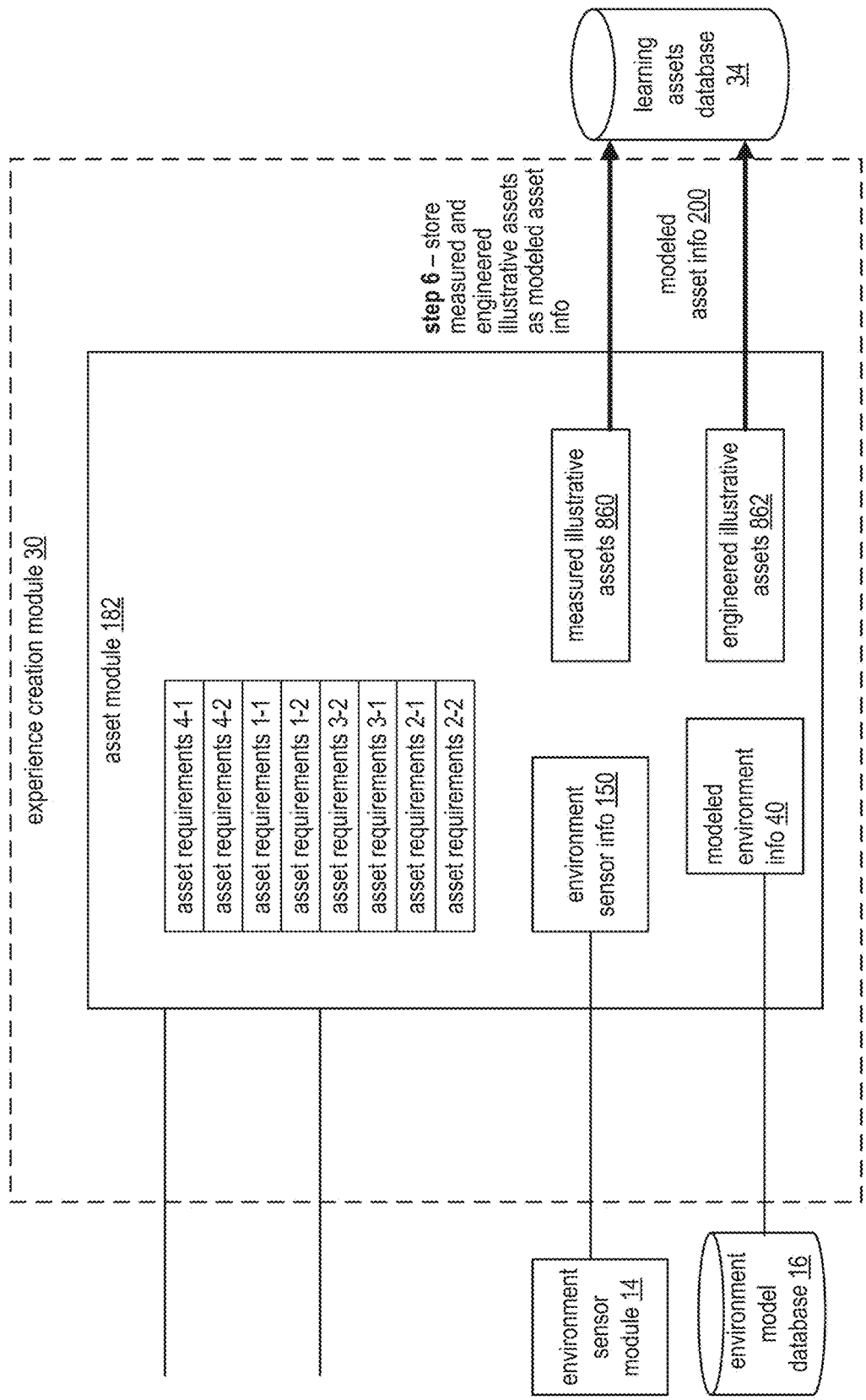

FIG. 12D further illustrates the method of operation where, having produced the measured and engineered illustrative assets, in a sixth step the experience creation module 30 stores the measured and engineered illustrative assets as modeled asset information. For example, the asset module 182 stores the measured illustrative assets 860 and the engineered illustrative assets 862 as the modeled asset information 200 in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 13A, 13B, and 13C are schematic block diagrams of an embodiment of a computing system illustrating another example of creating updated learning path information. The computing system includes the experience creation module 30 of FIG. 1, the environment model database 16, and the learning assets database 34 of FIG. 1. The experience creation module 30 includes the learning path module 180 of FIG. 8A and the asset module 182 of FIG. 8A.

FIG. 13A illustrates a method of operation where in a first step the experience creation module 30 determines knowledge bullet-points for a desired learning path. In a first example, the learning path module 180 recovers the knowledge bullet-points from the learning assets database 34. In a second example, the learning path module 180 generates the knowledge bullet-points based on learning path structure information 190 and/or learner input information 174. For instance, the experience creation module 30 extracts knowledge bullet-points as specified by an instructor from the learning path structure information 190. In another instance, the learning path module 180 extracts further knowledge bullet-points as desired by a student from the learner input information 174 (e.g., interesting products and/or services, expressions of desired learnings, learning objective requirements, interests, previous lessons, explicit new learning objective requirements, etc.).

Having determined the knowledge bullet-points, in a second step the experience creation module obtains learning objects for the knowledge bullet-points. For example, the learning path module 180 compares the knowledge bullet-points to knowledge bullet-points extracted from learning path information 194 recovered from the learning assets database 34 to identify learning objects already available from the learning assets database 34. For instance, the learning path module 180 identifies learning objects 850-1, 850-2, and 850-4 that include knowledge bullet-points that compare favorably to the knowledge bullet-points determined in the preceding step and forwards the learning objects to the asset module 182.

FIG. 13B further illustrates the method of operation where, having received the learning objects and associated illustrative assets, the asset module 182 obtains modeled environment information that includes additional objects to promote learning and awareness (e.g., product placement branding). For example, the asset module 182 obtains modeled environment information 40 from the environment model database 16 for objects that are associated with the illustrative asset 704 and/or the learning objects 850-1, 850-2, and 850-4. For instance, the asset module 182 obtains modeled environment information 40 that includes a model for a newer version of a product that is depicted in the learning object 850-1 and represented by one of the illustrative asset 704.

Having obtained the modeled environment information 40, in a fourth step the asset module 182 extracts additional objects to produce updated illustrative assets 870. For example, the asset module 182 extracts the model of the newer version of the product from the modeled environment information 40 and replaces an older version of the product in the illustrative assets 704 with the model of the newer version of the product to produce the updated illustrative assets 870.

FIG. 13C further illustrates the method of operation where, having produced the learning objects and the updated illustrative assets for the learning objects, in a fifth step the experience creation module 30 generates updated learning path information for storage utilizing the updated illustrative assets 870 and the learning objects. For example, the asset module 182 aggregates the learning objects 850-1, 850-2, and 850-4 that now utilize the updated illustrative assets 870 to produce the updated learning path information 196 for storage in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 14A, 14B, and 14C are schematic block diagrams of an embodiment of a computing system illustrating an example of modifying a lesson package. The computing system includes the experience creation module 30 of FIG. 1 and the learning assets database 34 of FIG. 1.

FIG. 14A illustrates an example method of operation where in a first step the experience creation module 30 obtains a first learning object regarding a topic associated with the lesson package and a second learning object regarding the topic. For instance, the experience creation module 30 generates the learning objects. In another instance, the experience creation module 30 extracts a first learning object 750-1 and a second learning object 750-2 from the lesson package 206 recovered from the learning assets database 34.

The first learning object 750-1 includes a first set of knowledge bullet-points 752-1 for a first piece of information regarding the topic. The second learning object 750-2 includes a second set of knowledge bullet-points 752-2 for a second piece of information regarding the topic. The first learning object 750-1 and the second learning object 750-2 further include at least one illustrative asset 754 that depicts an aspect regarding the topic pertaining to the first and second pieces of information.

The first learning object 750-1 further includes a first descriptive asset 756-1 regarding the first piece of information based on the first set of knowledge bullet-points 752-1 and the illustrative asset 754. The second learning object further includes a second descriptive asset 756-2 regarding the second piece of information based on the second set of knowledge bullet-points 752-2 and the illustrative asset 754.

FIG. 14B further illustrates the example method of operation to modify a lesson package where, having obtained the first and second learning objects, in a second step the experience creation module 30 derives a first set of knowledge test-points 760-1 for the first learning object 750-1 regarding the topic based on the first set of knowledge bullet-points 752-1. The knowledge test-points include question and answers for a first piece of information of the topic.

The deriving the first set of knowledge test-points 760-1 for the first learning object 750-1 based on the first set of knowledge bullet-points 752-1 includes a variety of one or more sub-steps. A first sub-step includes interpreting a first knowledge bullet-point of the first set of knowledge bullet-points 752-1 in accordance with the illustrative asset 754 and the first descriptive asset 756-1 of the first learning object 750-1 to produce a first knowledge test-point of the first set of knowledge test-points 760-1. For example, the experience creation module 30 derives a first question to include what are the steps of the intake stroke and derives a first answer to include the intake valve opens and air/fuel mixture is pulled into the cylinder by the piston based on the first set of knowledge bullet-points 752-1.

A second sub-step includes interpreting a second knowledge bullet-point of the first set of knowledge bullet-points 752-1 in accordance with the illustrative asset 754 and the first descriptive asset 756-1 of the first learning object 750-1 to produce a second knowledge test-point of the first set of knowledge test-points 760-1. For example, the experience creation module 30 derives a second question to include what are the steps of the compression stroke and derives a second answer to include the intake valve closes and the piston compresses the air/fuel mixture in the cylinder based on the first set of knowledge bullet-points 752-1.

A third sub-step includes interpreting instructor input information to identify a third knowledge test-point of the first set of knowledge test-points 760-1. For example, the experience creation module 30 obtains instructor input information that includes a third question and a third answer associated with the intake and/or compression strokes of the engine.

Having derived the first set of knowledge test-points 760-1, in a third step of the example method of operation of the modifying of the lesson package, the experience creation module 30 derive a second set of knowledge test-points 760-2 for the second learning object 750-2 regarding the topic based on the second set of knowledge bullet-points 752-2. The deriving the second set of knowledge test-points 760-2 for the second learning object 750-2 based on the second set of knowledge bullet-points 752-2 includes a variety of sub-steps.

A first sub-step includes the experience creation module 30 interpreting a first knowledge bullet-point of the second set of knowledge bullet-points 752-2 in accordance with the illustrative asset 754 and the second descriptive asset 756-2 of the second learning object 750-2 to produce a first knowledge test-point of the second set of knowledge test-points 760-2. For example, the experience creation module 30 generates another first question to include what are the steps of power stroke and generates another first answer to include the spark plug ignites the air/fuel mixture pushing the piston.

A second sub-step includes the experience creation module 30 interpreting a second knowledge bullet-point of the second set of knowledge bullet-points 752-2 in accordance with the illustrative asset 754 and the second descriptive asset 756-2 of the second learning object 750-2 to produce a second knowledge test-point of the second set of knowledge test-points 760-2. For example, the experience creation module 30 generates another second question to include what are the steps of the exhaust stroke and generates another second answer to include the exhaust valve opens and piston pushes exhaust out of the cylinder followed by the exhaust valve closing.

A third sub-step includes the experience creation module 30 interpreting instructor input information to identify a third knowledge test-point of the second set of knowledge test-points 760-2. For example, the experience creation module 30 obtains instructor input information that includes a third question and a third answer associated with the power and/or exhaust strokes of the engine.

FIG. 14C further illustrates the example method of operation for modifying the lesson package where, having derived the first and second sets of knowledge test-points, in a fourth step the experience creation module 30 generates at least one first knowledge assessment asset 762-1 for the first learning object 750-1 regarding the topic based on the first set of knowledge test-points 760-1, the illustrative asset 754, and the first descriptive asset 756-1 of the first learning object 750-1.

The generating the first knowledge assessment asset 762-1 for the first learning object 750-1 regarding the topic based on the first set of knowledge test-points 760-1, the illustrative asset 754, and the first descriptive asset 756-1 of the first learning object 750-1 includes a variety of sub-steps. A first sub-step includes generating a first representation of the illustrative asset 754 based on a first knowledge test-point of the first set of knowledge test-points 760-1. For example, rendering a view of the cylinder during the intake stroke.

A second sub-step includes generating a first representation of the first descriptive asset 756-1 of the first learning object 750-1 based on the first knowledge test-point of the first set of knowledge test-points 760-1. For example, rendering a sequence of movement of the piston during the intake stroke.

A third sub-step includes generating a first portion of the first knowledge assessment asset 762-1 utilizing the first representation of the illustrative asset and the first representation of the first descriptive asset. For example, rendering a sequence of movement of the piston moving through the cylinder during the intake stroke.

A fourth sub-step includes outputting the first portion of the first knowledge assessment asset 762-1 as instructor output information. For example, outputting the rendering of the sequence of movement of the piston moving through the cylinder during the intake stroke.

A fifth sub-step includes receiving instructor input information in response to the instructor output information. For example, obtaining instructor input information with regards to the intake stroke.

A sixth sub-step includes interpreting the instructor input information to update the first portion of the first knowledge assessment asset. For example, modifying the first portion of the first knowledge assessment asset 762-1 to include an instructor annotation with regards to the intake stroke.

Having generated the first knowledge assessment asset 762-1, in a fifth step of the example method of operation to modify the lesson package, the experience creation module 30 generates at least one second knowledge assessment asset 762-2 for the second learning object 750-2 regarding the topic based on the second set of knowledge test-points 760-2, the illustrative asset 754, and the second descriptive asset 756 7 2 of the second learning object 750-2. The generating the second knowledge assessment asset 762-2 for the second learning object 750-2 regarding the topic based on the second set of knowledge test-points 760-2, the illustrative asset 754, and the second descriptive asset 756-2 of the second learning object 750-2 includes a variety of one or more sub-steps.

A first sub-step includes generating a first representation of the illustrative asset 754 based on a first knowledge test-point of the second set of knowledge test-points 760-2. For example, rendering a view of the cylinder during the power stroke.

A second sub-step includes generating a first representation of the second descriptive asset 756-2 of the second learning object 750-2 based on the first knowledge test-point of the second set of knowledge test-points 760-2. For example, rendering a sequence of movement of the piston during the power stroke.

A third sub-step includes generating a first portion of the second knowledge assessment asset 762-2 utilizing the first representation of the illustrative asset and the first representation of the second descriptive asset. For example, rendering a sequence of movement of the piston moving through the cylinder during the power stroke.

A fourth sub-step includes outputting the first portion of the second knowledge assessment asset 762-2 as instructor output information. For example, outputting the rendering of the sequence of movement of the piston moving through the cylinder during the power stroke.

A fifth sub-step includes receiving instructor input information in response to the instructor output information. For example, obtaining instructor input information with regards to the power stroke.

A sixth sub-step includes interpreting the instructor input information to update the first portion of the second knowledge assessment asset. For example, modifying the first portion of the second knowledge assessment asset 762-2 to include in instructor annotation with regards to the power stroke.

Having produced the first and second knowledge assessment assets 762-1 and 762-2, in a sixth step of the example method of operation to modify the lesson package, the experience creation module 30 updates the first and second learning objects 750-1 and 750-2. For example, the experience creation module 30 updates the first learning object 750-1 to include the first set of knowledge test-points 760-1 and the first knowledge assessment asset 762-1 for the first learning object 750-1 to produce an updated first learning object. As another example, the experience creation module 30 updates the second learning object 750-2 to include the second set of knowledge test-points 760-2 and the second knowledge assessment asset 762-2 for the second learning object 750-2 to produce an updated second learning object.

Having updated the first and second learning objects, in a seventh step of the example method of operation to modify the lesson package, the experience creation module 40 links the updated first learning object and the updated second learning object together to form a modified multi-disciplined learning tool. For example, the experience creation module 30 stores the first learning object 750-1 and the second learning object 750-2 as assessment information 252 in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 15A, 15B, 15C, and 15D are schematic block diagrams of an embodiment of a computing system illustrating an example of updating descriptive assets and knowledge assessment assets. The computing system includes the experience creation module 30 of FIG. 1 and the experience execution module 32 of FIG. 1.

Figure 15A:
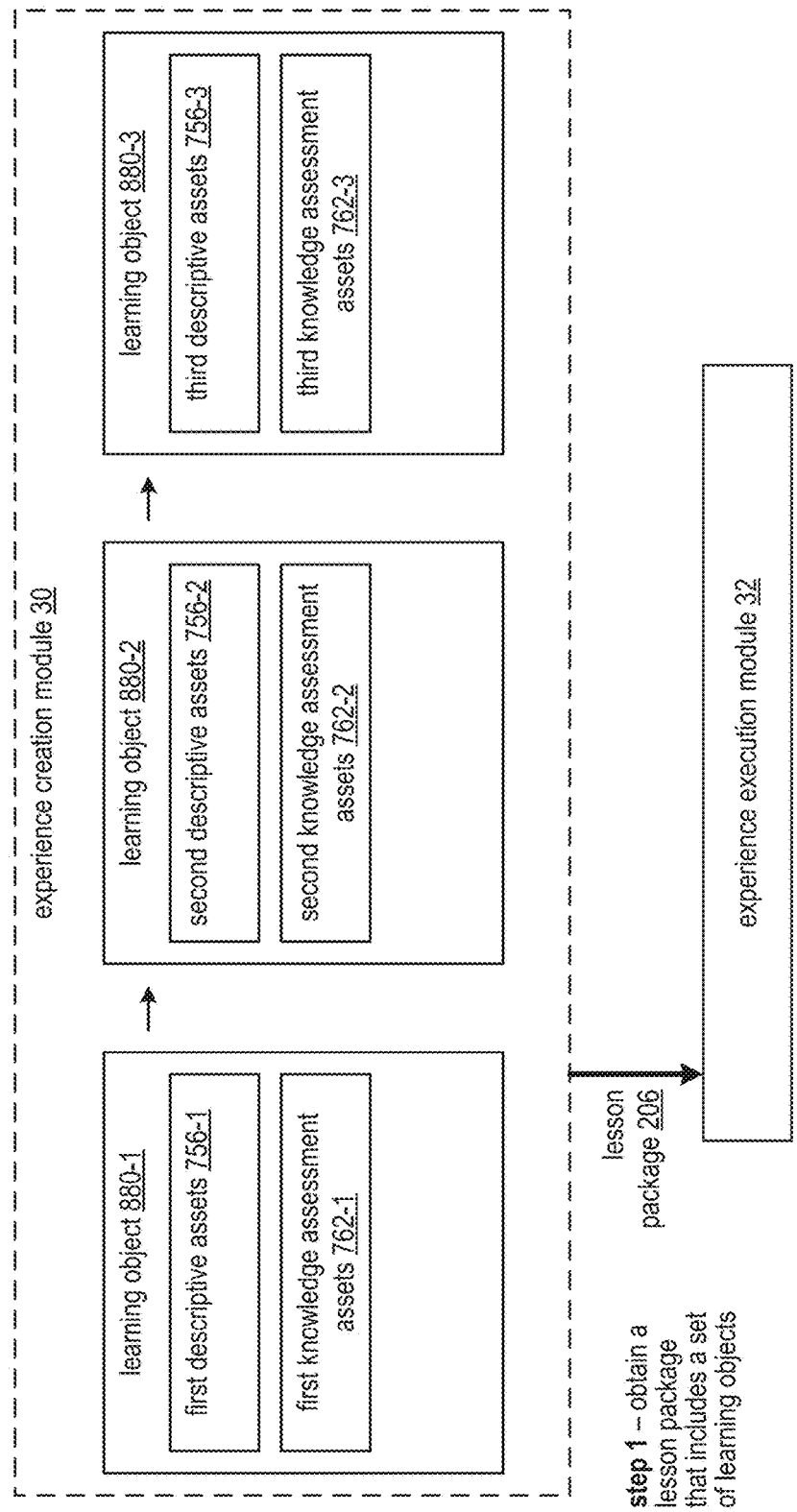

FIG. 15A illustrates a method of operation where, in a first step the experience creation module 30 obtains a lesson package that includes a set of learning objects for outputting to the experience execution module 32 as a lesson package 206. In a first example, the experience creation module 30 recovers the set of learning objects from a database. In a second example, the experience creation module 30 generates one or more of the learning objects of the set of learning objects. For instance, the experience creation module 30 generates a learning object 880-1 to include first descriptive asset 756-1 and first knowledge assessment assets 762-1 based on inputs from an instructor and a student as previously discussed.

Figure 15B:
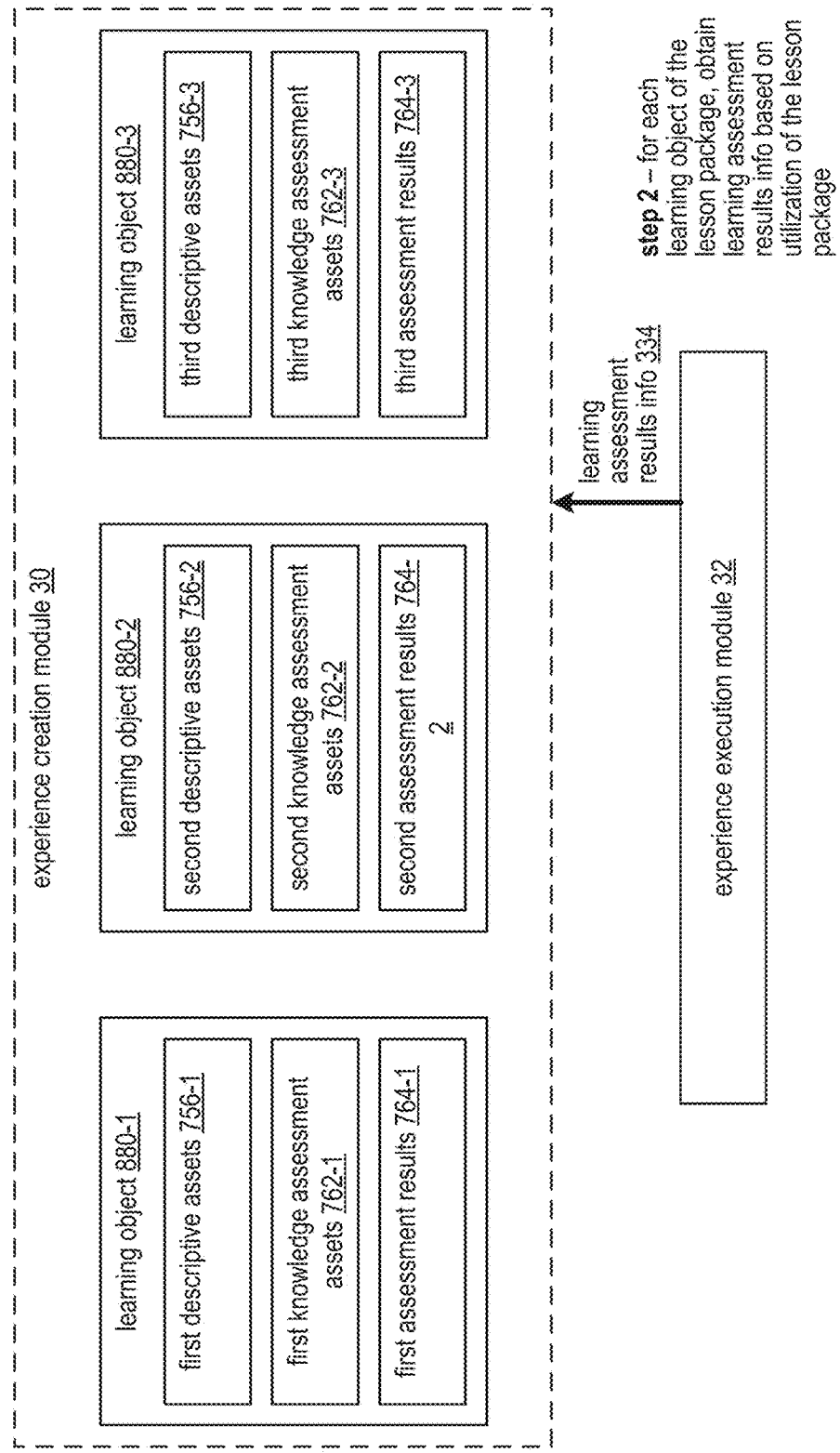

FIG. 15B further illustrates the method of operation where, having obtained the set of learning objects, in a second step the experience creation module, for each learning object of the lesson package, obtains learning assessment results information based on utilization of the lesson package by the experience execution module 32. For example, the experience creation module 30 receives learning assessment results information 334 from the experience execution module 32 subsequent to utilization of the lesson package 206 by the experience execution module 32 (e.g., execution of the lesson for the student including an assessment of learning retention by the student).

The experience creation module 30 updates each of the learning objects to include assessment results based on the learning assessment results information 334. For example, the experience creation module 30 updates the learning object 880-1 with first assessment results 764-1 pertaining to the learning object 880-1 from the learning assessment results information 334.

Figure 15C:
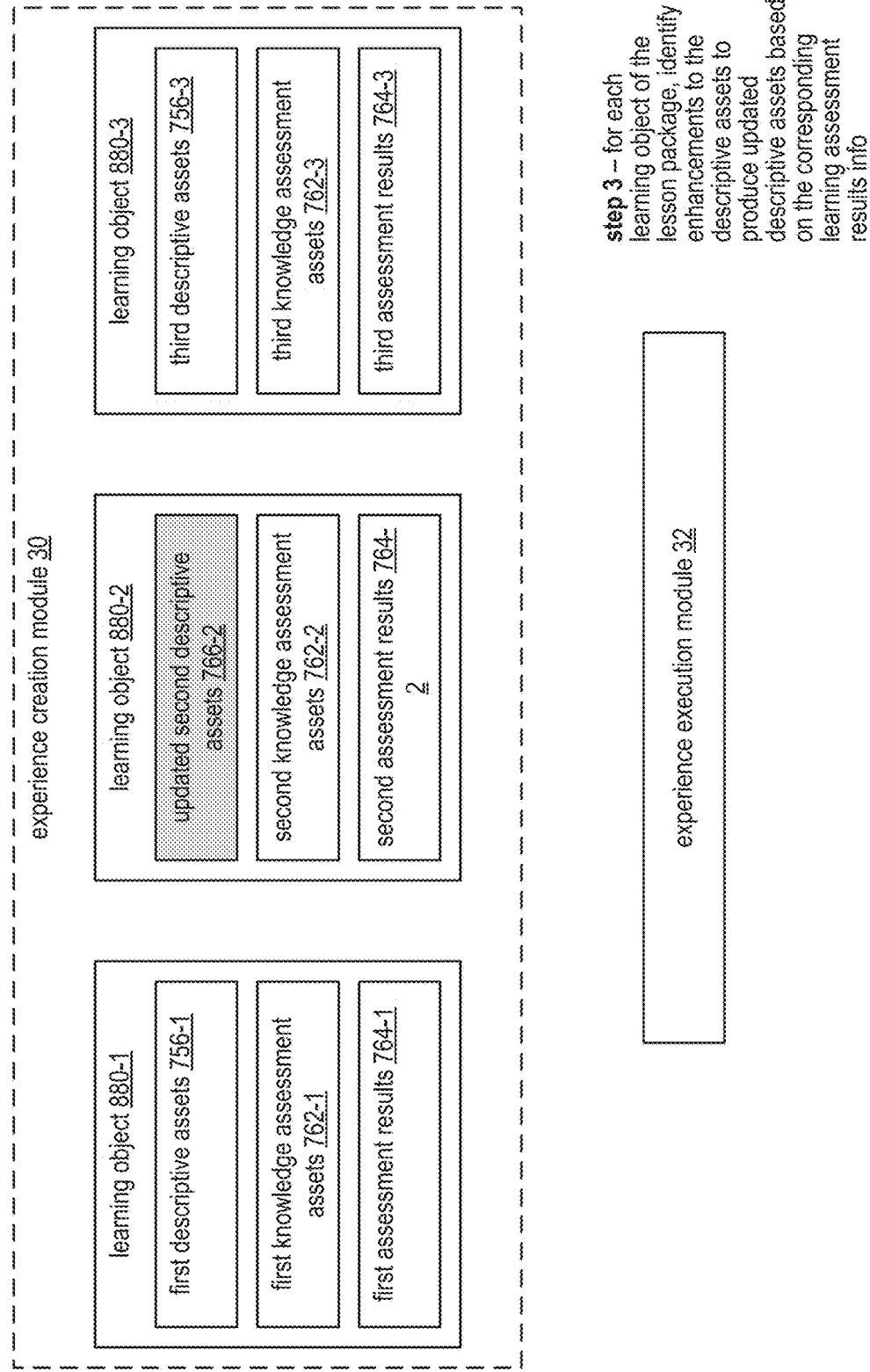

FIG. 15C further illustrates the method of operation where, having obtained the learning assessment results information, in a third step the experience creation module 30, for each learning object of the lesson package, identifies enhancements to the descriptive assets to produce updated descriptive assets based on the corresponding learning assessment results information. For example, the experience creation module 30 modifies second descriptive asset 756-2 of FIG. 15B utilizing second assessment results 764-2 to produce updated second descriptive asset 766-2. For instance, when wrong answers related to an object happen too often, the experience creation module 30 determines an update to the object (e.g., new version, different view, taking more time viewing and absorbing knowledge associated with the object, etc.). As another instance, when correct answers related to the object happen too often, the experience creation module 30 determines to further update to the object (e.g., new simple version, different view, take less time viewing and absorbing knowledge associated with the object, etc.).

Figure 15D:
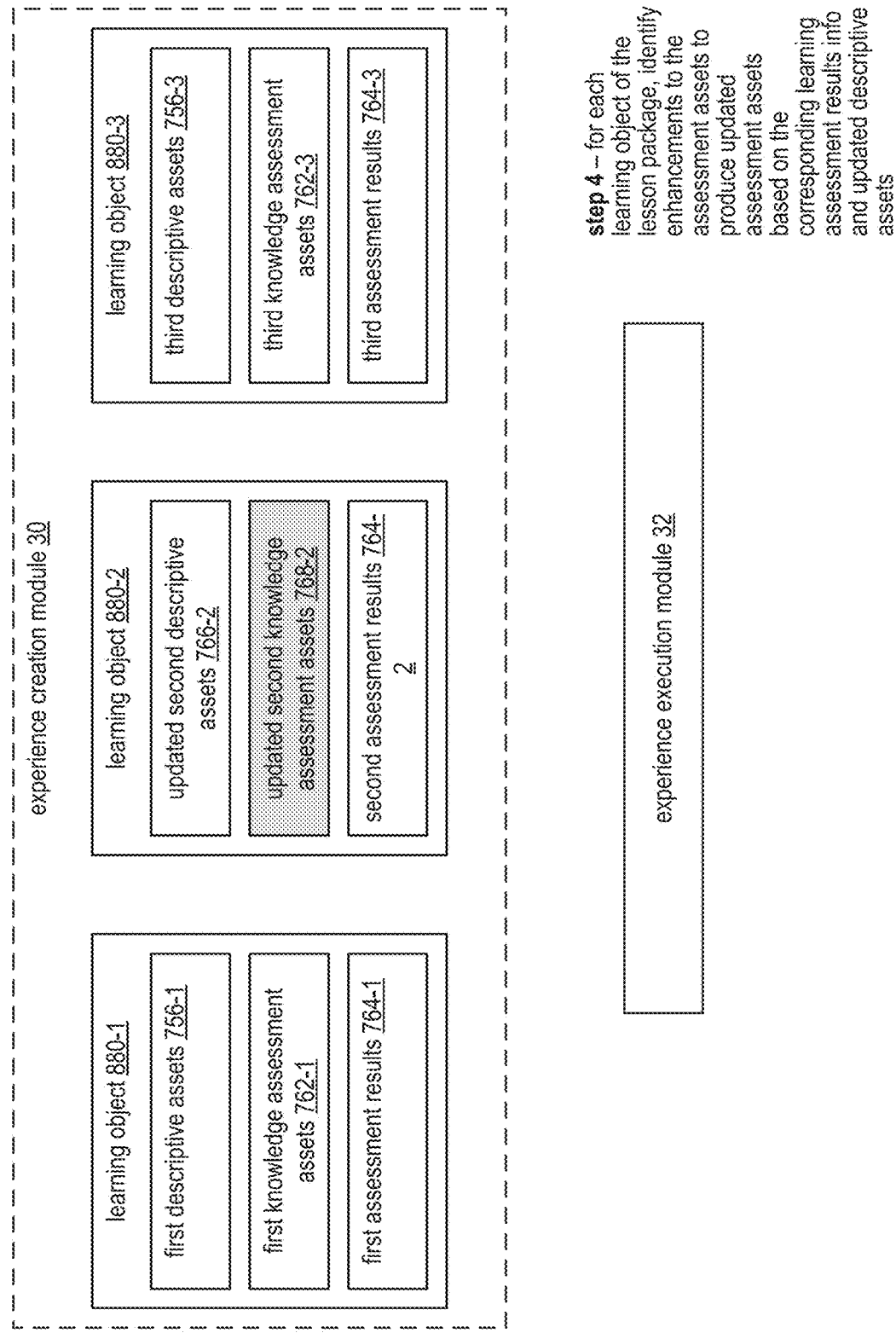

FIG. 15D further illustrates the method of operation where, having produced the updated descriptive assets, in a fourth step the experience creation module 30, for each learning object of the lesson package, identifies enhancements to the assessment assets to produce updated assessment assets based on a corresponding learning assessment results information and updated descriptive assets. For example, the experience creation module 30 modifies second knowledge assessment assets 762-2 to produce updated second knowledge assessment assets 768-2. For instance, when wrong answers related to an object happen too often, the experience creation module 30 determines an update to the assessment (e.g., new question, breakdown questions into more step-wise questions, provide a different view, take more time displaying in observing an object, etc.). As another instance, when correct answers related to an object happen too often, the experience creation module 30 determines an update to the assessment (e.g., new harder questions, consolidate step-wise questions, provide a different view, take less time displaying and absorbing an object, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 16A, 16B, 16C, and 16D are schematic block diagrams of an embodiment of a computing system illustrating another example of creating updated learning path information. The computing system includes the experience creation module 30 of FIG. 1 and the learning assets database 34 of FIG. 1. The experience creation module 30 includes the learning path module 180 of FIG. 8A.

Figure 16A:
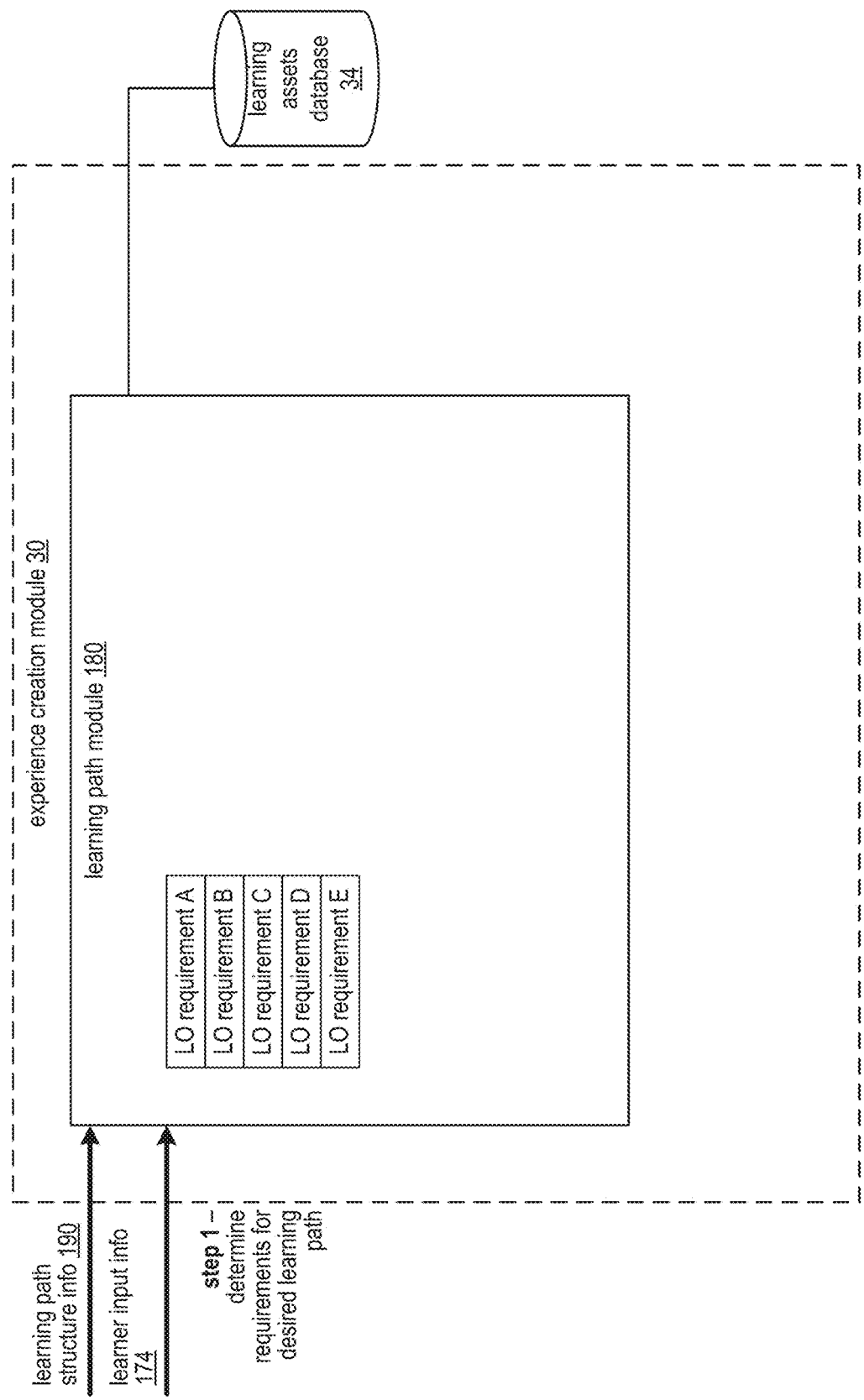

FIG. 16A illustrates a method of operation where in a first step the experience creation module 30 determines requirements for a desired learning path. In a first example, the learning path module 180 recovers the requirements from the learning assets database 34. In a second example, the learning path module 180 generates the requirements based on learning path structure information 190 and/or learner input information 174. For instance, the experience creation module 30 extracts requirements as specified by an instructor from the learning path structure information 190. In another instance, the learning path module 180 extracts further requirements as desired by a student from the learner input information 174.

The requirements generally relate to aspects of an indexing approach to identify learning objects stored in the learning assets database 34. The aspects of the indexing includes topic, sequencing, learning effectiveness level, difficulty level, degree or certificate requirement, content relevant to an interest, instructor rating, and source content rating. For instance, the learning path module 180 generates learning object requirements A-E.

Figure 16B:
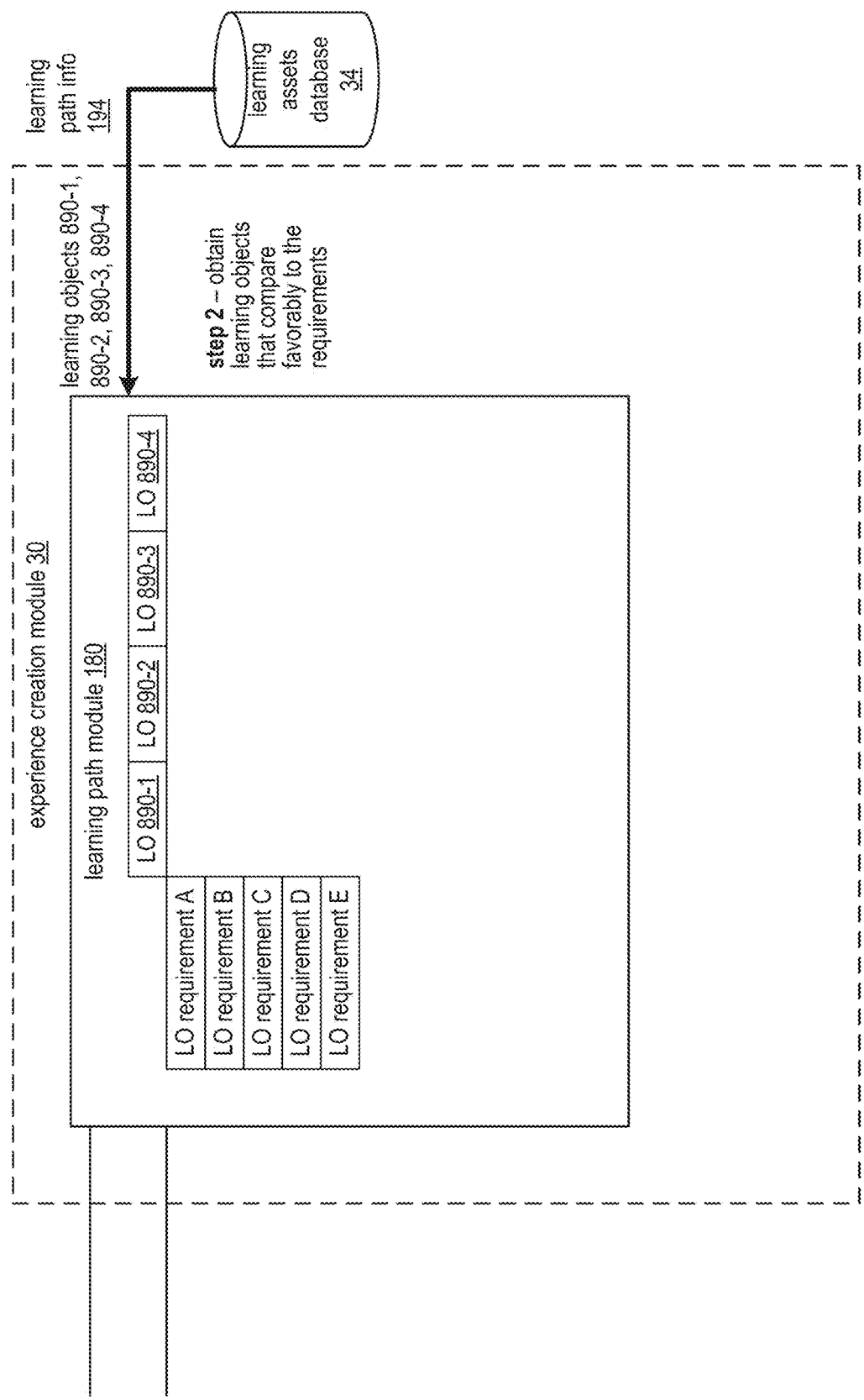

FIG. 16B further illustrates the method of operation where, having produced the requirements for the desired learning path, in a second step the experience creation module 30 obtains learning objects that compare favorably to the requirements. For example, the learning path module 180 accesses the learning assets database 34 utilizing the learning object requirements A-E to recover learning path information 194 that includes learning objects 890-1, 890-2, 890-3, and 890-4, where each compare favorably to at least some portion of the learning object requirements A-E.

Figure 16C:
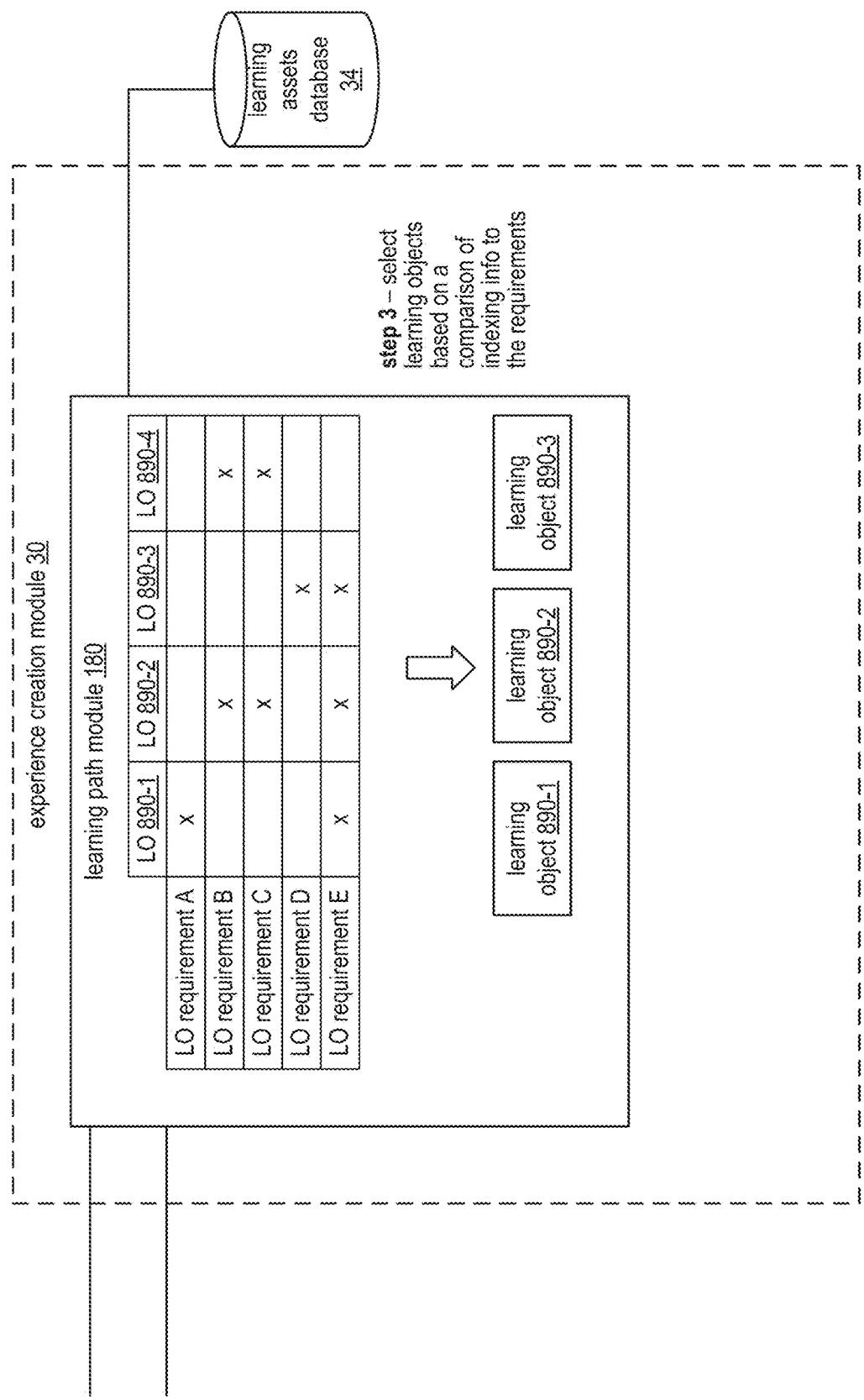

FIG. 16C further illustrates the method of operation where, having obtained the learning objects, in a third step the experience creation module 30 selects learning objects based on a comparison of indexing information to the requirements. For example, the learning path module 180 selects learning object 890-1 as a best match to learning object requirements A and E, selects learning object 890-2 as a best match to learning object requirements B, C, and E, and selects learning object 890-3 as a best match to learning object requirements D and E, where learning object requirement E represents favorable effectiveness (e.g., favorable comprehension levels as indicated by assessments).

Figure 16D:
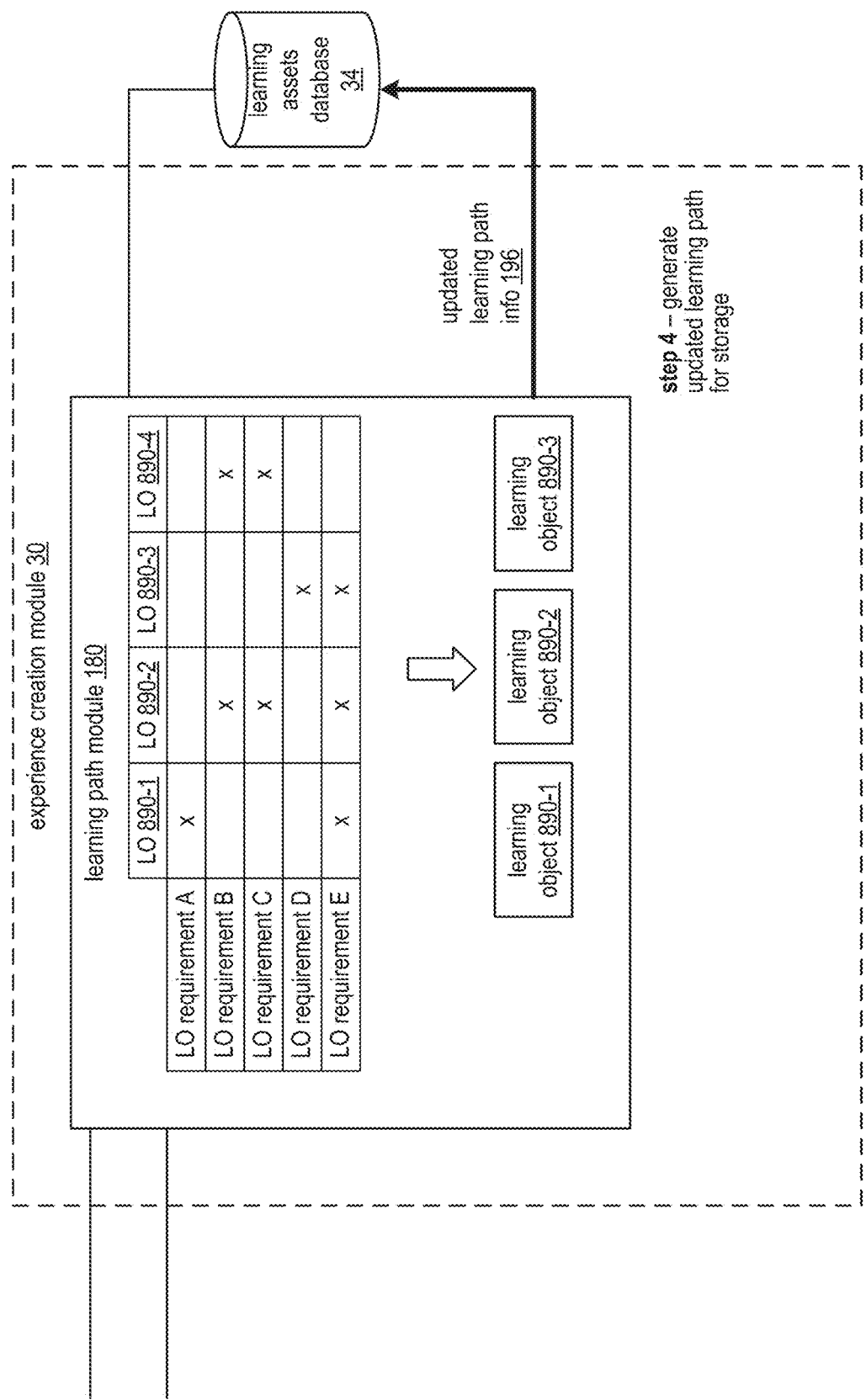

FIG. 16D further illustrates the method of operation where, having selected the learning objects, in a fourth step the experience creation module 30 generates the updated learning path information for storage. For example, the experience creation module 30 aggregates the learning objects 890-1, 890-2, and 890-3 to produce updated learning path information 196 for storage in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 17A, 17B, and 17C are schematic block diagrams of an embodiment of a computing system illustrating an example of creating learning assessment results information. The computing system includes the experience execution module 32 of FIG. 1, the learning assets database 34 of FIG. 1, and the environment sensor module 14 of FIG. 1. The experience execution module 32 includes an environment generation module 240, an instance experience module 290, and a learning assessment module 330. The environment sensor module 14 includes the motion sensor 126 of FIG. 4 and the position sensor 128 of FIG. 4.

FIG. 17A illustrates an example of operation, where in a first step the experience execution module 32 generates a representation of a first portion of a lesson package. For example, the environment generation module 240 generates instruction information 204 and baseline environment and object information 292 based on a lesson package 206 recovered from the learning assets database 34. The instruction information 204 includes a representation of instructor interactions with objects within the virtual environment and evaluation information. The baseline environment and object information 292 includes XYZ positioning information of each object within the environment for the lesson package 206.

The instance experience module 290 generates learner output information 172 for the first portion of the lesson package based on the instruction information 204 and the baseline environment and object information 292. The learner output information 172 includes a representation of a virtual place with objects, instructor interactions, and learner interactions from a perspective of the learner. The learner output information 172 further includes representations of the instruction information (e.g., instructor annotations).

FIG. 17B further illustrates the example of operation where, having generated the representation of the first portion of the lesson package, in a second step the experience execution module 32 captures learner feedback to provide an assessment. For example, the instance experience module 290 generates learner interaction information 332 based on assessment information 252 and learner input information 174. The learner input information 174 includes session control information, answer object manipulation, and direct answer input (e.g., text, speech). The assessment information 252 includes an updated representation of the assessment information based on learner input information, functionality and/or time correlations of further learner input information to the further learner output information to produce correlated assessment learner input information (e.g., time stamped and manipulated answer information).

Having captured the learner feedback, in a third step the experience execution module 32 captures a representation of learner physical actions to further provide the assessment. For example, the learning assessment module 330 receives environment sensor information 150 from the environment sensor module 14 based on inputs from the learner 28-1 to the motion sensor 126 and the position sensor 128. For instance, the environment sensor module 14 generates the environment sensor information 150 based on detecting physical manipulation of real-world objects by the student (e.g., tool position, a bat position, a golf club position, etc.).

FIG. 17C further illustrates the example of operation where, having captured representation of the learner physical actions, in a fourth step the experience execution module 32 analyzes learner feedback and a representation of learner physical actions in light of assessment information to produce learner assessment results information. For example, the learning assessment module 330 analyzes the environment sensor information 150 to interpret physical actions of the learner 28-1 and compares the physical actions to minimum required physical action specifications of the assessment information 252 to determine whether the learner 28-1 is performing at a satisfactory level. When a satisfactory level has been produced and direct questions have been answered via the learner input information 174, the learning assessment module 330 indicates to the instance experience module 290 to advance the lesson to a next step.

The learning assessment results information 334 includes one or more of a learner identity, a learning object identifier, a lesson identifier, and raw learner interaction information (e.g., a timestamp recording of all learner interactions like points, speech, input text, settings, viewpoints, etc.). The learning assessment results information 334 further includes summarized learner interaction information (e.g., average, mins, maxes of raw interaction information, time spent looking at each view of a learning object, how fast answers are provided, number of wrong answers, number of right answers, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 18A, 18B, 18C, and 18D are schematic block diagrams of an embodiment of a computing system illustrating another example of creating a lesson package. The computing system includes the environment model database 16 of FIG. 1, the experience creation module 30 of FIG. 1, and the learning assets database 34 of FIG. 1.

Figure 18A:
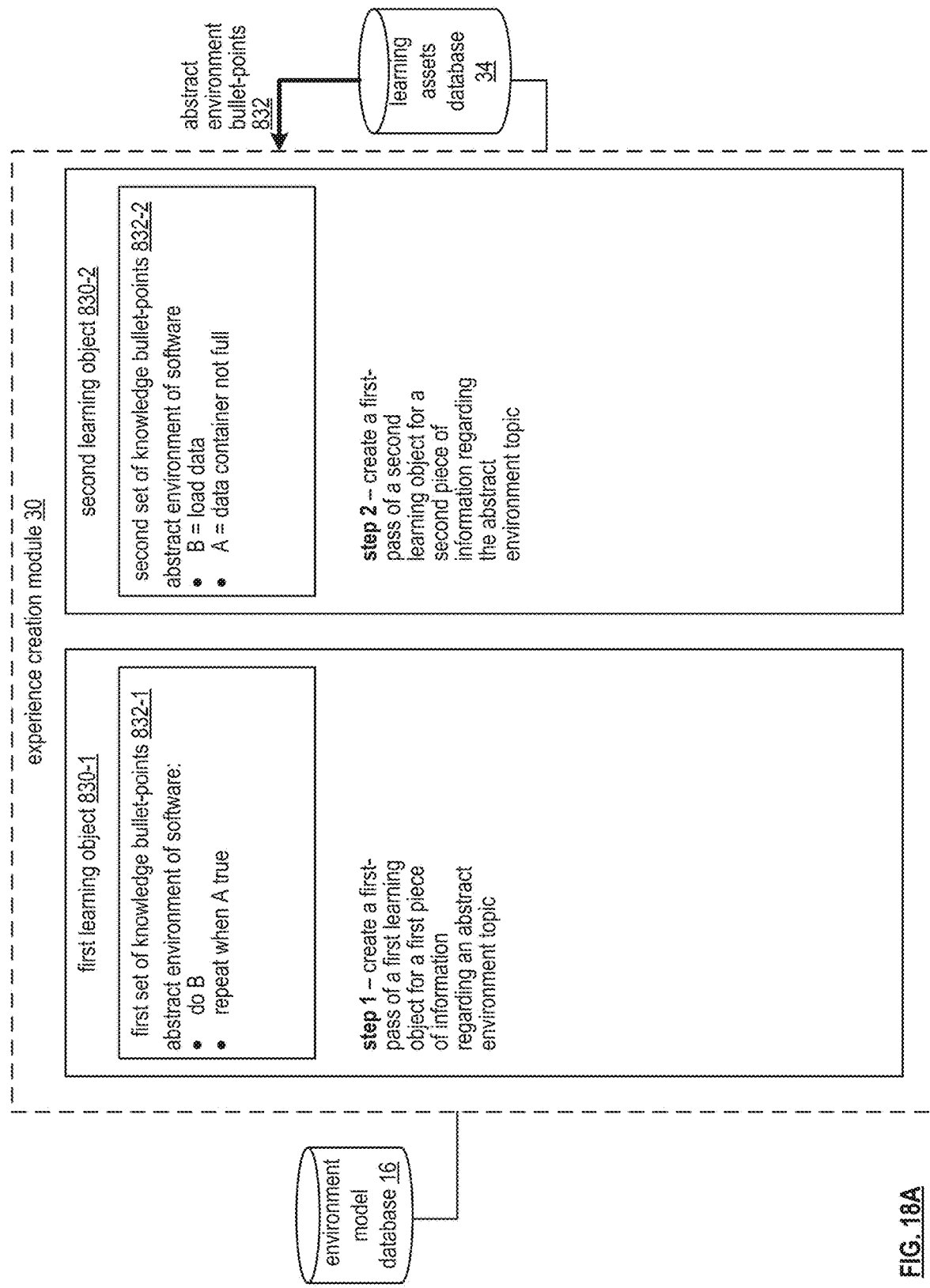

FIG. 18A illustrates an example of operation where, in a first step the experience creation module 30 creates a first-pass of a first learning object for a first piece of information regarding an abstract environment topic. Examples of an abstract environment includes representations of software, representations of music, representations of different languages, etc. The creating of the first-pass of the first learning object includes generating a first set of knowledge bullet-points. The creating further includes recovering the first set of knowledge bullet-points from the learning assets database 34. For example, the experience creation module 30 recovers abstract environment points 832 (e.g., associated with software training) from the learning assets database 34 with regards to the abstract environment of software to generate the first set of knowledge bullet-points 832-1 of the first learning object 830-1. For instance, the bullet-points describe a software DO loop, which includes statements do B and repeater when A true.

Having created the first-pass of the first learning object, in a second step the experience creation module 30 creates a first-pass of a second learning object for a second piece of information regarding the abstract environment topic. For example, the experience creation module 30 extracts statements B=low data and A=data container not full from the abstract environment bullet-points associated with software training to produce a second set of knowledge bullet-points 832-2 of second learning object 830-2.

Figure 18B:
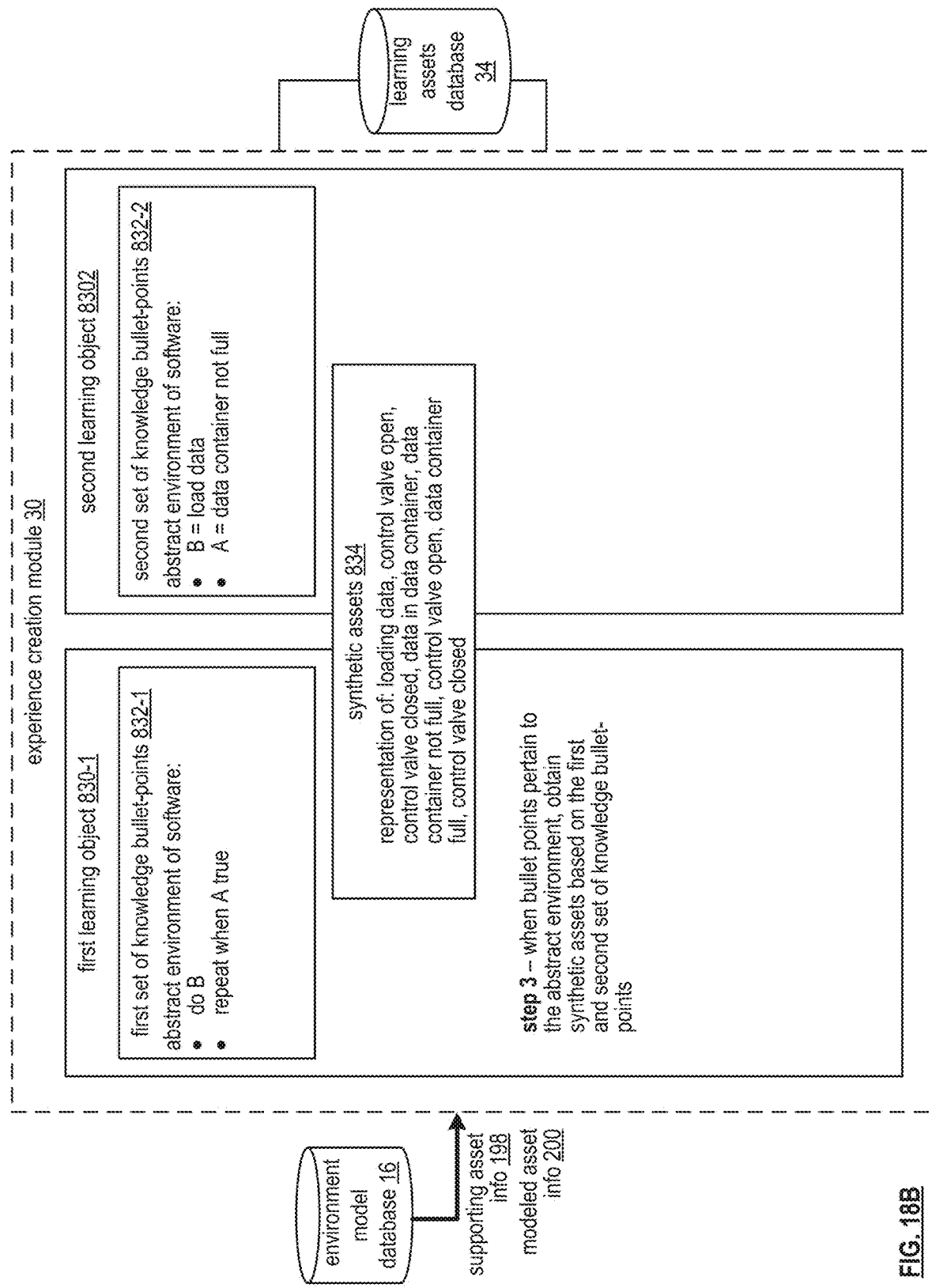

FIG. 18B further illustrates the method of operation where, having created the first-pass of the first and second learning objects, one bullet-points pertain to the abstract environment, in a third step the experience creation module 30 obtains synthetic assets based on the first and second set of knowledge bullet-points. The synthetic assets includes animations and/or other portrayals of the knowledge bullet-points associated with the abstract environment. Examples of synthetic assets includes a representation of software loading data, a representation of data in a data container, a representation of the data container not full, and a representation of the data container full.

The obtaining of the synthetic assets includes generating the synthetic assets based on the knowledge bullet points. The obtaining further includes recovering the synthetic assets from the environment model database 16. For example, the experience creation module 30 extracts the synthetic assets 834 from one or more of supporting asset information 198 and modeled asset information 200 from the environment model database 16. For instance, the experience creation module 30 produces the synthetic assets 834 to include animations that represent the loading of data, the data in the data container, the data container not full, and the data container full.

Figure 18C:
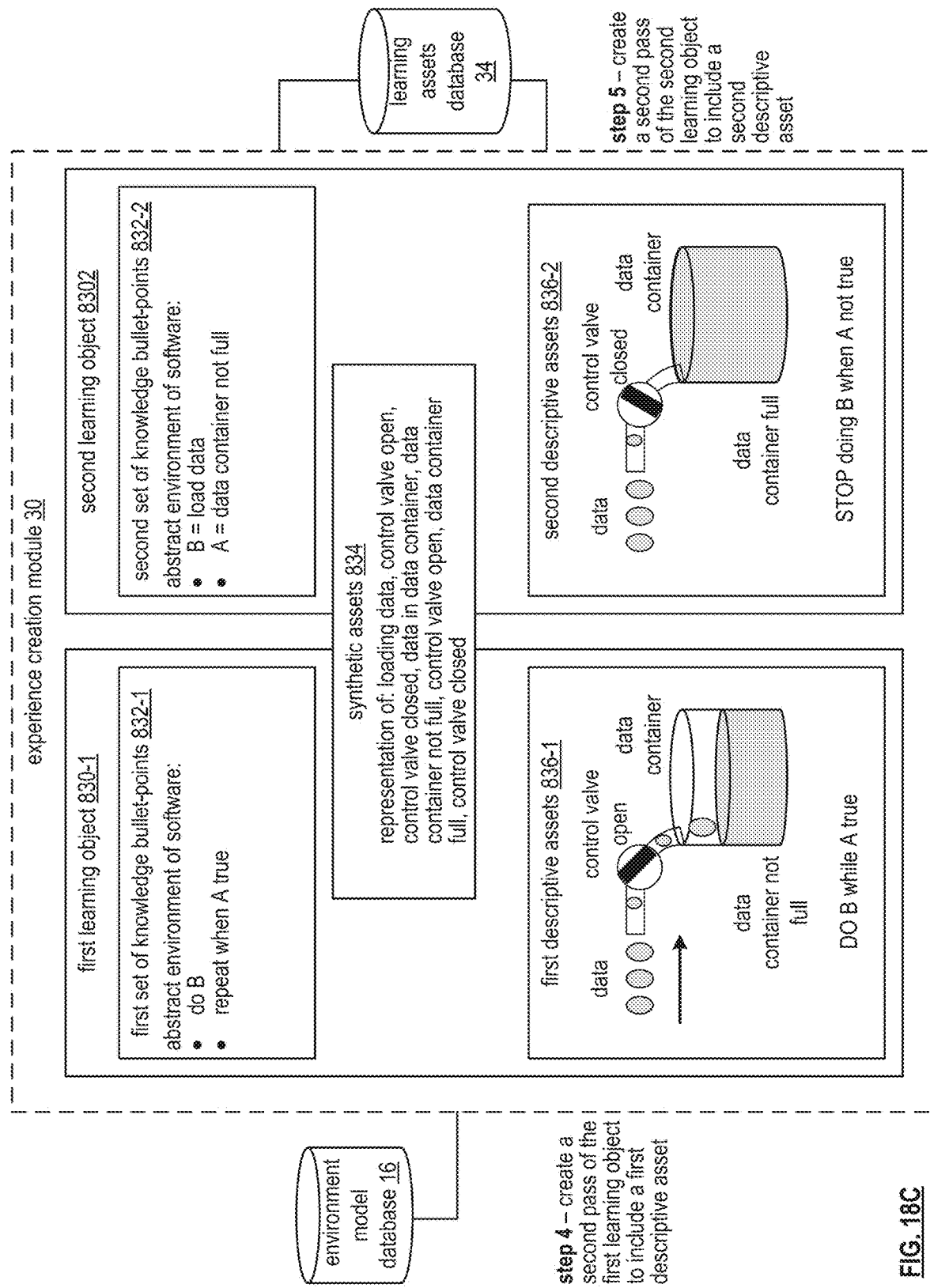

FIG. 18C further illustrates the method of operation where, having obtained the synthetic assets 834, in a fourth step the experience creation module 30 creates a second pass of the first learning object to include a first descriptive asset. The experience creation module 30 generates first descriptive assets 836-1 based on the synthetic assets 834 and the first set of knowledge bullet-points 832-1. For example, the experience creation module 30 aggregates the representations of the data, the loading of the data, the open control valve, the data container, and the data container not full to represent the software statement "DO B while A true."

Having created the first descriptive assets, in a fifth step the experience creation module 30 creates a second pass of the second learning object to include a second descriptive asset. The experience creation module 30 generates second descriptive assets 836-2 based on the synthetic assets 834 and the second set of knowledge bullet-points 832-2. For example, the experience creation module 30 aggregates the representations of the data, the loading of the data, the control valve closed, the data container, and the data container full to represent stop doing B when A not true utilizing artifacts of software "B=load data and A=data container not full" associated with the software statement "DO B while A true."

Figure 18D:
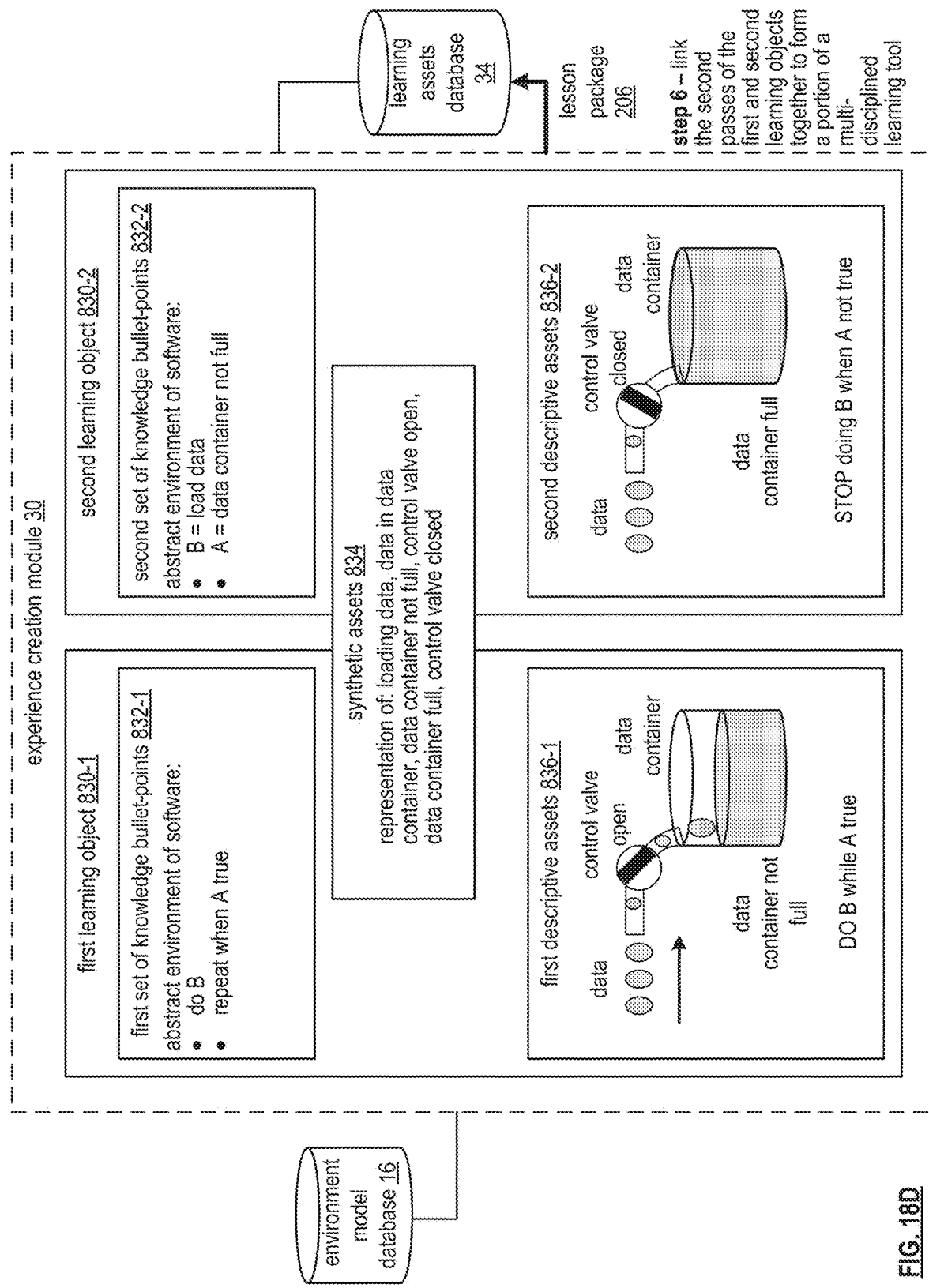

FIG. 18D further illustrates the method of operation where, having created the second passes of the first and second learning objects, the experience creation module 30 links the second passes of the first and second learning objects together to form a portion of a multi-disciplined learning tool. For example, the expense creation module updates the first learning object 830-1 to include the first descriptive assets 836-1 and updates the second learning object 830-2 to include the second descriptive assets 836-2. The experience creation module 30 aggregates the first learning object 830-1 and the second learning object 830-2 to produce a lesson package 206 for storage in the learning assets database 34.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

FIGS. 19A, 19B, 19C, and 19D are schematic block diagrams of an embodiment of a computing system illustrating another example of creating a lesson package. The computing system includes the environment model database 16 of FIG. 1, the environment sensor module 14 of FIG. 1, the experience creation module 30 of FIG. 1, and the learning assets database 34 of FIG. 1. The environment sensor module 14 includes the motion sensor 126 of FIG. 4 and the position sensor 128 of FIG. 4. The experience creation module 30 includes the learning path module 180 of FIG. 8A, the asset module 182 of FIG. 8A, the instruction module 184 of FIG. 8A, and the lesson generation module 186 of FIG. 8A.

FIG. 19A illustrates an example of operation where, in a first step the experience creation module obtains lesson asset information for a lesson. For example, the learning path module 180 recovers learning path information 194 from the learning assets database 34 and receives learning path structure information 190 and learning objective information 192 from an instructor to produce updated learning path information 196 that includes structure and learning object information including instructor based on inputs.

The asset module 182 receives supporting asset information 198 and recovers modeled asset information 200 from the environment model database 16 to produce the lesson asset information 202 further based on the updated learning path information 196. The learning asset information 202 represents information of the environment to support the updated learning path and objects within the environment.

Figure 19B:
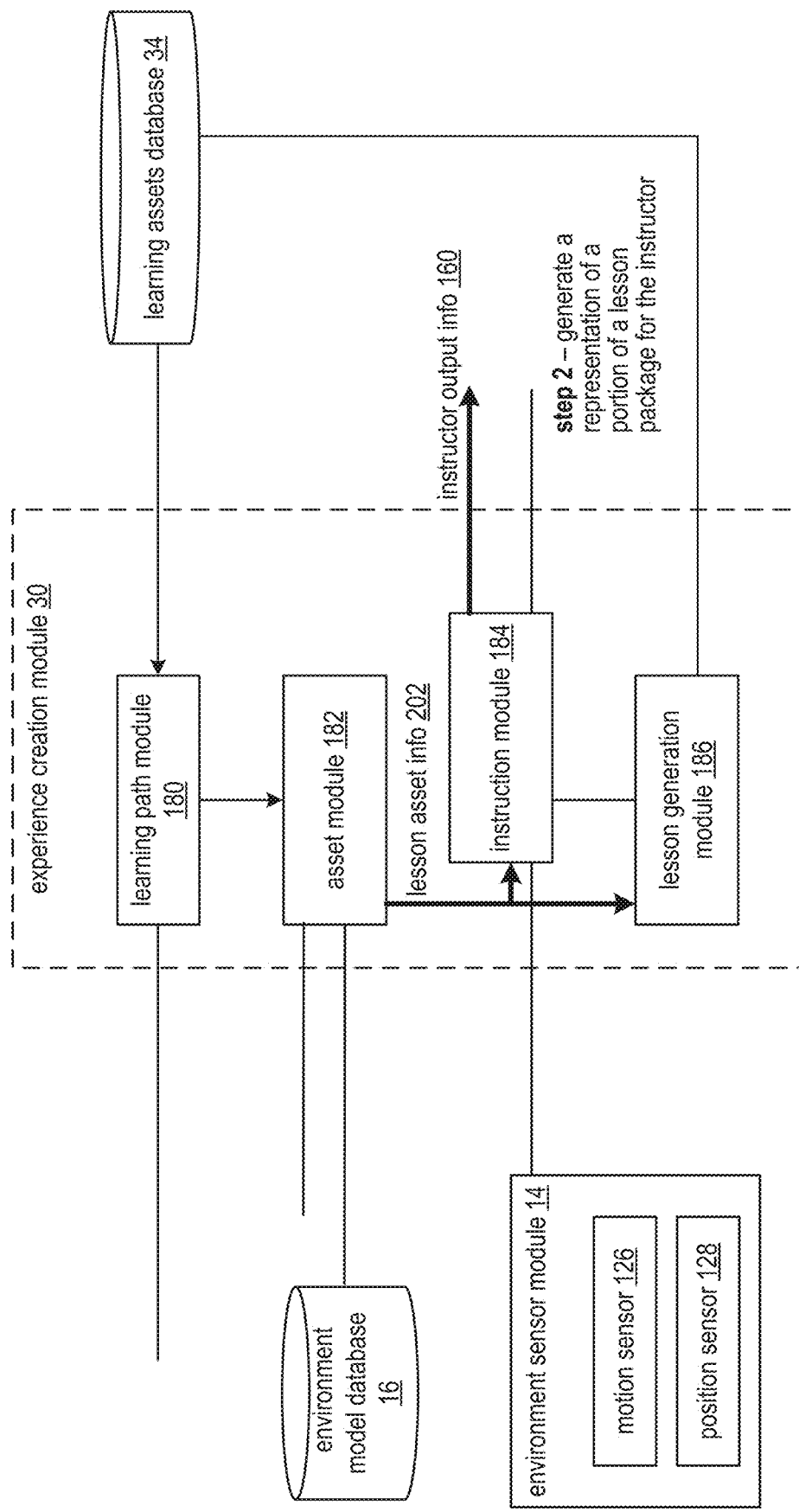

FIG. 19B further illustrates the method of operation where, having obtained the lesson asset information 202, in a second step the experience creation module 30 generates a representation of a portion of a lesson package of the lesson asset information 202 for an instructor 26-1. For example, the instruction module 184 generates instructor output information 160 based on the lesson asset information 202. The instructor output information 160 includes a representation of the environment and the assets so far (e.g., start of the lesson).

Figure 19C:
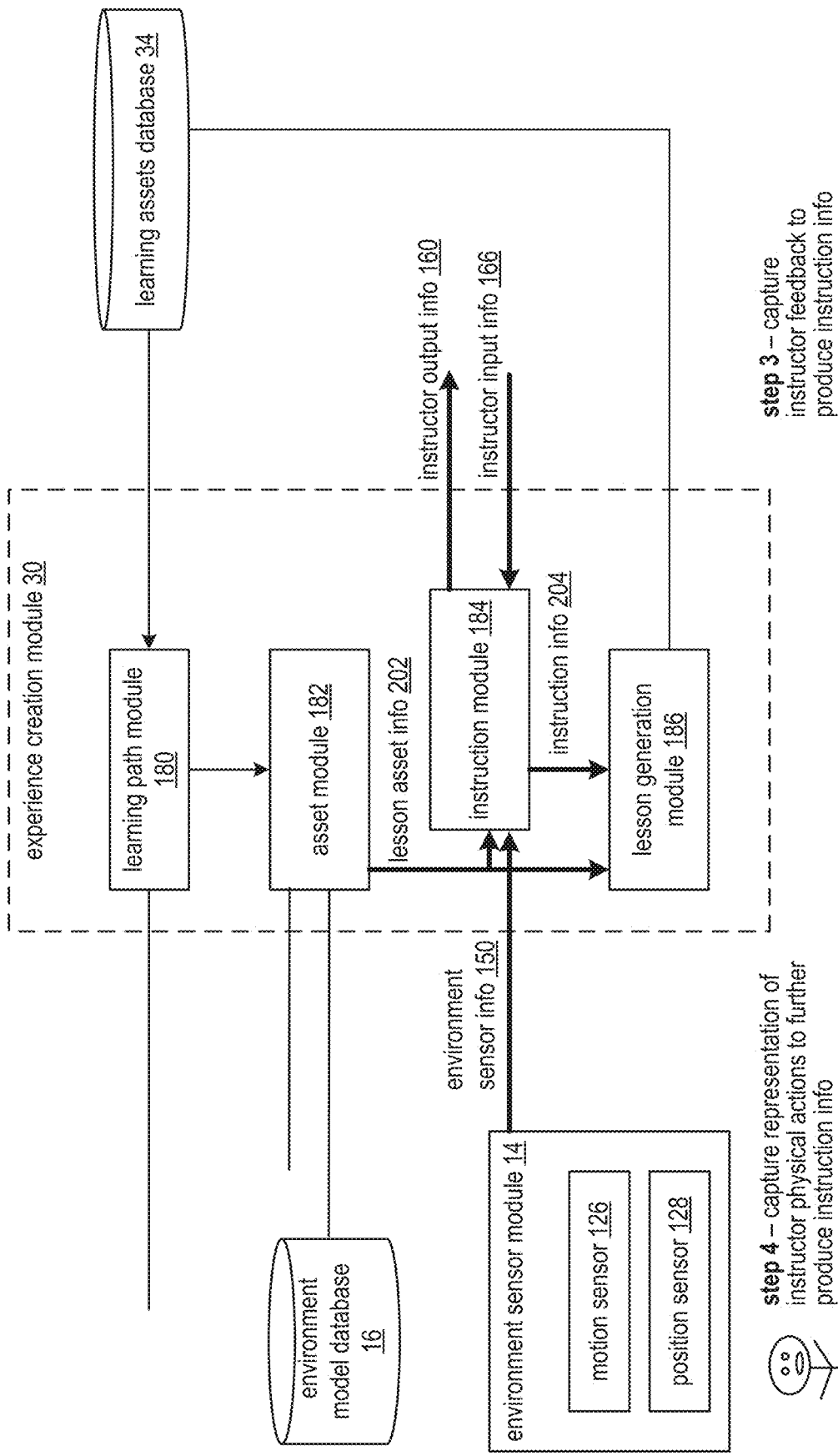

FIG. 19C further illustrates the method of operation where, having generated the representation of the lesson package for the instructor, in a third step the experience creation module 30 captures instructor feedback to produce instruction information. For example, the instruction module 184, receives instructor input information 166 from the instructor 26-1 in response to the instructor output information 160. The instructor input information 166 includes a representation of instructor interactions with objects within the virtual environment including composite evaluation information (e.g., explicit questions and answers).

Having captured instructor feedback, in a fourth step the experience creation module captures a representation of instructor physical actions to further produce instruction information. For example, the instruction module 184 receives environment sensor information 150 from the environment sensor module 14. The environment sensor module 14 detects physical manipulation of real world objects by the instructor 26-1 via the motion sensor 126 and position sensor 128 to produce the environment sensor information 150. The physical manipulations includes detecting a tool position, detecting a pointer position, detecting where a hand is, detecting a facial expression, detecting where a finger is pointing, detecting where eyes are looking, detecting feet position, etc.

Having received the environment sensor information 150 and the instructor input information 166, the instruction module 184 generates instruction information 204 based on the environment sensor information 150 and the instructor input information 166. The instruction information 204 includes a representation of instructor interactions with objects within the virtual environment and the composite evaluation information.

Figure 19D:
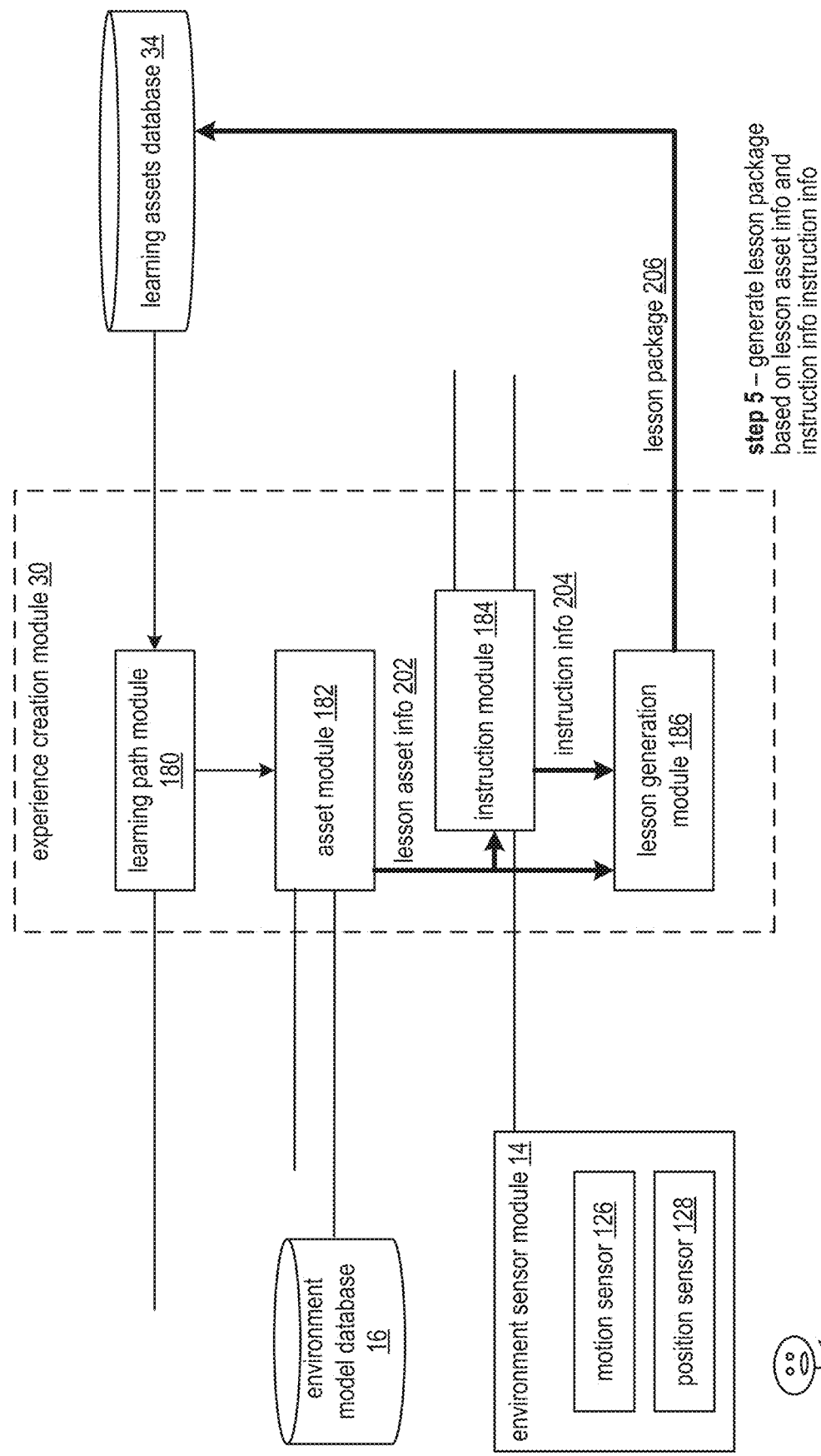

FIG. 19D further illustrates the method of operation where, having generated the instruction information 204, in a fifth step the experience creation module generates a lesson package. For example, the lesson generation module 186 generates the lesson package 206 for storage in the learning assets database 34 based on the lesson asset information 202 and the instruction information 204.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, etc.) that stores operational instructions can, when executed by one or more processing modules of the one or more computing devices of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computer-implemented method of using a computing system, the method comprises:

generating, by a computing entity of the computing system, a combination of a multi-dimensional representation of a real-world environment and an augmented reality overlay to produce a virtual reality environment, wherein the generating includes:

detecting, by the computing entity, an illustrative asset that is common to a first set of assets and a second set of assets for the augmented reality overlay and to a real-world object of the real-world environment, wherein the first set of assets represents a first learning object that includes a first set of bullet-points for a first piece of information regarding a topic, wherein the second set of assets represents a second learning object that includes a second set of bullet-points for a second piece of information regarding the topic;

rendering, by the computing entity, a three-dimensional (3-D) model of the illustrative asset and a three-dimensional (3-D) model of the first set of assets with regards to the first set of knowledge bullet-points to transform the first set of knowledge bullet-points into 3-D frames of a first descriptive asset, wherein the first descriptive asset represents the first learning object;

rendering, by the computing entity, a three-dimensional (3-D) model of the illustrative asset and a three-dimensional (3-D) model of the first set of assets with regards to a first set of knowledge test-points for the first learning object regarding the topic based on the first set of knowledge bullet-points to transform the first set of knowledge test-points into 3-D frames of a first knowledge assessment asset;

rendering, by the computing entity, the three-dimensional (3-D) model of the illustrative asset and a three-dimensional (3-D) model of the second set of assets with regards to the second set of knowledge bullet-points to transform the second set of knowledge bullet-points into 3-D frames of a second descriptive asset, wherein the second descriptive asset represents the second learning object; and rendering, by the computing entity, the three-dimensional (3-D) model of the illustrative asset and the three-dimensional (3-D) model of the second set of assets with regards to a second set of knowledge test-points for the second learning object regarding the topic based on the second set of knowledge bullet-points to transform the second set of knowledge test-points into 3-D frames of a second knowledge assessment asset.

2. The method of claim 1 further comprises:
updating, by the computing entity, the first learning object to include the first set of knowledge test-points and the first knowledge assessment asset for the first learning object to produce an updated first learning object;
updating, by the computing entity, the second learning object to include the second set of knowledge test-points and the second knowledge assessment asset for the second learning object to produce an updated second learning object; and
linking, by the computing entity, the updated first learning object and the updated second learning object together to form a modified multi-disciplined learning tool.

3. The method of claim 1 further comprises one or more of:
interpreting a first knowledge bullet-point of the first set of knowledge bullet-points in accordance with the illustrative asset and the first descriptive asset of the first learning object to produce a first knowledge test-point of the first set of knowledge test-points;
interpreting a second knowledge bullet-point of the first set of knowledge bullet-points in accordance with the illustrative asset and the first descriptive asset of the first learning object to produce a second knowledge test-point of the first set of knowledge test-points; and
interpreting instructor input information to identify a third knowledge test-point of the first set of knowledge test-points.

4. The method of claim 1 further comprises one or more of:
interpreting a first knowledge bullet-point of the second set of knowledge bullet-points in accordance with the illustrative asset and the second descriptive asset of the second learning object to produce a first knowledge test-point of the second set of knowledge test-points;
interpreting a second knowledge bullet-point of the second set of knowledge bullet-points in accordance with the illustrative asset and the second descriptive asset of the second learning object to produce a second knowledge test-point of the second set of knowledge test-points; and
interpreting instructor input information to identify a third knowledge test-point of the second set of knowledge test-points.

5. A computing device of a computing system, the computing device comprises:
an interface;
a local memory; and
a processing module operably coupled to the interface and the local memory, wherein the processing module functions to:
generate a combination of a multi-dimensional representation of a real-world environment and an augmented reality overlay to produce a virtual reality environment, wherein the processing module generates the virtual reality environment by:
detecting an illustrative asset that is common to a first set of assets and a second set of assets for the augmented reality overlay and to a real-world object of the real-world environment, wherein the first set of assets represents a first learning object that includes a first set of bullet-points for a first piece of information regarding a topic, wherein the second set of assets represents a second learning object that includes a second set of bullet-points for a second piece of information regarding the topic;
rendering a three-dimensional (3-D) model of the illustrative asset and a three-dimensional (3-D) model of the first set of assets with regards to the first set of knowledge bullet-points to transform the first set of knowledge bullet-points into 3-D frames of a first descriptive asset, wherein the first descriptive asset represents the first learning object;
rendering a three-dimensional (3-D) model of the illustrative asset and a three-dimensional (3-D) model of the first set of assets with regards to a first set of knowledge test-points for the first learning object regarding the topic based on the first set of knowledge bullet-points to transform the first set of knowledge test-points into 3-D frames of a first knowledge assessment asset;
rendering the three-dimensional (3-D) model of the illustrative asset and a three-dimensional (3-D) model of the second set of assets with regards to the second set of knowledge bullet-points to transform the second set of knowledge bullet-points into 3-D frames of a second descriptive asset, wherein the second descriptive asset represents the second learning object; and
rendering the three-dimensional (3-D) model of the illustrative asset and the three-dimensional (3-D) model of the second set of assets with regards to a second set of knowledge test-points for the second learning object regarding the topic based on the second set of knowledge bullet-points to transform the second set of knowledge test-points into 3-D frames of a second knowledge assessment asset.

6. The computing device of claim 5, wherein the processing module further functions to:
update the first learning object to include the first set of knowledge test-points and the first knowledge assessment asset for the first learning object to produce an updated first learning object;
update the second learning object to include the second set of knowledge test-points and the second knowledge assessment asset for the second learning object to produce an updated second learning object; and
link the updated first learning object and the updated second learning object together to form a modified multi-disciplined learning tool.

7. The computing device of claim 5, wherein the processing module further functions to:
interpret a first knowledge bullet-point of the first set of knowledge bullet-points in accordance with the illustrative asset and the first descriptive asset of the first learning object to produce a first knowledge test-point of the first set of knowledge test-points;
interpret a second knowledge bullet-point of the first set of knowledge bullet-points in accordance with the illustrative asset and the first descriptive asset of the first learning object to produce a second knowledge test-point of the first set of knowledge test-points; and interpret instructor input information to identify a third knowledge test-point of the first set of knowledge test-points.

8. The computing device of claim 5, wherein the processing module further functions to:
interpret a first knowledge bullet-point of the second set of knowledge bullet-points in accordance with the illustrative asset and the second descriptive asset of the second learning object to produce a first knowledge test-point of the second set of knowledge test-points;
interpret a second knowledge bullet-point of the second set of knowledge bullet-points in accordance with the illustrative asset and the second descriptive asset of the second learning object to produce a second knowledge test-point of the second set of knowledge test-points; and
interpret instructor input information to identify a third knowledge test-point of the second set of knowledge test-points.

9. A non-transitory computer readable memory comprises:
a first memory element that stores operational instructions that, when executed by a processing module, causes the processing module to:
generate a combination of a multi-dimensional representation of a real-world environment and an augmented reality overlay to produce a virtual reality environment, wherein the processing module generates the virtual reality environment by:
detecting an illustrative asset that is common to a first set of assets and a second set of assets for the augmented reality overlay and to a real-world object of the real-world environment, wherein the first set of assets represents a first learning object that includes a first set of bullet-points for a first piece of information regarding a topic, wherein the second set of assets represents a second learning object that includes a second set of bullet-points for a second piece of information regarding the topic;
a second memory element that stores operational instructions that, when executed by the processing module, causes the processing module to further generate the virtual reality environment by:
rendering a three-dimensional (3-D) model of the illustrative asset and a three-dimensional (3-D) model of the first set of assets with regards to the first set of knowledge bullet-points to transform the first set of knowledge bullet-points into 3-D frames of a first descriptive asset, wherein the first descriptive asset represents the first learning object; and
a third memory element that stores operational instructions that, when executed by the processing module, causes the processing module to further generate the virtual reality environment by:
rendering a three-dimensional (3-D) model of the illustrative asset and a three-dimensional (3-D) model of the first set of assets with regards to a first set of knowledge test-points for the first learning object regarding the topic based on the first set of knowledge bullet-points to transform the first set of knowledge test-points into 3-D frames of a first knowledge assessment asset;
rendering the three-dimensional (3-D) model of the illustrative asset and a three-dimensional (3-D) model of the second set of assets with regards to the second set of knowledge bullet-points to transform the second set of knowledge bullet-points into 3-D frames of a second descriptive asset, wherein the second descriptive asset represents the second learning object; and
rendering the three-dimensional (3-D) model of the illustrative asset and the three-dimensional (3-D) model of the second set of assets with regards to a second set of knowledge test-points for the second learning object regarding the topic based on the second set of knowledge bullet-points to transform the second set of knowledge test-points into 3-D frames of a second knowledge assessment asset.

10. The non-transitory computer readable memory of claim 9 further comprises:
a fourth memory element that stores operational instructions that, when executed by the processing module, causes the processing module to:
update the first learning object to include the first set of knowledge test-points and the first knowledge assessment asset for the first learning object to produce an updated first learning object;
update the second learning object to include the second set of knowledge test-points and the second knowledge assessment asset for the second learning object to produce an updated second learning object; and
link the updated first learning object and the updated second learning object together to form a modified multi-disciplined learning tool.

11. The non-transitory computer readable memory of claim 9 further comprises:
a fifth memory element that stores operational instructions that, when executed by the processing module, causes the processing module to:
interpret a first knowledge bullet-point of the first set of knowledge bullet-points in accordance with the illustrative asset and the first descriptive asset of the first learning object to produce a first knowledge test-point of the first set of knowledge test-points;
interpret a second knowledge bullet-point of the first set of knowledge bullet-points in accordance with the illustrative asset and the first descriptive asset of the first learning object to produce a second knowledge test-point of the first set of knowledge test-points; and
interpret instructor input information to identify a third knowledge test-point of the first set of knowledge test-points.

12. The non-transitory computer readable memory of claim 9 further comprises:
a sixth memory element that stores operational instructions that, when executed by the processing module, causes the processing module to:
interpret a first knowledge bullet-point of the second set of knowledge bullet-points in accordance with the illustrative asset and the second descriptive asset of the second learning object to produce a first knowledge test-point of the second set of knowledge test-points;
interpret a second knowledge bullet-point of the second set of knowledge bullet-points in accordance with the illustrative asset and the second descriptive asset of the second learning object to produce a second knowledge test-point of the second set of knowledge test-points; and interpret instructor input information to identify a third knowledge test-point of the second set of knowledge test-points.

\* \* \* \* \*